US012692661B2

(12) United States Patent
Kien et al.

(10) Patent No.: US 12,692,661 B2
(45) Date of Patent: Jul. 28, 2026

(54) FIBROUS STRUCTURES COMRPISING DISCRETE CELLS

(71) Applicant: The Procter & Gamble Company, Cincinnati, OH (US)

(72) Inventors: Kathryn Christian Kien, Cincinnati, OH (US); Charles Allen Redd, Harrison, OH (US); Jeffrey Glen Sheehan, Symmes Township, OH (US); Osman Polat, Montgomery, OH (US); Anthony Paul Bankemper, Green Township, OH (US); David W. Loebker, Cincinnati, OH (US); Mireilly Rosadobonilla, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 184 days.

(21) Appl. No.: 18/476,367

(22) Filed: Sep. 28, 2023

(65) Prior Publication Data

US 2024/0035234 A1 Feb. 1, 2024

Related U.S. Application Data

(63) Continuation of application No. 17/091,623, filed on Nov. 6, 2020, now Pat. No. 11,807,991.

(Continued)

(51) Int. Cl.

| | |
|---|---|
| ***D21H 27/00*** | (2006.01) |
| ***B31F 1/12*** | (2006.01) |

(Continued)

(52) U.S. Cl.

CPC ............ *D21H 27/002* (2013.01); *B31F 1/12* (2013.01); *D21H 5/008* (2013.01); *D21H 27/02* (2013.01);

(Continued)

(58) Field of Classification Search

CPC ...... D21H 27/002; D21H 5/008; D21H 27/02; D21H 27/40; D21F 11/006; A47K 10/16

See application file for complete search history.

(56) References Cited

U.S. PATENT DOCUMENTS 4,637,859 A * 1/1987 Trokhan ................ D21F 11/006 162/113
5,906,710 A 5/1999 Trokhan (Continued)

FOREIGN PATENT DOCUMENTS

CA 2246526 A1 3/2000
CA 3064406 A1 6/2020

(Continued)

OTHER PUBLICATIONS

PCT Search Report and Written Opinion for PCT/US2020/059276 dated Feb. 19, 2021, 13 Pages.

(Continued)

*Primary Examiner* — Jose A Fortuna
(74) *Attorney, Agent, or Firm* — Richard L. Alexander; Andrew J Mueller

(57) ABSTRACT

Belts and fibrous structures including discrete cells having one or more legs and/or one or more concavities in certain patterns or Cell Groups. The cells may be discrete knuckles or pillows and the fibrous structures may further include an emboss.

8 Claims, 63 Drawing Sheets

Related U.S. Application Data

(60) Provisional application No. 63/036,767, filed on Jun. 9, 2020, provisional application No. 62/932,885, filed on Nov. 8, 2019.

(51) Int. Cl.

| | |
|---|---|
| ***D21H 15/00*** | (2006.01) |
| ***D21H 27/02*** | (2006.01) |
| *B31F 1/07* | (2006.01) |
| *D21F 11/00* | (2006.01) |
| *D21H 27/40* | (2006.01) |

(52) U.S. Cl.

CPC ............... *B31F 1/07* (2013.01); *D21F 11/006* (2013.01); *D21H 27/40* (2013.01)

(56) References Cited

U.S. PATENT DOCUMENTS

| | | | | |
|---|---|---|---|---|
| 11,807,990 | B2 * | 11/2023 | Redd | D21H 27/002 |
| 11,807,991 | B2 * | 11/2023 | Redd | D21H 27/002 |
| 12,139,855 | B2 * | 11/2024 | Redd | D21H 27/02 |
| 2007/0272381 | A1 | 11/2007 | Elony et al. | |
| 2021/0140114 | A1 | 5/2021 | Redd et al. | |
| 2021/0140115 | A1 | 5/2021 | Redd et al. | |
| 2021/0140116 | A1 | 5/2021 | Redd et al. | |
| 2022/0333313 | A1 * | 10/2022 | Wurzler | D21H 27/002 |
| 2023/0083332 | A1 | 3/2023 | Ross et al. | |
| 2023/0404332 | A1 * | 12/2023 | Schwerdtfeger | D21H 27/30 |
| 2024/0003091 | A1 * | 1/2024 | Redd | D21H 27/002 |
| 2024/0035234 | A1 * | 2/2024 | Kien | D21H 27/02 |
| 2024/0065457 | A1 * | 2/2024 | Ross | A47F 5/0025 |
| 2024/0076077 | A1 * | 3/2024 | Ross | B65D 85/671 |
| 2025/0116067 | A1 * | 4/2025 | Kreider | D21H 27/02 |
| 2025/0243614 | A1 * | 7/2025 | Young | D04H 1/425 |

FOREIGN PATENT DOCUMENTS

| | | | | |
|---|---|---|---|---|
| DE | 202007011885 | U1 | 11/2007 | |
| WO | 2007139851 | A2 | 12/2007 | |
| WO | WO-2021092282 | A1 * | 5/2021 | D21H 27/02 |
| WO | WO-2023196449 | A1 * | 10/2023 | D21H 27/38 |
| WO | WO-2023245027 | A1 * | 12/2023 | B65D 85/62 |
| WO | WO-2023245028 | A1 * | 12/2023 | B65D 85/62 |
| WO | WO-2025165801 | A1 * | 8/2025 | D21H 11/12 |

OTHER PUBLICATIONS

U.S. Appl. No. 18/468,975, filed Sep. 18, 2023, to Charles Allen Redd et al.

U.S. Appl. No. 19/427,444, filed Dec. 19, 2025, to Charles Allen Redd et. al.

* cited by examiner

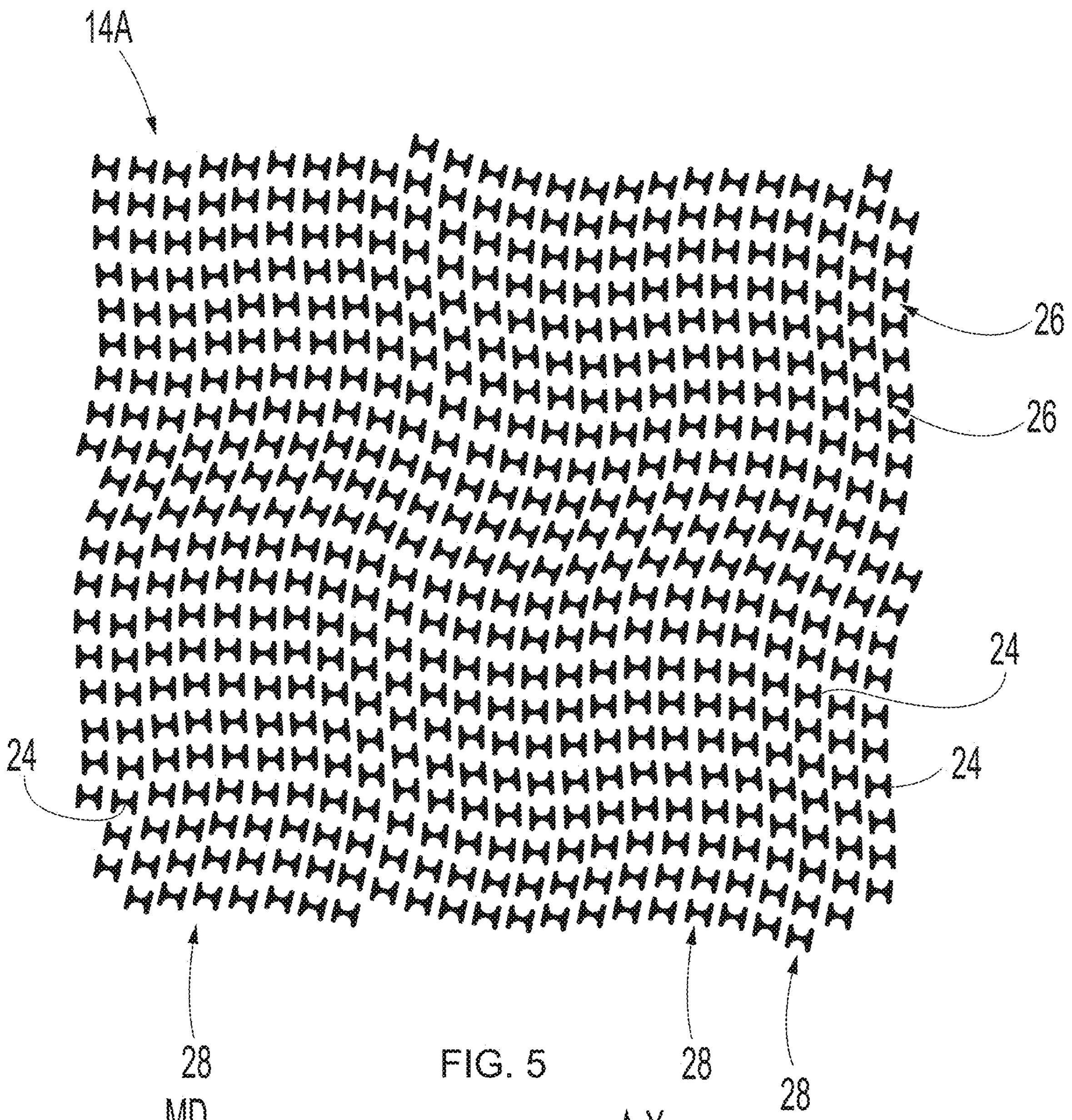
FIG. 5
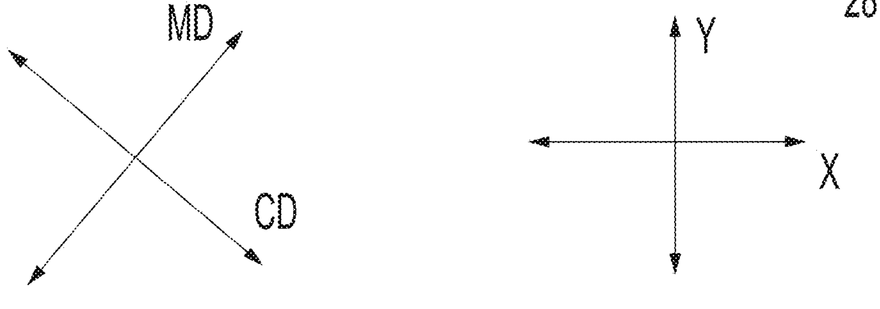

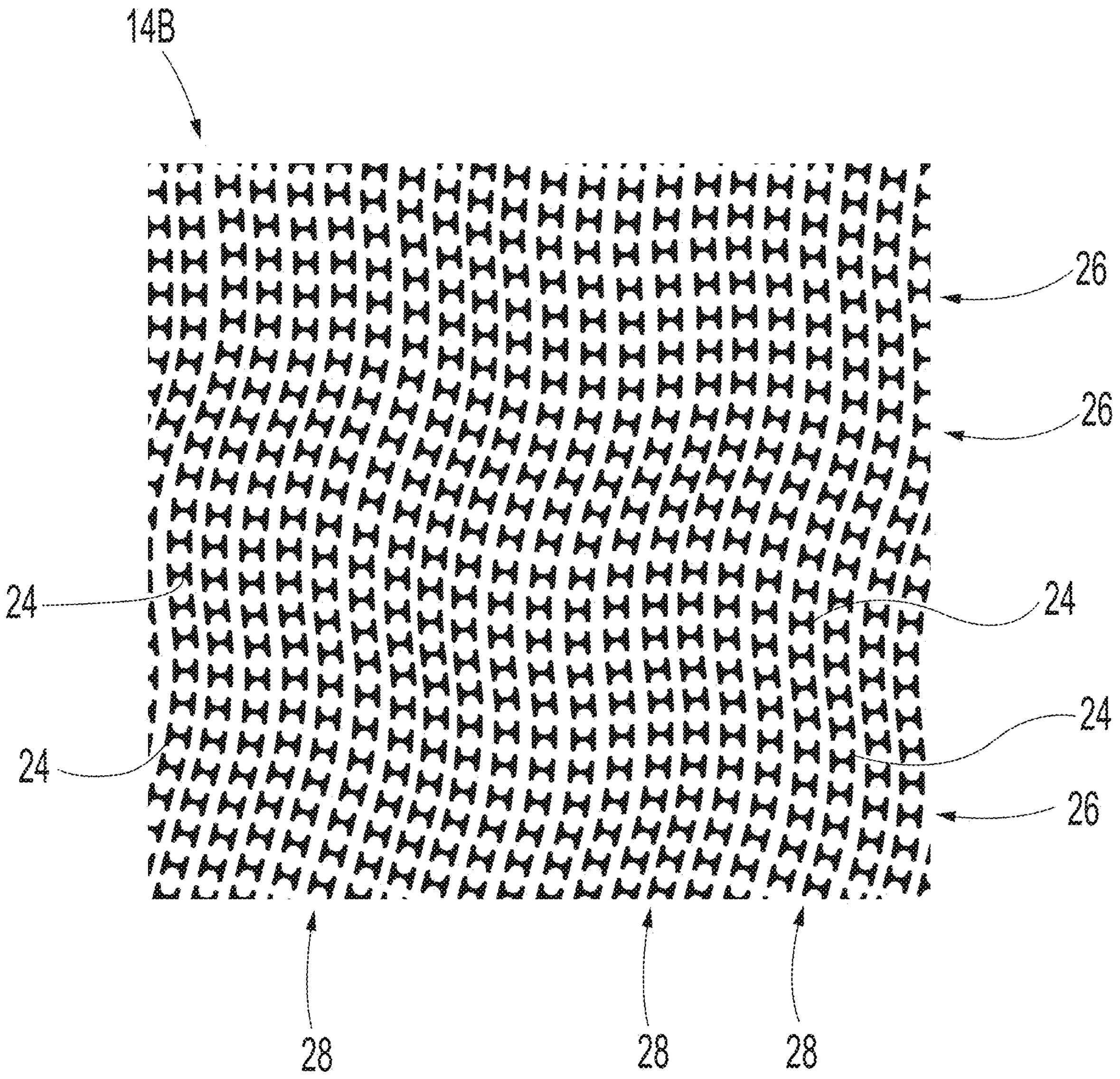
FIG. 6

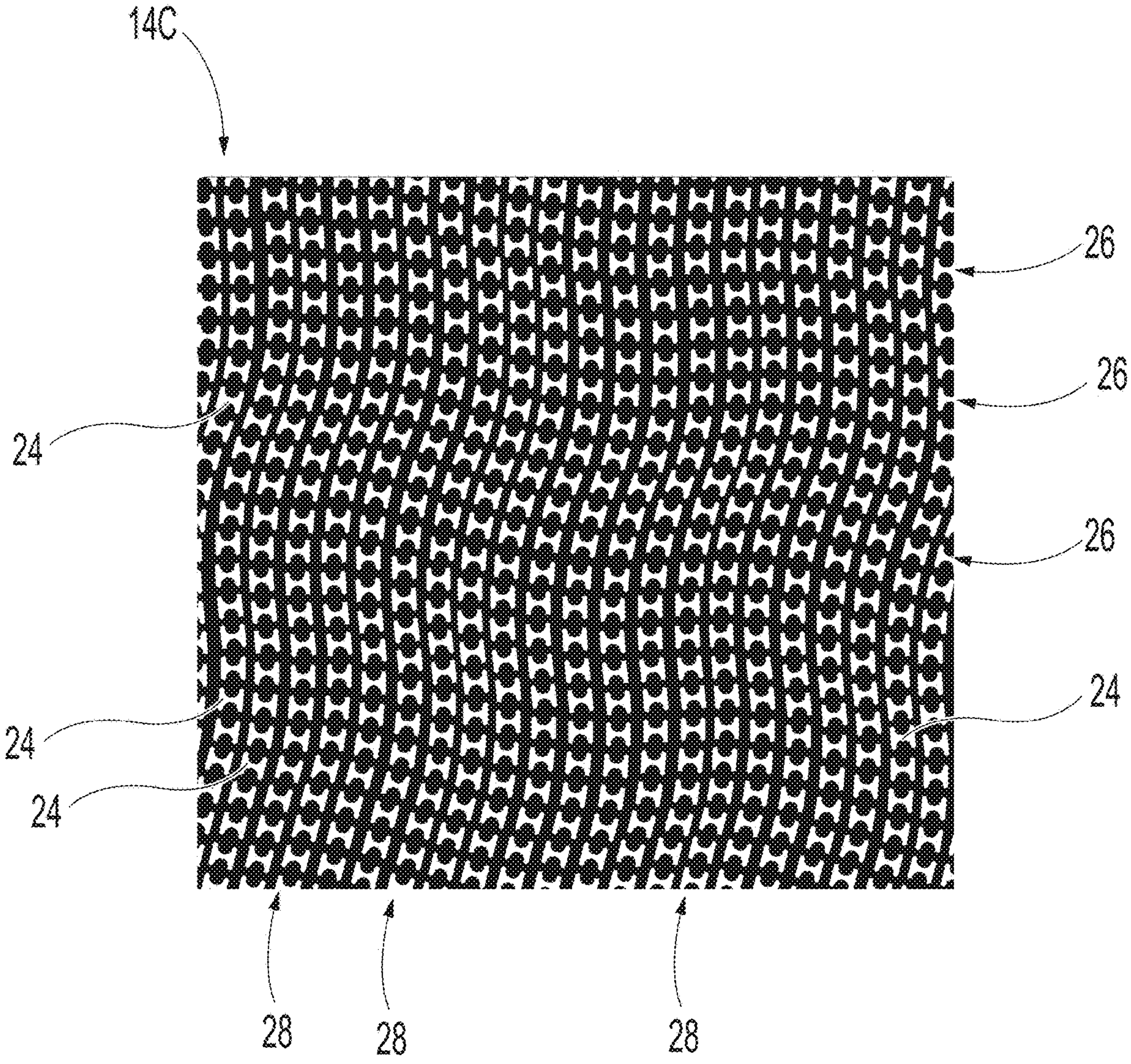
FIG. 7

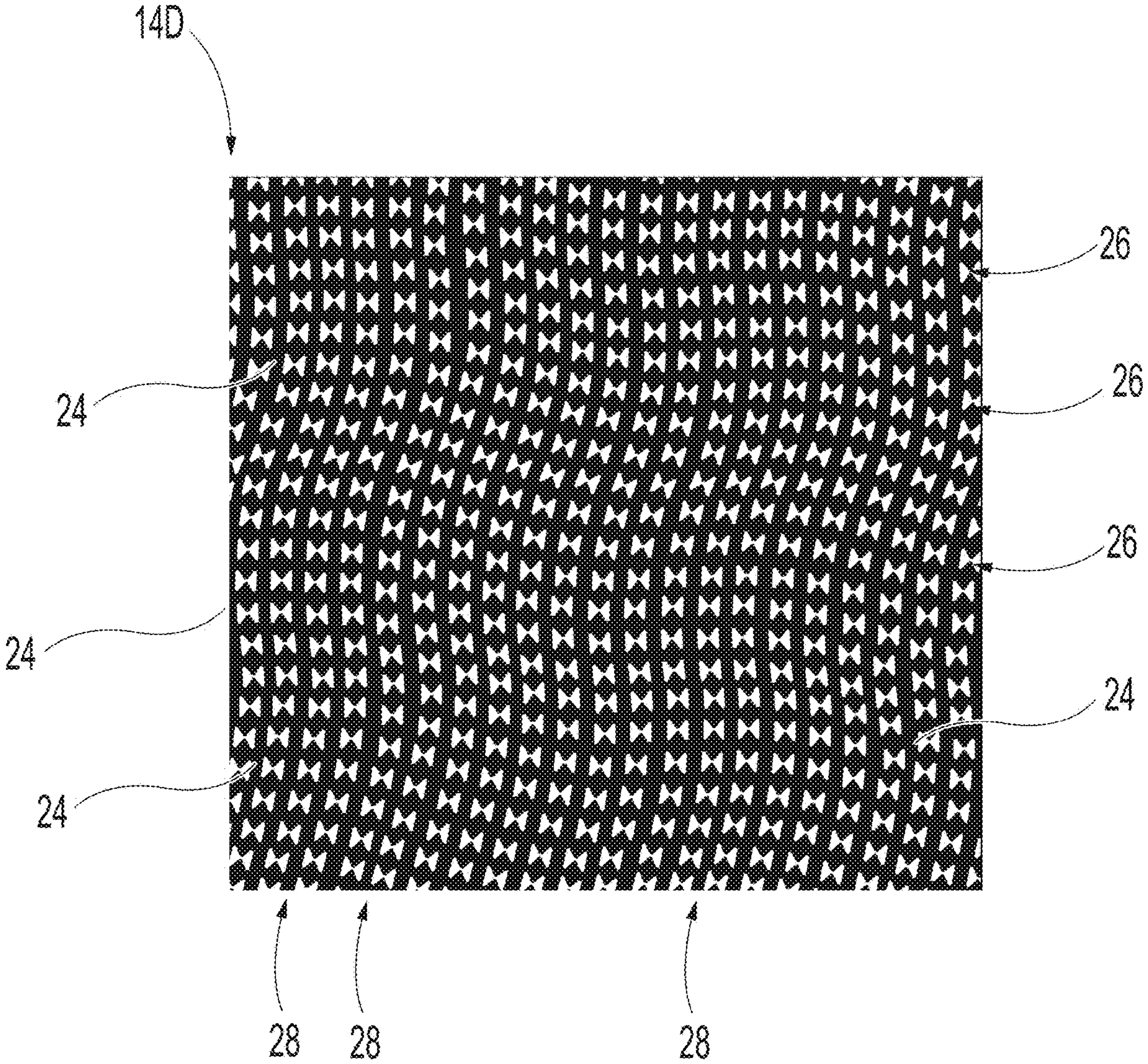
FIG. 8
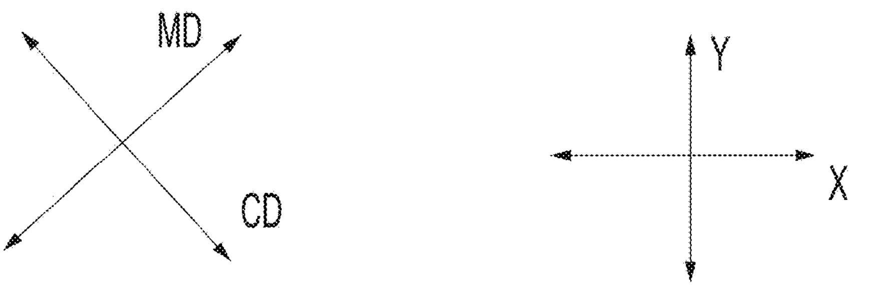

FIBROUS STRUCTURES COMRPISING DISCRETE CELLS

CROSS REFERENCE TO RELATED APPLICATIONS

This application is a continuation of, and claims priority under 35 U.S.C. § 120 to, U.S. patent application Ser. No. 17/091,623, filed on Nov. 6, 2020, which claims the benefit, under 35 USC § 119(e), of U.S. Provisional Patent Application Serial No. U.S. Provisional Application No. 62/932,885, filed Nov. 8, 2019 and U.S. Provisional Application No. 63/036,767, filed Jun. 9, 2020, the substances of which are incorporated herein by reference.

FIELD

The present disclosure generally relates to fibrous structures and, more particularly, to fibrous structures comprising discrete elements situated in patterns. The present disclosure also generally relates to papermaking belts that are used in creating fibrous structures and, more particularly, to papermaking belts that are used in creating fibrous structures comprising discrete elements situated in patterns.

BACKGROUND

Fibrous structures, such as sanitary tissue products, are useful in everyday life in various ways. These products can be used as wiping implements for post-urinary and post-bowel movement cleaning (toilet tissue and wet wipes), for otorhinolaryngological discharges (facial tissue), and multi-functional absorbent and cleaning uses (paper towels). Retail consumers of such fibrous structures look for products with certain performance properties, for example softness, smoothness, strength, and absorbency. For fibrous structures provided in roll form (e.g., toilet tissue and paper towels), retail consumers also look for products with roll properties that indicate value and quality, such as higher roll bulk, greater roll firmness, and lower roll compressibility.

Accordingly, manufacturers seek to make fibrous structures with such desired properties through selection of material components, as well as selection of equipment and processes used in manufacturing the fibrous structures. More particularly, these desirable properties are achieved by forming pillows and knuckles throughout the fibrous structure, such is well-known. Various knuckle and pillow patterns have been disclosed and marketed. Applicants, however, have discovered knuckle and pillow patterns that create improved properties by using discrete knuckle (or discrete pillow) structures comprising one or more legs and/or concavities. Applicants space these discrete cells (knuckles or pillows) such that complex arrangements of distinct regions (pillow or knuckle regions) are formed, as will be explained in further detail below. These inventive cell structures, Cell Groups, and cell patterns result in fibrous structures that have desired and improved properties, including: improved cloth-like feel (Emtec TS7, Flexural Rigidity, and Flexural Rigidity/TDT), bulk (caliper, surface topology), looks cloth-like (surface topology, cell size, Cell Area relative to Emboss Area), and rapid liquid uptake (CRT Rate and SST Rate).

Of further importance in today's retail environment are the consumer-desired aesthetics of the fibrous structures. However, many times the independent goals of superior product performance (e.g., performance properties and/or roll properties) and consumer desired aesthetics are in contradiction to one another. For instance, the smoothness of a paper towel may depend on the wet-laid structure provided by the papermaking belt utilized during paper production and/or the emboss pattern applied during the paper converting process. But such papermaking-belt-provided structure and/or emboss may make the product visually unappealing to the consumer. Or a paper towel may be visually appealing to the consumer through the papermaking-belt-provided structure and/or emboss but have an undesired level of smoothness. Accordingly, manufacturers continually seek to make new fibrous structures with a combination of good performance and consumer-desired aesthetics.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting examples of the disclosure taken in conjunction with the accompanying drawings, wherein:

FIG. 5 is a plan view of a portion of a mask pattern used to make the papermaking belt that produced the fibrous structure of FIG. 4;

FIG. 6 is a plan view of a portion of a mask pattern used to make a papermaking belt that can produce an example of the new fibrous structures detailed herein;

FIG. 7 is a plan view of a portion of a mask pattern used to make a papermaking belt that can produce an example of the new fibrous structures detailed herein;

FIG. 8 is a plan view of a portion of a mask pattern used to make a papermaking belt that can produce an example of the new fibrous structures detailed herein;

DETAILED DESCRIPTION

Figure 1:
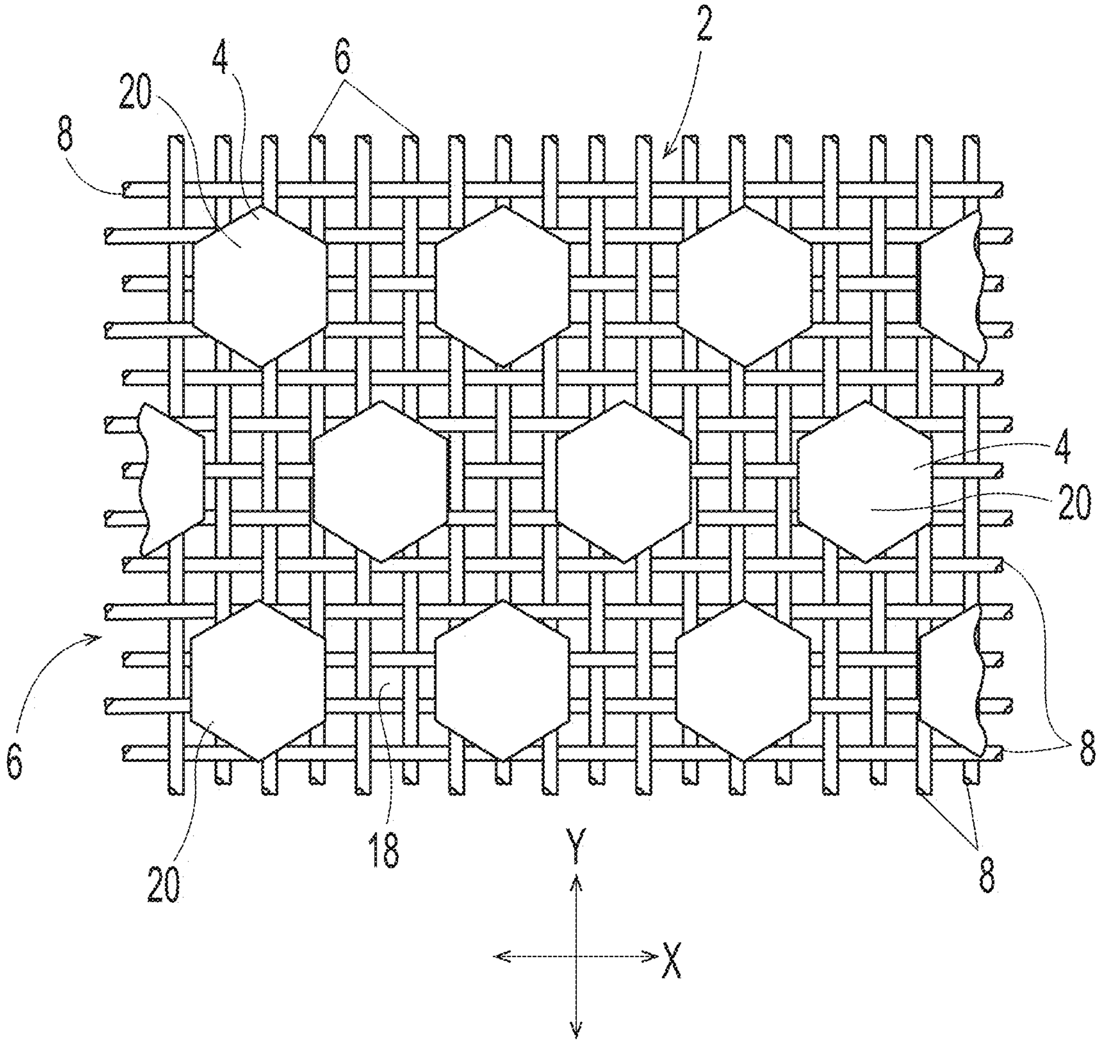
FIG. 1 PRIOR ART
FIG. 1 is a representative papermaking belt of the kind useful to make the fibrous structures of the present disclosure.

Various non-limiting examples of the present disclosure will now be described to provide an overall understanding of the principles of the structure, function, manufacture, and use of the fibrous structures disclosed herein. One or more non-limiting examples are illustrated in the accompanying drawings. Those of ordinary skill in the art will understand that the fibrous structures described herein and illustrated in the accompanying drawings are non-limiting examples. The features illustrated or described in connection with one non-limiting example can be combined with the features of other non-limiting examples. Such modifications and variations are intended to be included within the scope of the present disclosure.

Fibrous structures such as sanitary tissue products, including paper towels, bath tissues and facial tissues are typically made in "wet-laid" papermaking processes. In such papermaking processes, a fiber slurry, usually wood pulp fibers, is deposited onto a forming wire and/or one or more papermaking belts such that an embryonic fibrous structure is formed. After drying and/or bonding the fibers of the embryonic fibrous structure together, a fibrous structure is formed. Further processing of the fibrous structure can then be carried out after the papermaking process. For example, the fibrous structure can be wound on the reel and/or ply-bonded and/or embossed. As further discussed herein, visually distinct features may be imparted to the fibrous structures in different ways. In a first method, the fibrous structures can have visually distinct features added during the papermaking process. In a second method, the fibrous structures can have visually distinct features added during the converting process (i.e., after the papermaking process). Some fibrous structure examples disclosed herein may have visually distinct features added only during the papermaking process, and some fibrous structure examples may have visually distinct features added both during the papermaking process and the converting process.

Regarding the first method, a wet-laid papermaking process can be designed such that the fibrous structure has visually distinct features "wet-formed" during the papermaking process. Any of the various forming wires and papermaking belts utilized can be designed to leave physical, three-dimensional features within the fibrous structure. Such three-dimensional features are well known in the art, particularly in the art of "through air drying" (TAD) papermaking processes, with such features often being referred to in terms of "knuckles" and "pillows." "Knuckles," or "knuckle regions," are typically relatively high-density regions that are wet-formed within the fibrous structure (extending from a pillow surface of the fibrous structure) and correspond to the knuckles of a papermaking belt, i.e., the filaments or resinous structures that are raised at a higher elevation than other portions of the belt. "Relatively high density" (e.g., 22-2 in FIGS. 21A-C) as used herein means a portion of a fibrous structure having a density that is higher than a relatively low-density portion of the fibrous structure. Relatively high density can be in the range of 0.1 to $g/cm^3$, for example, relative to a low density that can be in the range of 0.02 $g/cm^3$ to 0.09 $g/cm^3$.

Likewise, "pillows," or "pillow regions," are typically relatively low-density regions that are wet-formed within the fibrous structure and correspond to the relatively open regions between or around the knuckles of the papermaking belt. The pillow regions form a pillow surface of the fibrous structure from which the knuckle regions extend. "Relatively low density" (e.g., pillow region 22-1 in FIGS. 21A-C) as used herein means a portion of a fibrous structure having a density that is lower than a relatively high-density portion of the fibrous structure. Further, the knuckles and pillows wet-formed within a fibrous structure can exhibit a range of basis weights and/or densities relative to one another, as varying the size of the knuckles or pillows on a papermaking belt can alter such basis weights and/or densities. A fibrous structure (e.g., sanitary tissue products) made through a TAD papermaking process as detailed herein is known in the art as "TAD paper."

Thus, in the description herein, the terms "knuckles" or "knuckle regions," or the like can be used to reference either the raised portions of a papermaking belt or the densified, raised portions wet-formed within the fibrous structure made on the papermaking belt (i.e., the raised portions that extend from a surface of the fibrous structure), and the meaning should be clear from the context of the description herein. Likewise "pillows" or "pillow regions" or the like can be used to reference either the portion of the papermaking belt between or around knuckles (also referred to herein and in the art as "deflection conduits" or "pockets"), or the relatively uncompressed regions wet-formed between or around the knuckles within the fibrous structure made on the papermaking belt, and the meaning should be clear from the context of the description herein. Knuckles or pillows can each be either continuous or discrete, as described herein. As shown in FIGS. 5 and 6 and later described below, such illustrated masks would be used in producing papermaking belts that would create fibrous structures that have discrete knuckles and continuous/substantially continuous pillows. As shown in FIGS. 7 and 8 and later described below, such illustrated masks would be used in producing papermaking belts that would create fibrous structures that have discrete pillows and continuous/substantially continuous knuckles. The term "discrete" as used herein with respect to knuckles and/or pillows means a portion of a papermaking belt or fibrous structure that is defined or surrounded by, or at least mostly defined or surrounded by, a continuous/substantially continuous knuckle or pillow. The term "continuous/substantially continuous" as used herein with respect to knuckles and/or pillows means a portion of a papermaking belt or fibrous structure network that fully, or at least mostly, defines or surrounds a discrete knuckle or pillow. Further, the substantially continuous member can be interrupted by macro patterns formed in the papermaking belt, as disclosed in U.S. Pat. No. 5,820,730 issued to Phan et al. on Oct. 13, 1998.

Knuckles and pillows in paper towels and bath tissue can be visible to the retail consumer of such products. The knuckles and pillows can be imparted to a fibrous structure from a papermaking belt at various stages of the papermaking process (i.e., at various consistencies and at various unit operations during the drying process) and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured resin on a woven reinforcing member, of which aspects of the present disclosure are an improvement. But in addition, the improvements detailed herein can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present disclosure can provide the relatively large recessed pockets and sufficient knuckle dimensions to redistribute the fiber upon high impact creping in a creping nip between a backing roll and the fabric to form additional bulk in conventional wet-laid press processes. Likewise, when utilized as a belt in a belt crepe method, a papermaking belt of the present disclosure can provide the fiber enriched dome regions arranged in a repeating pattern corresponding to the pattern of the papermaking belt, as well as the interconnected plurality of surrounding areas to form additional bulk and local basis weight distribution in a conventional wet-laid process. In addition, the improvements detailed herein, including the formation of discrete cells comprising leg(s) and/or a concavity(ies), can be utilized as an uncreped through air dried (UCTAD) belt. UCTAD (un-creped through air drying) is a variation of the TAD process in which the sheet is not creped, but rather dried up to 99% solids using thermal drying, removed from the structured fabric, and then optionally calendered and reeled. U.S. Pat. No. 6,808,599 describes an uncreped through air dried process. U.S. Pat. No. 10,610,063 describes an uncreped through air dried product made using a belt. In addition, the improvements herein can be utilized as an ATMOS belt. The ATMOS process has been developed by the Voith company and marketed under the name ATMOS. The process/method and paper machine system has several variations, but all involve the use of a structured fabric in conjunction with a belt press. This process is described in numerous patent publications including U.S. Pat. Nos. 7,510,631, 7,686,923, 7,931,781, 8,075,739, and 8,092,652. In addition, the improvements herein can be utilized as an NTT belt. The NTT process has been developed by the Metso company and marketed under the name NTT. The NTT process includes an extended press nip where the sheet is transferred from a press felt onto a texturing belt. Examples of texturing belts used in the NTT process can be viewed in International Publication Number WO 2009/067079 A1 and US Patent Application Publication No. 2010/0065234 A1. As said, all such processes of this paragraph may be utilized to form the discrete cells of the present disclosure.

An example of a papermaking belt structure of the general type useful in the present disclosure and made according to the disclosure of U.S. Pat. No. 4,514,345 is shown in FIG. 1. As shown, the papermaking belt 2 can include cured resin elements 4 forming knuckles 20 on a woven reinforcing member 6. The reinforcing member 6 can be made of woven filaments 8 as is known in the art of papermaking belts, for example resin coated papermaking belts. The papermaking belt structure shown in FIG. 1 includes discrete knuckles 20 and a continuous deflection conduit, or pillow region. The discrete knuckles 20 can wet-form densified knuckles within the fibrous structure made thereon; and, likewise, the continuous deflection conduit, i.e. pillow region, can wet-form a continuous pillow region within the fibrous structure made thereon. The knuckles can be arranged in a pattern described with reference to an X-Y coordinate plane, and the distance between knuckles 20 in at least one of the X or Y directions can vary according to the examples disclosed herein. For clarity, a fibrous structure's visually distinct knuckle(s) and pillow(s) that are wet-formed in a wet-laid papermaking process are different from, and independent of, any further structure added to the fibrous structure during later, optional, converting processes (e.g., one or more embossing process).

After completion of the papermaking process, a second way to provide visually distinct features to a fibrous structure is through embossing. Embossing is a well-known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements ("embossed regions") in the fibrous structure while leaving an uncompressed, or substantially uncompressed, relatively low density continuous, or substantially continuous, network ("non-embossed regions") at least partially defining or surrounding the relatively high density discrete elements.

Embossed features in paper towels and bath tissues can be visible to the retail consumer of such products. Such patterns are well known in the art and can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014. For clarity, such embossed features originate during the converting process, and are different from, and independent of, the pillow and knuckle features that are wet-formed on a papermaking belt during a wet-laid papermaking process as described herein.

In one example, a fibrous structure of the present disclosure has a pattern of knuckles and pillows imparted to it by a papermaking belt having a corresponding pattern of knuckles and pillows that provides for superior product performance over known fibrous structures and is visually appealing to a retail consumer.

In another example, a fibrous structure of the present disclosure has a pattern of knuckles and pillows imparted to it by a papermaking belt having a corresponding pattern of knuckles and pillows, as well as an emboss pattern, which together provide for an overall visual appearance that is appealing to a retail consumer.

In another example, a fibrous structure of the present disclosure has a pattern of knuckles and pillows imparted to it by a papermaking belt having a corresponding pattern of knuckles and pillows, as well as an emboss pattern, which together provide for an overall visual appearance that is appealing to a retail consumer and exhibit superior product performance over known fibrous structures.

Fibrous Structures

The fibrous structures of the present disclosure can be single-ply or multi-ply and may comprise cellulosic pulp fibers. Other naturally-occurring and/or non-naturally occurring fibers can also be present in the fibrous structures. In some examples, the fibrous structures can be wet-formed and through-air dried in a TAD process, thus producing TAD paper. The fibrous structures can be marketed as single- or multi-ply sanitary tissue products.

The fibrous structures detailed herein will be described in the context of paper towels, and in the context of a papermaking belt comprising cured resin on a woven reinforcing member. However, the scope of disclosure is not limited to paper towels (scope also includes, for example, other sanitary tissues such as toilet tissue and facial tissue) and includes other known processes that impart the knuckles and pillow patterns described herein, including, for example, the fabric crepe and belt crepe processes described above, and modified as described herein to produce the papermaking belts and paper as detailed herein.

In general, examples of the fibrous structures can be made in a process utilizing a papermaking belt that has a pattern of cured resin knuckles on a woven reinforcing member of the type described in reference to FIG. 1. The resin pattern is dictated by a patterned mask having opaque regions and transparent regions. The transparent regions permit curing radiation to penetrate and cure the resin, while the opaque regions prevent the radiation from curing portions of the resin. Once curing is achieved and the patterned mask is removed, the uncured resin is washed away to leave a pattern of cured resin that is substantially identical to the mask pattern. The cured resin portions are the knuckles of the papermaking belt, and the areas between/around the cured resin portions are the pillows or deflection conduits of the belt. Thus, the mask pattern is replicated in the cured resin pattern of the papermaking belt, which is essentially replicated again in the fibrous structure made on the papermaking belt. Therefore, in describing the fibrous structures' patterns of knuckles and pillows herein, a description of the patterned mask can serve as a proxy. One skilled in the art will understand that the dimensions and appearance of the patterned mask are essentially identical to the dimensions and appearance of the papermaking belt made through utilization of the mask. One skilled in the art will further understand that the dimensions and appearance of the wet-laid fibrous structure made on the papermaking belt are also essentially identical to the dimensions and appearance of the patterned mask. Further, in processes that use a papermaking belt that are not made from a mask, the dimensions and appearance of the papermaking belt are also imparted to the fibrous structure, such that the dimensions of features of such papermaking belt can also be measured and characterized as a proxy for the dimensions and characteristics of the fibrous structure produced thereon.

Figure 2:
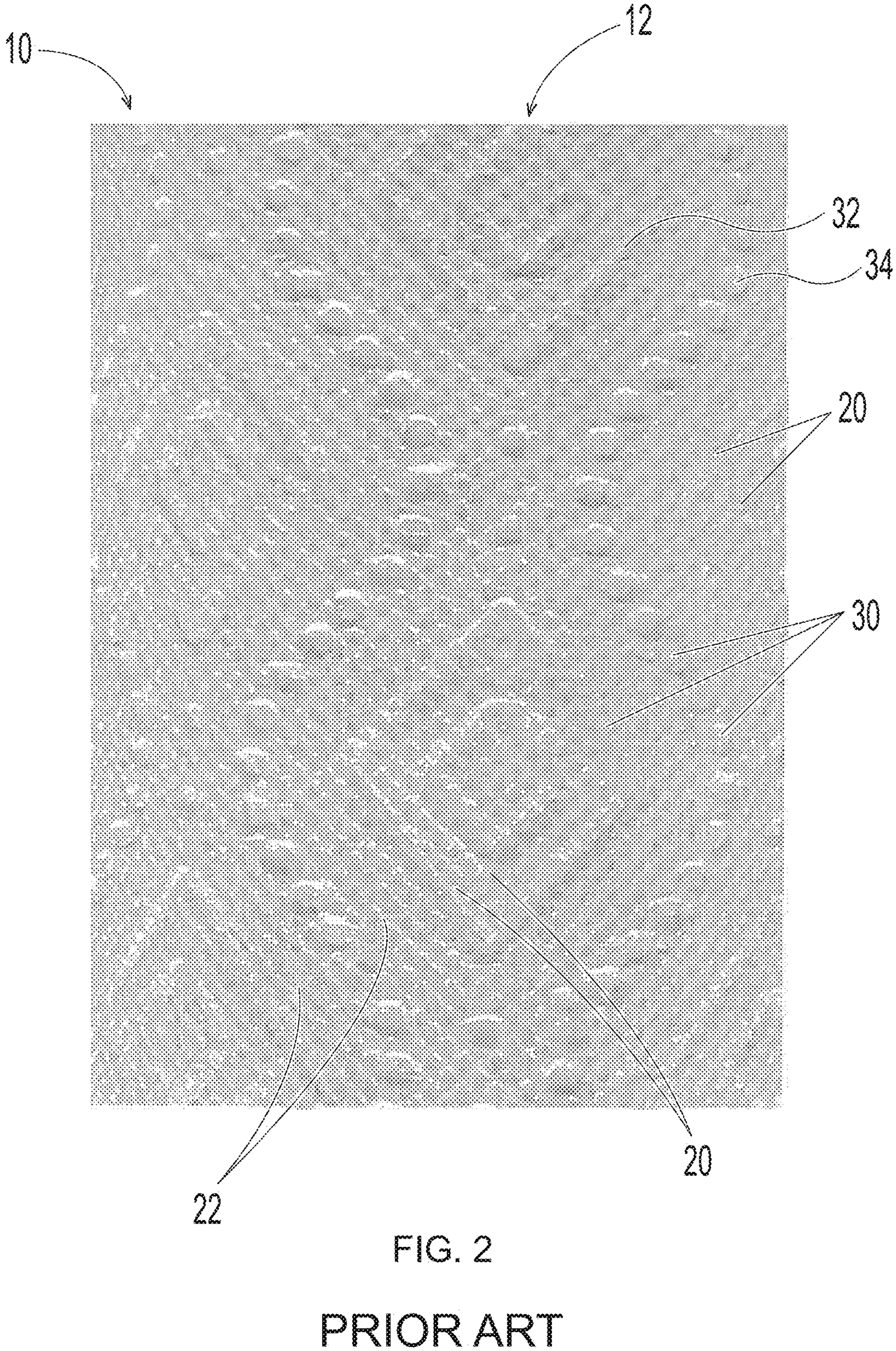
FIG. 2 PRIOR ART
FIG. 2 is a photograph of a portion of a paper towel product previously marketed by The Procter & Gamble Co.
Figure 3:
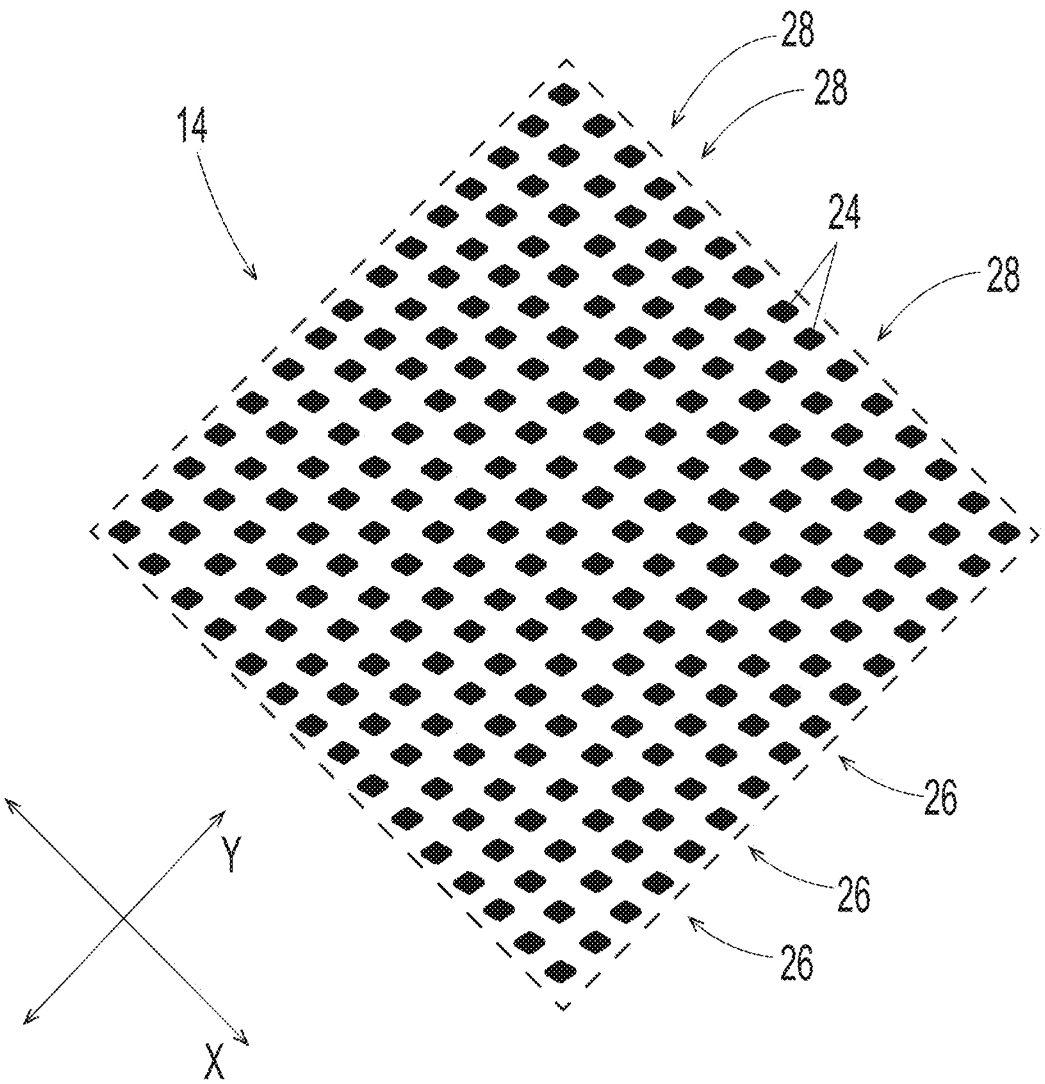
FIG. 3 PRIOR ART
FIG. 3 is a plan view of a portion of a mask pattern used to make the papermaking belt that produced the paper towel of FIG. 2.

FIG. 2 illustrates a portion of a sheet on a roll 10 of sanitary tissue 12 previously marketed by The Procter & Gamble Co. as BOUNTY® paper towels. FIG. 3 shows the mask 14 used to make the papermaking belt (actual belt not shown, but of the general type shown in FIG. 1, having a pattern of knuckles corresponding to the black portions of the mask of FIG. 3) that made the sanitary tissue 12 shown in FIG. 2. As shown, sanitary tissue 12 exhibits a pattern of knuckles 20 which were formed by discrete cured resin knuckles on a papermaking belt, and which correspond to the black areas, referred to as cells 24 of the mask 14 shown in FIG. 3. Any portion of the pattern of FIG. 3 that is black represents a transparent region of the mask, which permits UV-light curing of UV-curable resin to form a knuckle on the papermaking belt. Likewise, each knuckle on the papermaking belt forms a knuckle 20 in sanitary tissue 12, which is a relatively high-density region and/or a region of different basis weight relative to the pillow regions. Any portion of the pattern of FIG. 3 that is white represents an opaque region of the mask, which blocks UV-light curing of the UV-curable resin. After the mask is removed, the uncured resin is ultimately washed away to form a deflection conduit on the papermaking belt. When a fibrous structure is made on the papermaking belt, the fibers will wet-form into the deflection conduit to form a relatively low-density pillow 22 within the fibrous structure.

As used herein, the term "cell" is used to represent a discrete element of a mask, belt, or fibrous structure. Thus, as illustrated in FIGS. 3, 5 and 6, the term "cell" can represent discrete black (transparent) portions of a mask, a discrete resinous element on a papermaking belt, or a discrete relatively high density/basis weight portion of a fibrous structure. The method of identifying one or more cells from a fibrous sample can be determined according to the Micro-CT Intensive Property Method below. In the description of FIGS. 3, 5, and 6 herein, the schematic representation of cells 24 can be considered representations of a discrete element of one or more transparent portions of a mask, one or more knuckles on a papermaking belt, or one or more knuckles in a fibrous structure. But the examples detailed herein are not limited to one method of making, so the term cell can refer to a discrete feature such as a raised element, a dome-shaped element or knuckle formed by belt or fabric creping on a fibrous structure, for example. Further, as illustrated in FIGS. 7 and 8, the term "cell" can also represent discrete white (opaque) portions of a mask, a discrete deflection conduit in a papermaking belt, or a discrete relatively low density/basis weight portion of a fibrous structure. In the description of FIGS. 7 and 8 herein, the schematic representation of cells 24 can be considered representations of a discrete element of one or more opaque portions of a mask, one or more deflection conduit on a papermaking belt, or one or more pillows in a fibrous structure. But the examples detailed herein are not limited to one method of making, so the term cell can also refer to a discrete feature such as a depressed element, a convex-shaped element or pillow formed by belt or fabric creping on a fibrous structure, for example.

The fibrous structures illustrated herein either exhibit a structure of discrete pillows and a continuous/substantially continuous knuckle region, or a structure of discrete knuckles and a continuous/substantially continuous pillow region. However, for every example described or illustrated herein, the inverse of such structure is also contemplated. In other words, if a structure of discrete knuckles and a continuous/substantially continuous pillow region is shown, an inverse similar structure of continuous/substantially continuous knuckles and discrete pillows is also contemplated. Moreover, in regard to the papermaking belts, as can be understood by the description herein, the inverse relationship can be achieved by inverting the black and white (or, more generally, the opaque and transparent) portions of the mask used to make the belt that is used to make the fibrous structure. This inverse relation (black/white) can apply to all patterns of the present disclosure, although all fibrous structures/patterns of each category are not illustrated for brevity. The papermaking belts of the present disclosure and the process of making them are described in further detail below.

The BOUNTY® paper towel shown in FIG. 2 has enjoyed tremendous market success. The product's performance together with its aesthetic visual appearance has proven to be very desirable to retail consumers. The visual appearance is due to the pattern of knuckles 20 and pillows 22 and the pattern of embossments 30. As shown, the previously marketed BOUNTY® paper towel product has both line embossments 32 and "dot" embossments 34. Embossments of the present disclosure may have an Emboss Height 53 from about 0.25 inches to about 11 inches, from about 0.25 inches to about 6 inches, or from about 0.468 inches to about 1.38 inches, specifically reciting all 0.25 inch increments within the above-recited ranges and all ranges formed therein or thereby; and may have an Emboss Width 51 from about 0.25 inches to about 11 inches, from about 0.25 inches to about 6 inches, or from about 0.468 inches to about 1.38 inches, specifically reciting all 0.25 inch increments within the above-recited ranges and all ranges formed therein or thereby. The pattern of knuckles 20 and pillows 22 is considered the "wet-formed" background pattern, and the pattern of embossments 30 overlaid thereon is considered "dry-formed". Thus, the pattern of knuckles and pillows and the embossments together give the paper towel its visual appearance. The previously marketed BOUNTY® paper towel shown in FIG. 2 will be used to contrast the newly disclosed examples of fibrous structures detailed herein. Thus, the newly disclosed examples of fibrous structures detailed herein are an improvement over such previously marketed BOUNTY® paper towels, with some of the improvements described below.

The previously marketed BOUNTY® paper towel product shown in FIG. 2 has a pattern of discrete knuckles and a continuous pillow region. As more clearly seen in the mask of FIG. 3, the cell 24 shape and orientation are both constant and the cells are ordered in straight rows 26, 28. One set of rows 26 is oriented in a direction that is parallel to the X-axis (i.e., in an X-direction) and one set of rows 28 is oriented in a direction that is parallel to the Y-axis (i.e., in a Y-direction). In other words, all cells 24 of the mask/fibrous structure will be a member of a row 26 that is oriented in an X-direction and will also be a member of a row 28 that is oriented in a Y-direction. The cell 24 knuckle size varies but the Distance Between Cells (as detailed below below) is constant. In other previously and currently marketed BOUNTY® paper towels (not illustrated), the fibrous structure patterns included a constant knuckle size and a varied Distance Between Cells, or patterns where both the knuckle size and the Distance Between Cells varied.

Figure 4:
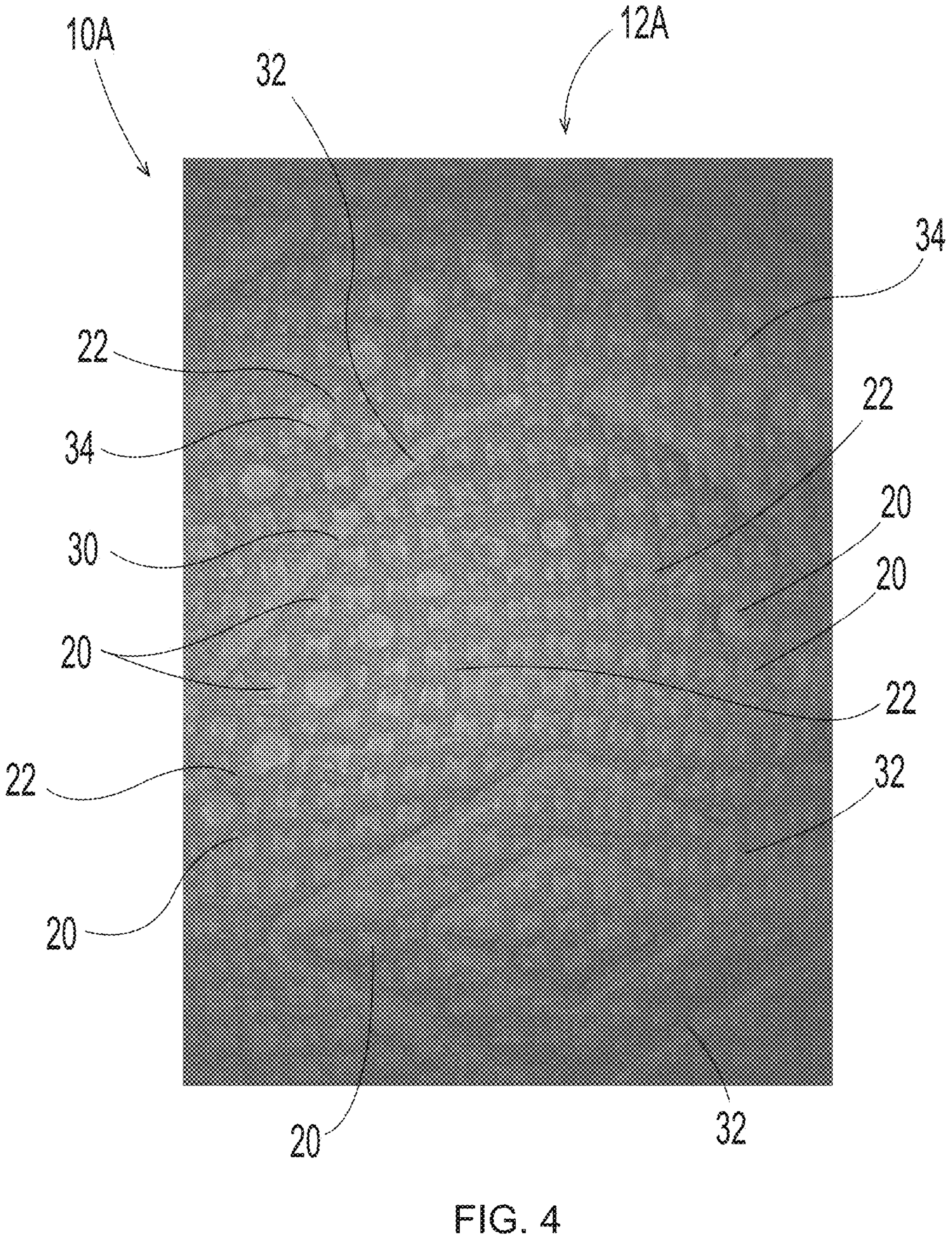
FIG. 4 is a photograph of a portion of a new fibrous structure as detailed herein.
Figure 18:
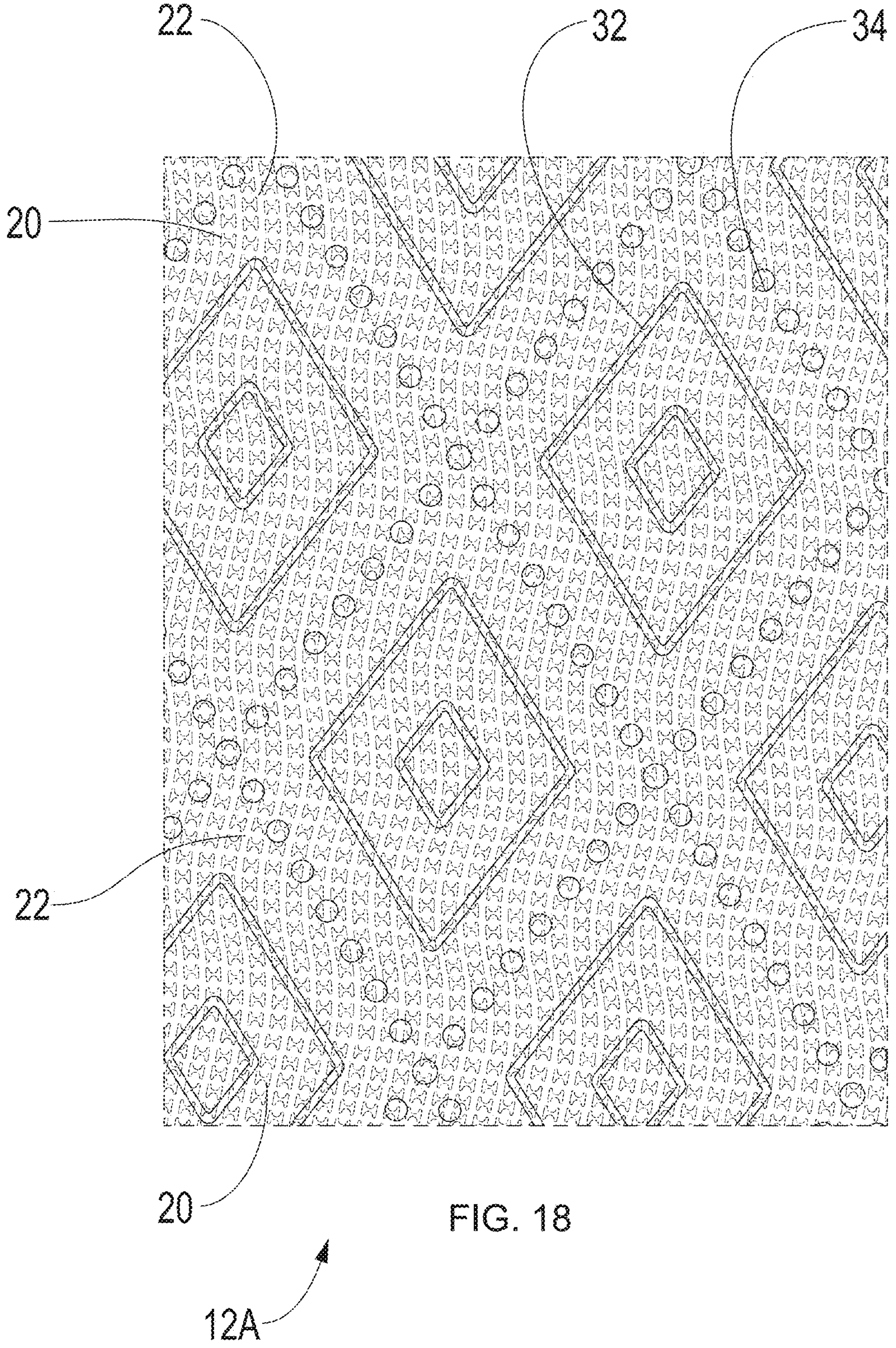
FIG. 18 is a top view of a portion of a new fibrous structure as detailed herein.
Figure 19:
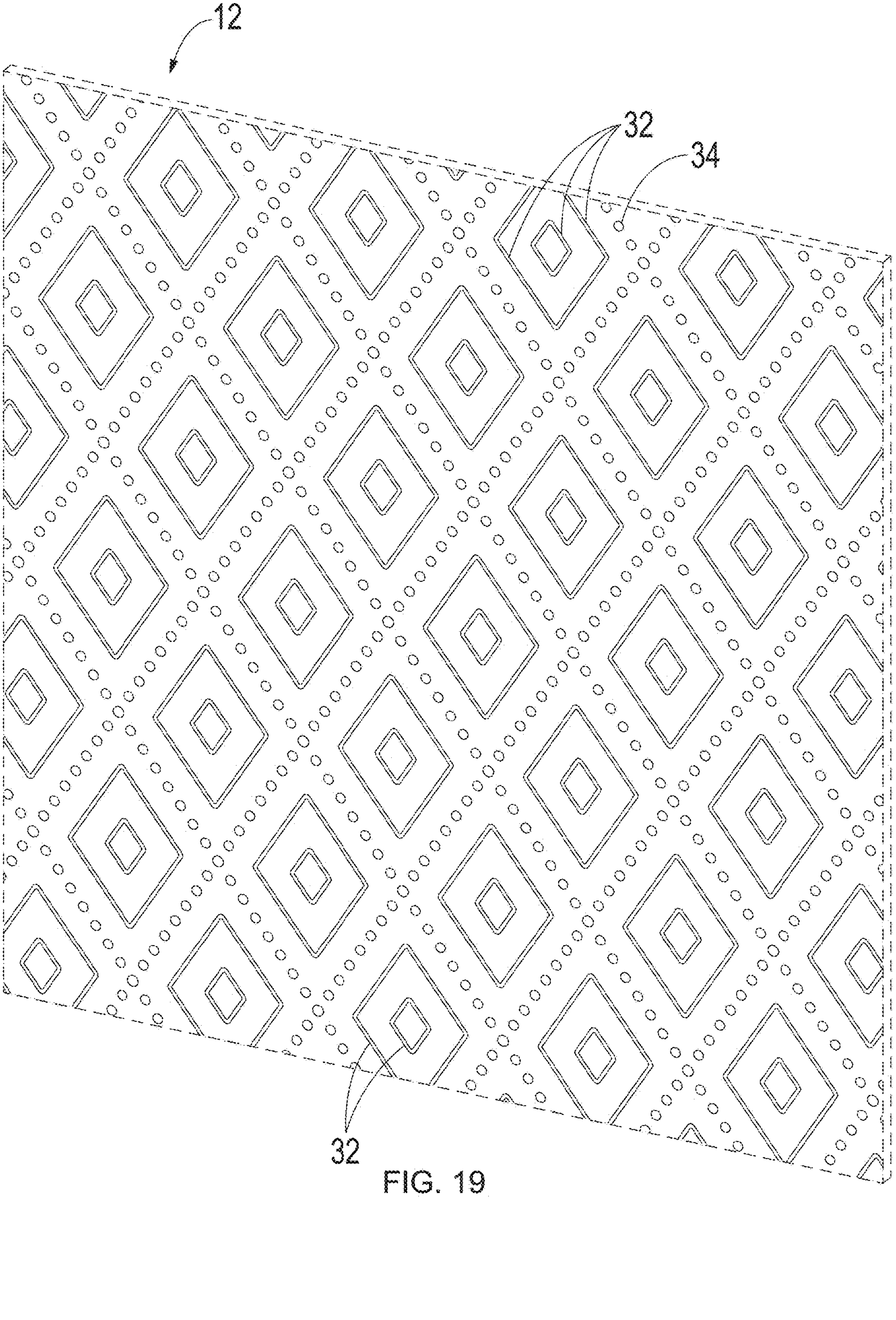
FIG. 19 is a perspective view of an emboss design as detailed herein.

To improve the product performance properties and/or aesthetics of the previously and currently marketed BOUNTY® paper towels, new patterns were created for the distribution of knuckles and pillows and/or with new cell shapes and/or sizes. FIGS. 4 and 18 illustrate an exemplary rolls 10A of sanitary tissues 12A produced with one of the new patterns. The emboss design of FIG. 18 is also illustrated in FIG. 19 and may be combined with the belt pattern designs disclosed in FIGS. 5-8 disclosed herein. Any of the emboss designs as disclosed in U.S. Design. Pat. App. Nos. 29/673,106; 29/673,105; and 29/673,107 may be used, including in combination with the belt pattern designs disclosed in FIGS. 5-8 disclosed herein. FIG. 5 shows a portion of the pattern on the mask 14A used to make the papermaking belt (not shown, but of the type shown in FIG. 1, having the pattern of knuckles corresponding to the mask of FIG. 5) that made the sanitary tissue 12A shown in FIG. 4. Again, as with the previously marketed BOUNTY® pattern above, the sanitary tissue 12A exhibits a pattern of knuckles 20 which were formed by discrete cured resin knuckles on a papermaking belt, and which correspond to the black areas, i.e., the cells 24, of the mask 14A shown in FIG. 5.

As depicted in the exemplary paper towel shown in FIG. 4, and more clearly depicted through the masks shown in FIGS. 5 and 6, the fibrous structures may have a pattern of discrete knuckles and a continuous/substantially continuous pillow region. However, in other examples the fibrous structures may also have a pattern of discrete pillows and a continuous/substantially continuous knuckle (e.g., the fibrous structures made by the masks of FIGS. 7 and 8). Whether utilizing a pattern of discrete knuckles or discrete pillows—either discrete item referred to as a "cell"—the cell 24 shape may be constant or varied, the cell 24 orientation may be constant or varied, and the cells may be ordered in a plurality of rows 26, 28.

The fibrous structures detailed herein may include a plurality of cells (e.g., discrete knuckles or discrete pillows) 24 that are formed in a shape that may include a saddle 47, at least one, at least two, at least three, at least four, at least five, or at least six legs (e.g., first leg 48 and second leg 49), and at least one, at least two, at least three, at least four, at least five, or at least six concavities 70. The Concavity Ratio Measurement (which utilizes the Micro-CT Intensive Property Method) can be used to determine the presence and extent of concavity 70 of a cell 24.

Figure 9A:
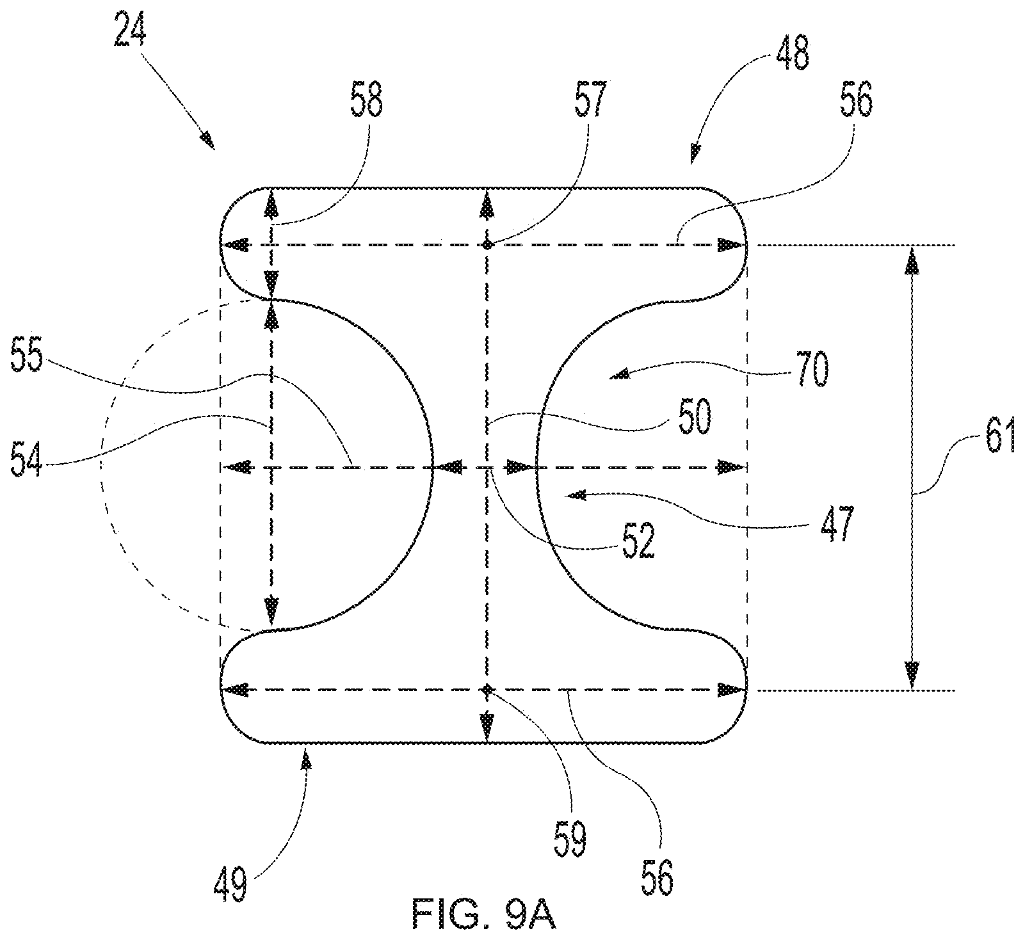
FIG. 9A is an enlarged view of one of the cells detailed in FIGS. 5 and 7.

One common, non-limiting example of an applicable shape for cell 24 would be the shape of the letter "H," such as disclosed in FIG. 9A; other shapes within the scope of the present disclosure are illustrated in FIGS. 9B-9N. As shown in FIG. 9A-N, each of the cells 24 may include a number of different measurements and measurement ratios, including, but not limited to, the identified measurements of Cell Width 50, Saddle Height 52, Saddle Width 54, Leg Length 56, and Leg Width 58. As shown in FIG. 10A-J, the area that surrounds the cells 24 (e.g., either the pillow surface surrounding the discrete wet-formed knuckles, or the wet-formed knuckle surface surrounding the discrete pillows) may also include a number of different measurements and measurement ratios, including, but not limited to, the identified measurements of Distance Between Saddles 60, a Distance Between Cells 62, First Leg Separation Distance 64, and Second Leg Separation Distance 66. FIGS. 9A and 10A are magnified views of the pattern of cells 24 as shown in FIGS. 4 and 5, and like views of alternative shapes are illustrated in FIGS. 9B-N and 10B-O.

Figure 9B:
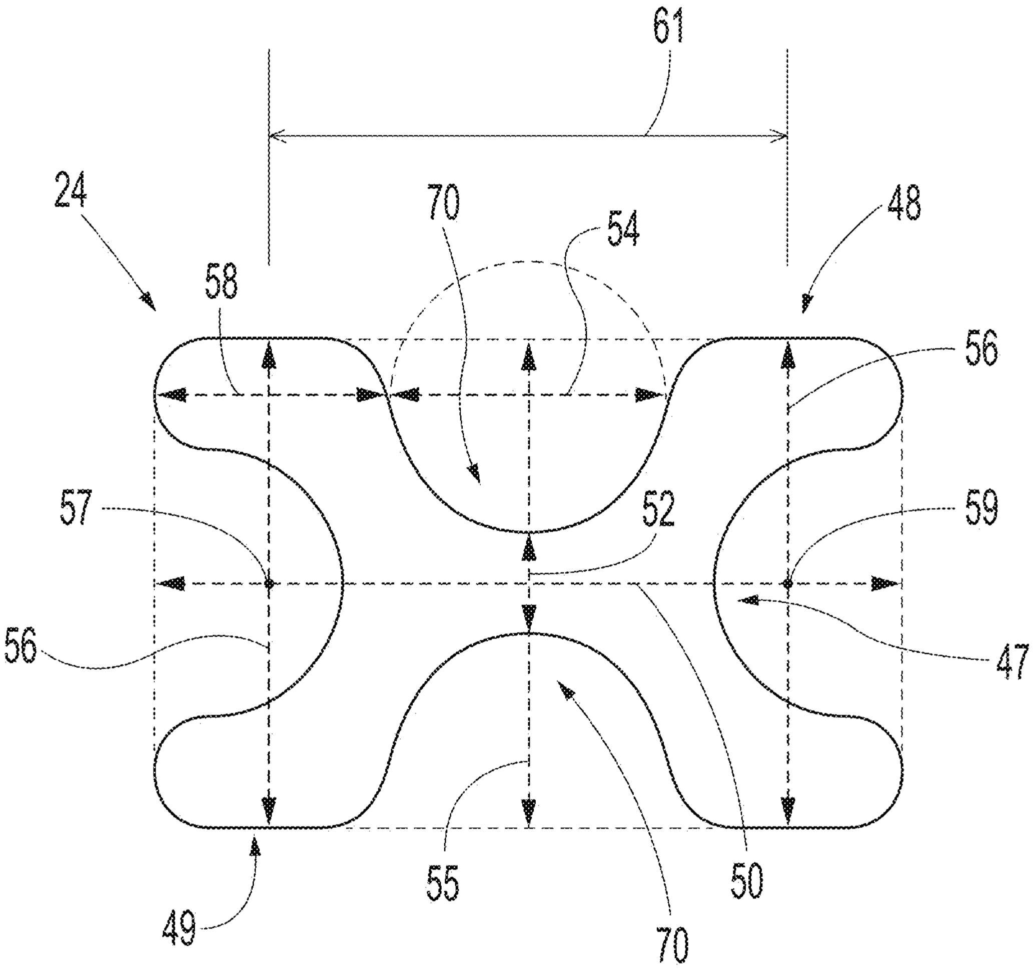
FIG. 9B is an enlarged view of a cell that may be used in the present disclosure.
Figure 9C:
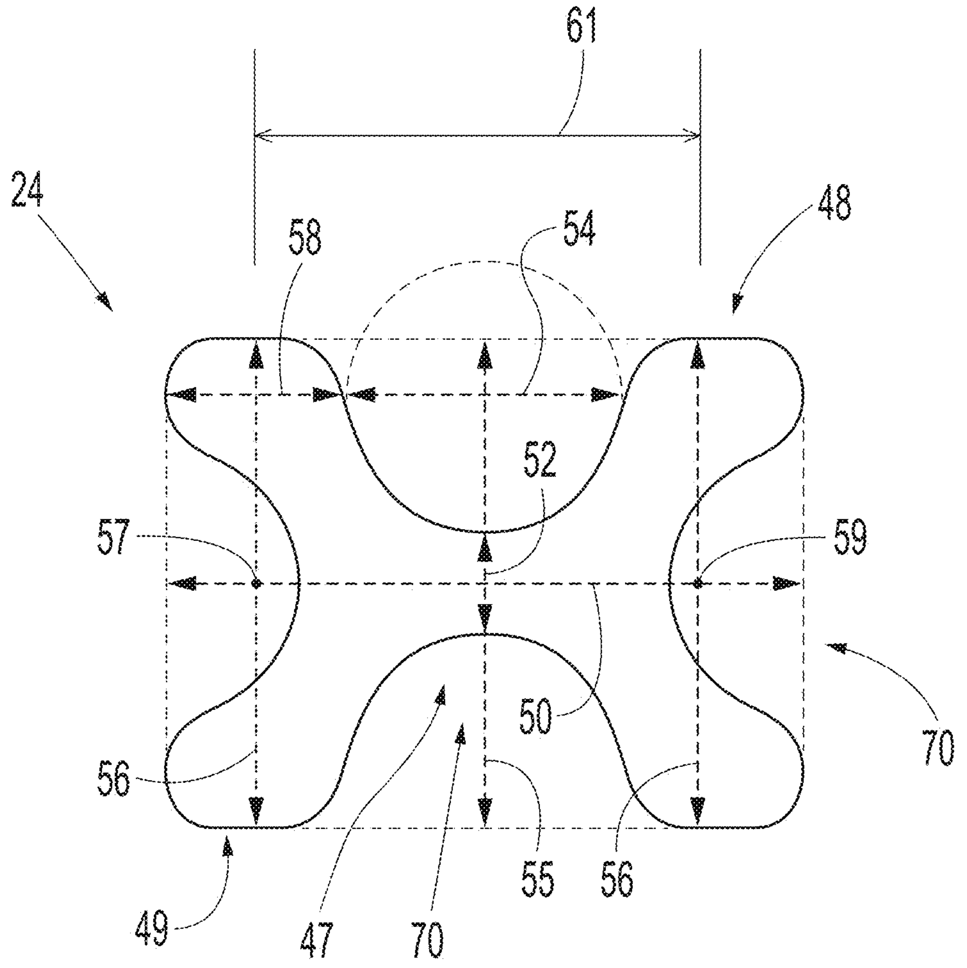
FIG. 9C is an enlarged view of a cell that may be used in the present disclosure.
Figure 9D:
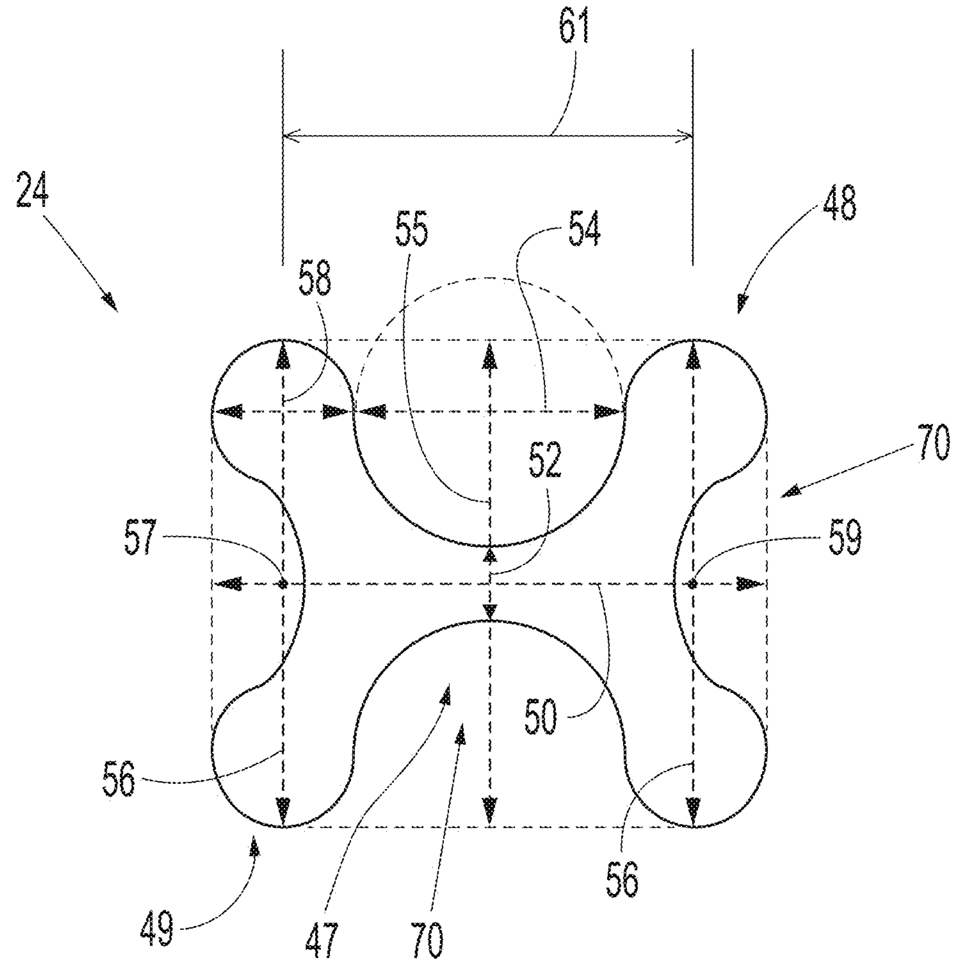
FIG. 9D is an enlarged view of a cell that may be used in the present disclosure.
Figure 9E:
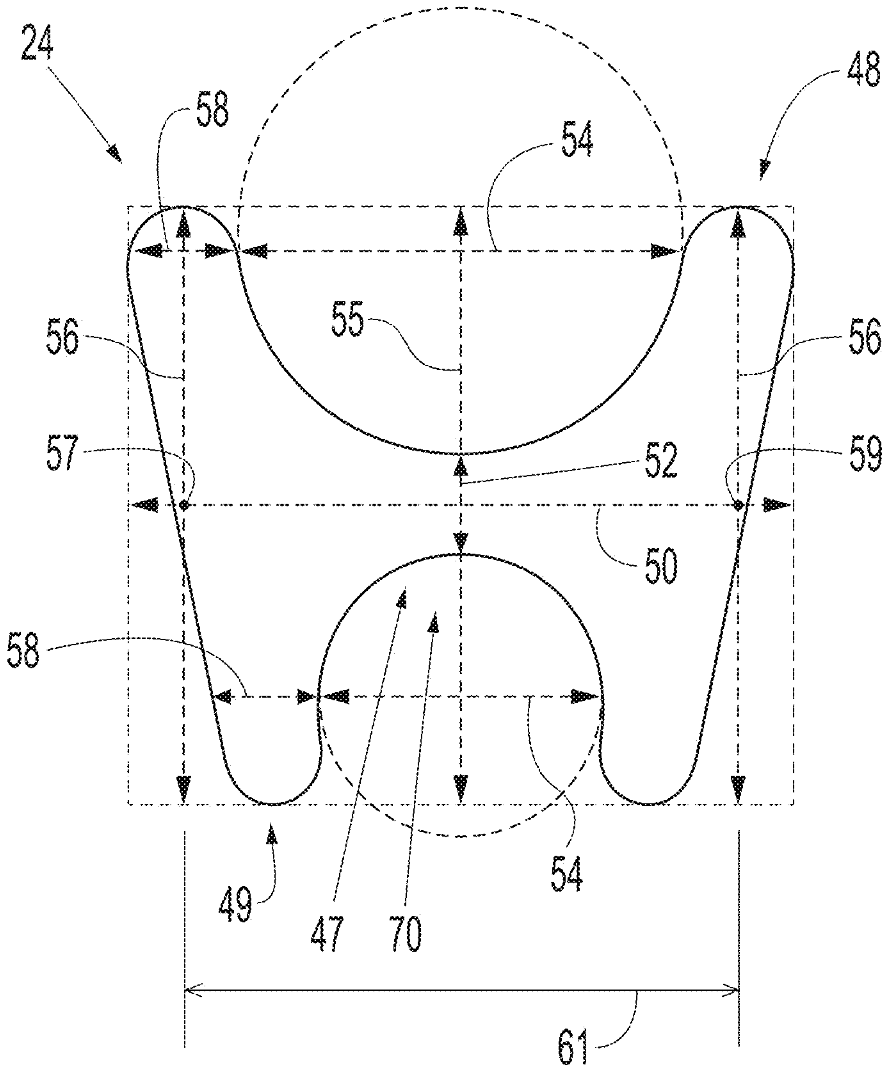
FIG. 9E is an enlarged view of a cell that may be used in the present disclosure.
Figure 9F:
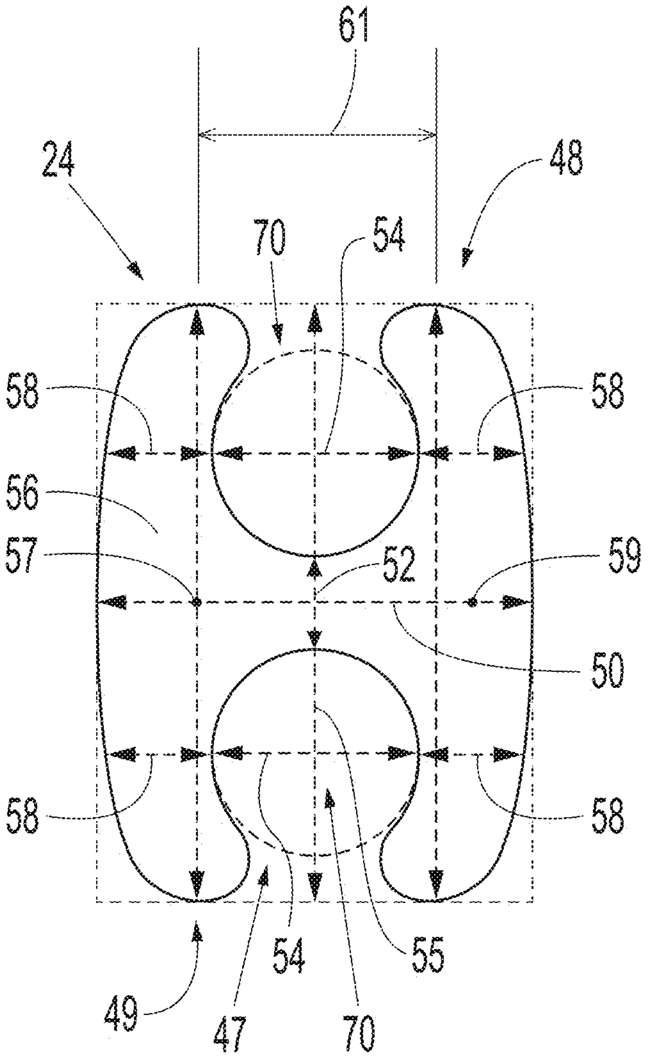
FIG. 9F is an enlarged view of a cell that may be used in the present disclosure.
Figure 9G:
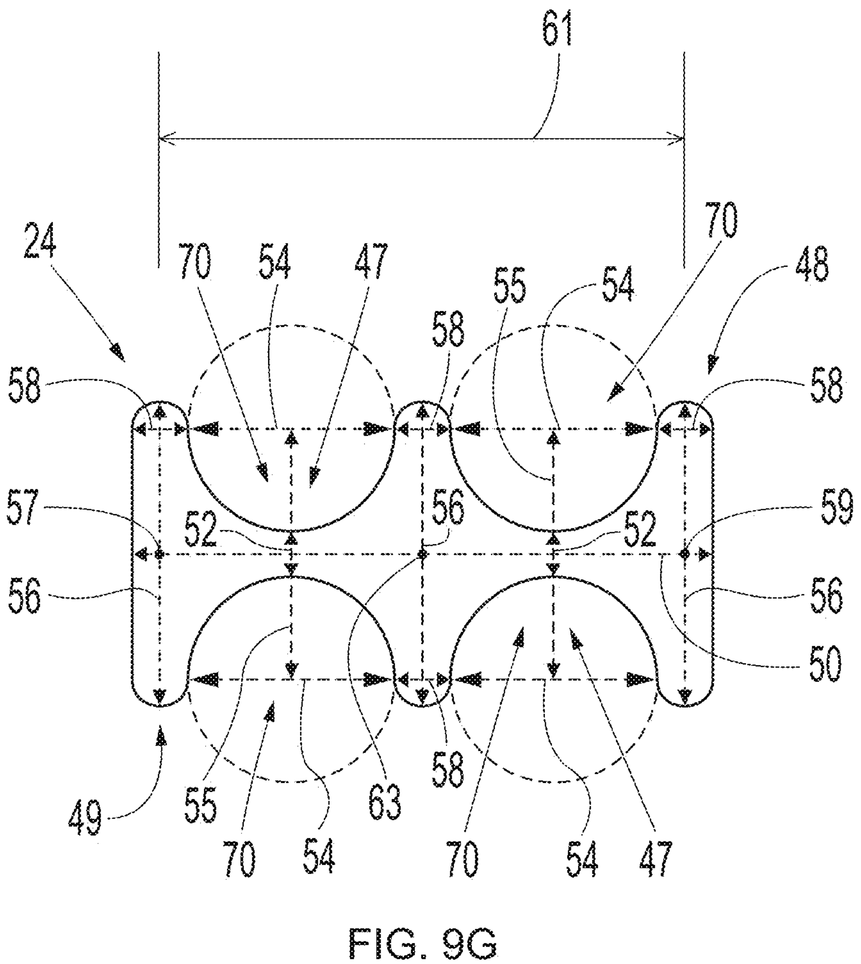
FIG. 9G is an enlarged view of a cell that may be used in the present disclosure.
Figure 9H:
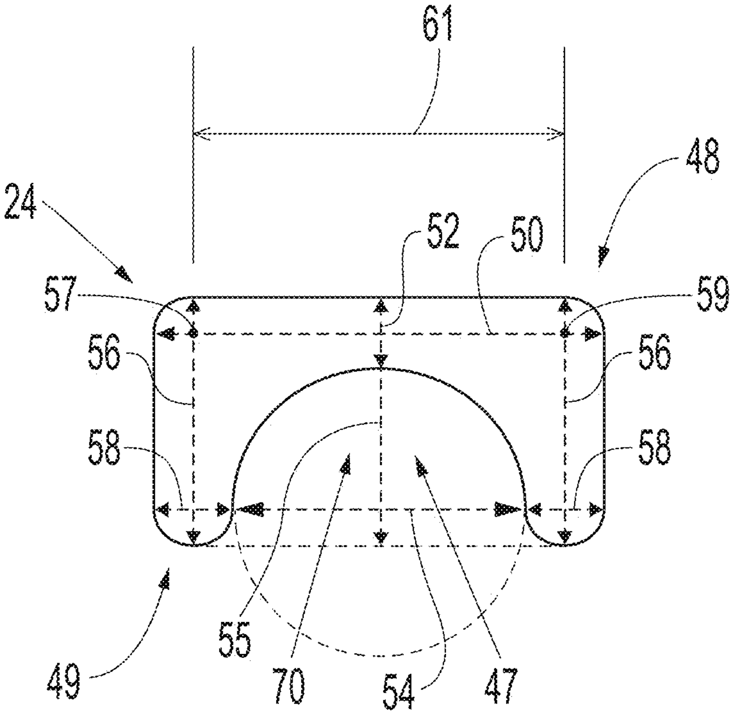
FIG. 9H is an enlarged view of a cell that may be used in the present disclosure.
Figure 9I:
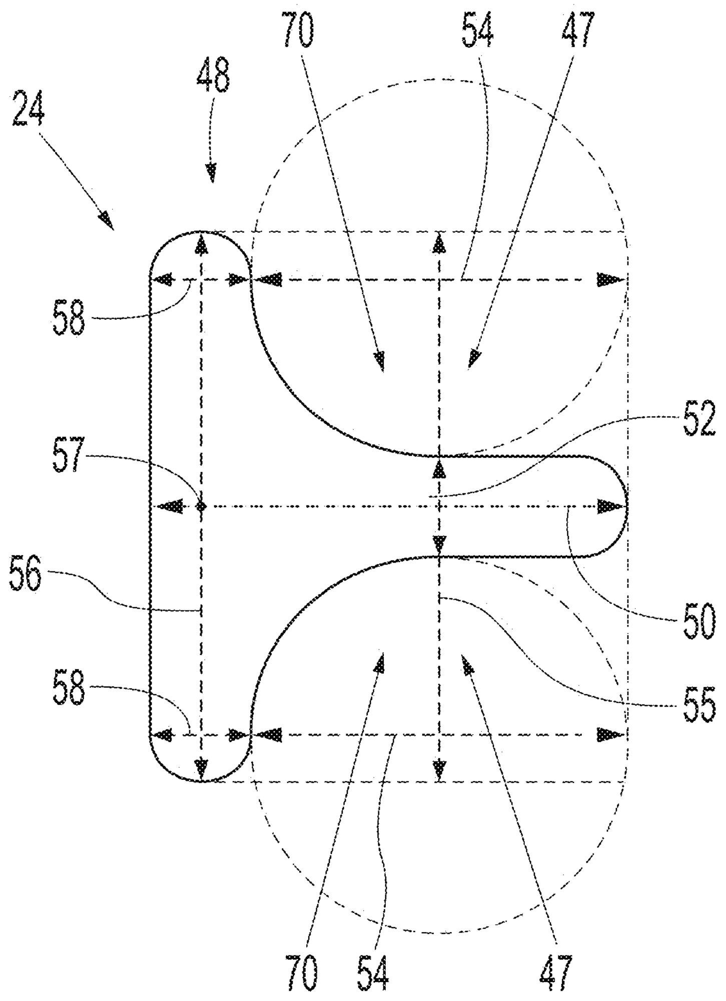
FIG. 9I is an enlarged view of a cell that may be used in the present disclosure.
Figure 9J:
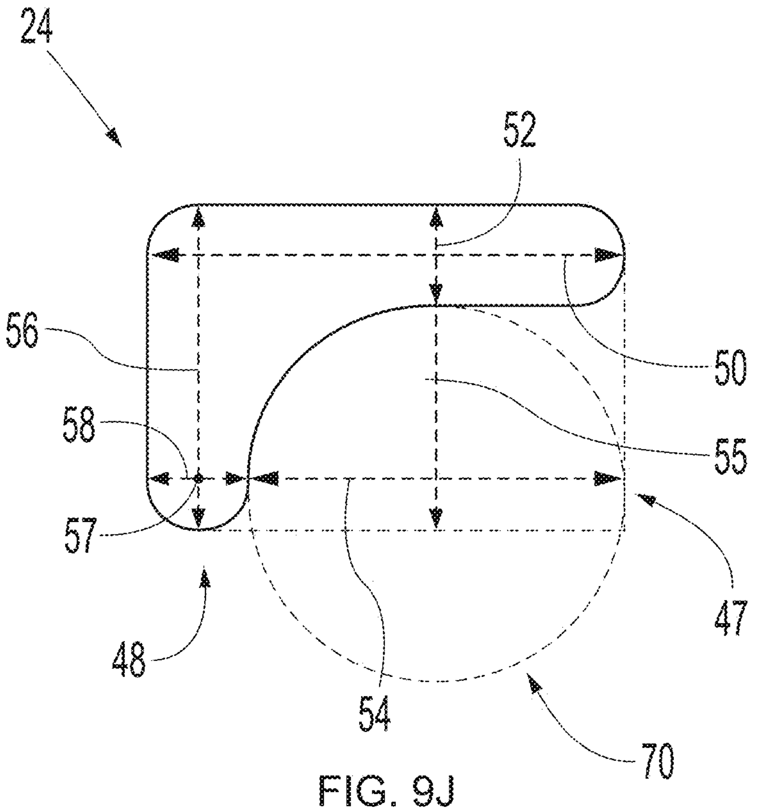
FIG. 9J is an enlarged view of a cell that may be used in the present disclosure.
Figure 9K:
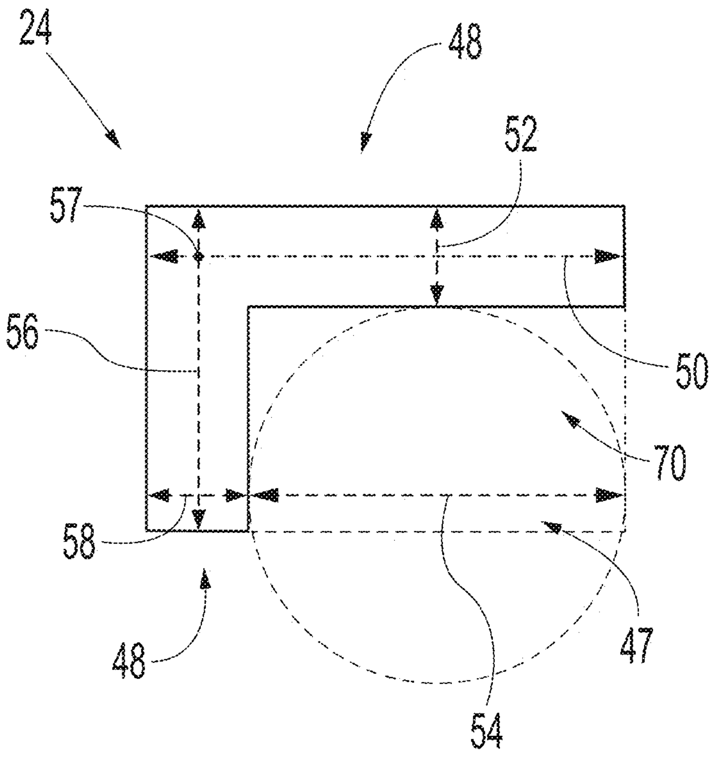
FIG. 9K is an enlarged view of a cell that may be used in the present disclosure.
Figure 9L:
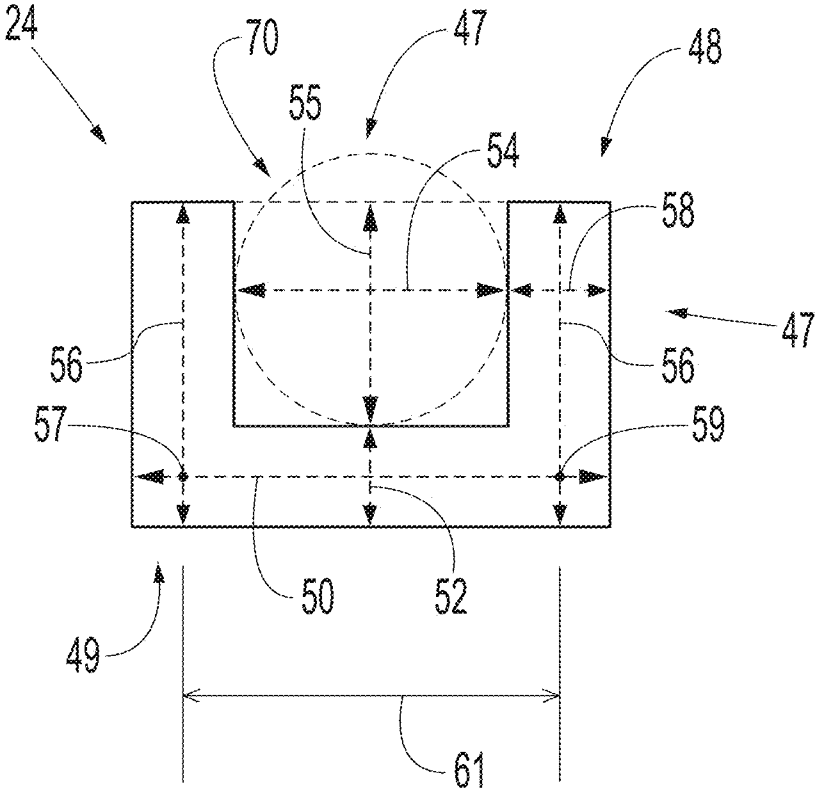
FIG. 9L is an enlarged view of a cell that may be used in the present disclosure.
Figure 9M:
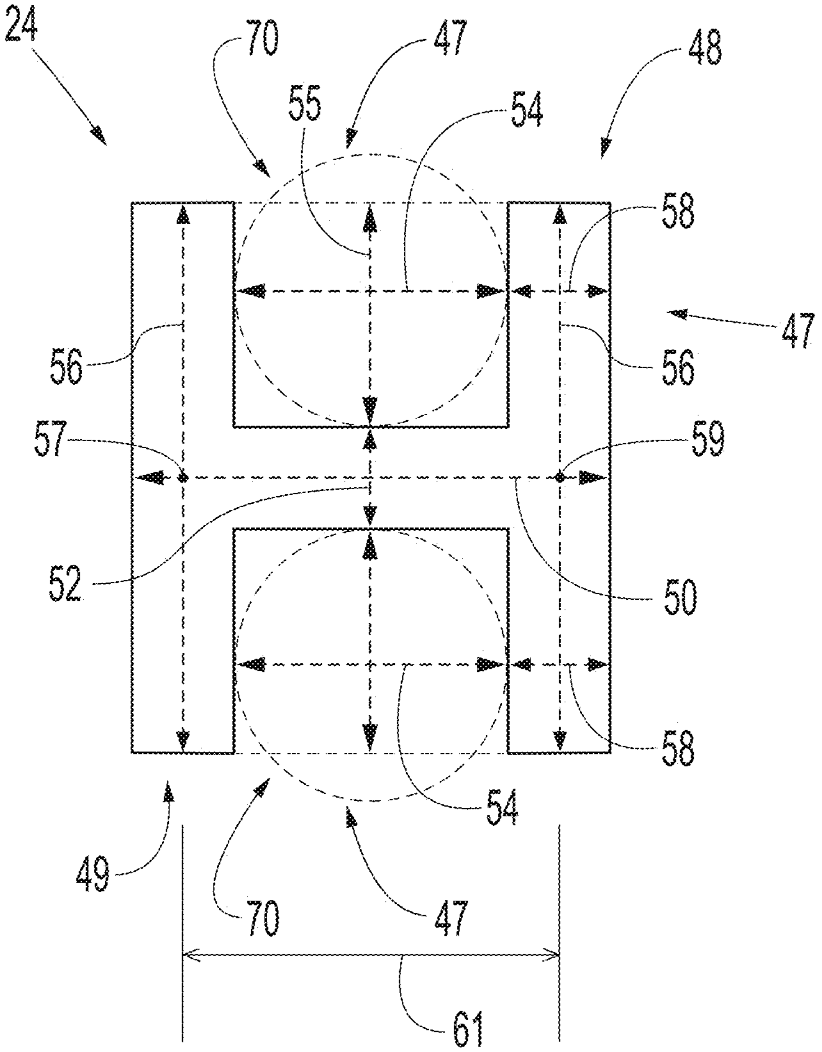
FIG. 9M is an enlarged view of a cell that may be used in the present disclosure.
Figure 9N:
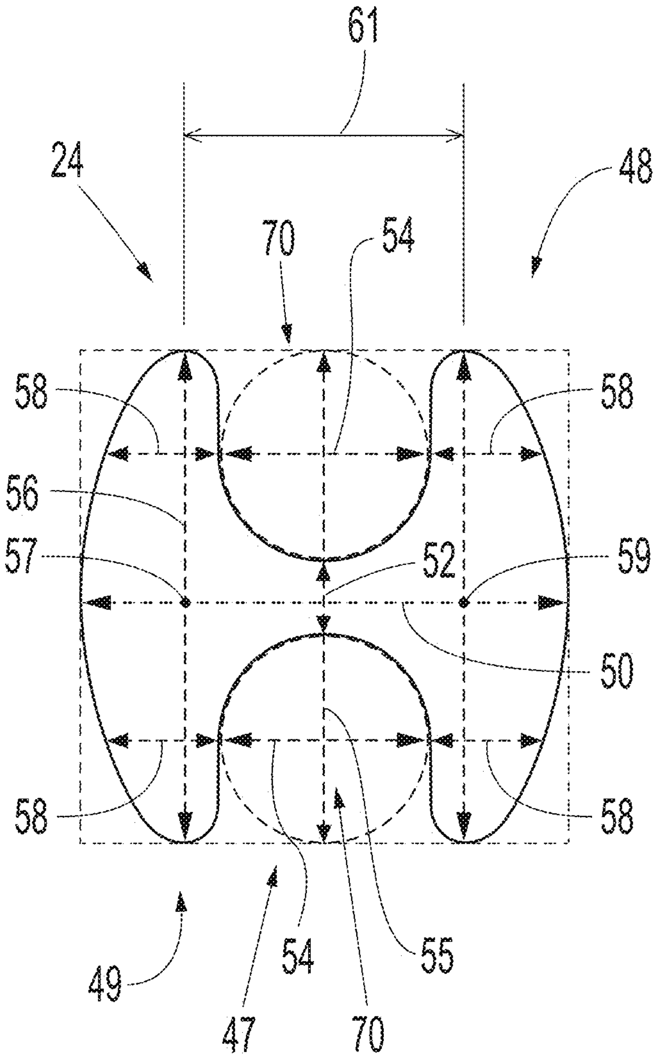
FIG. 9N is an enlarged view of a cell that may be used in the present disclosure.
Figure 10A:
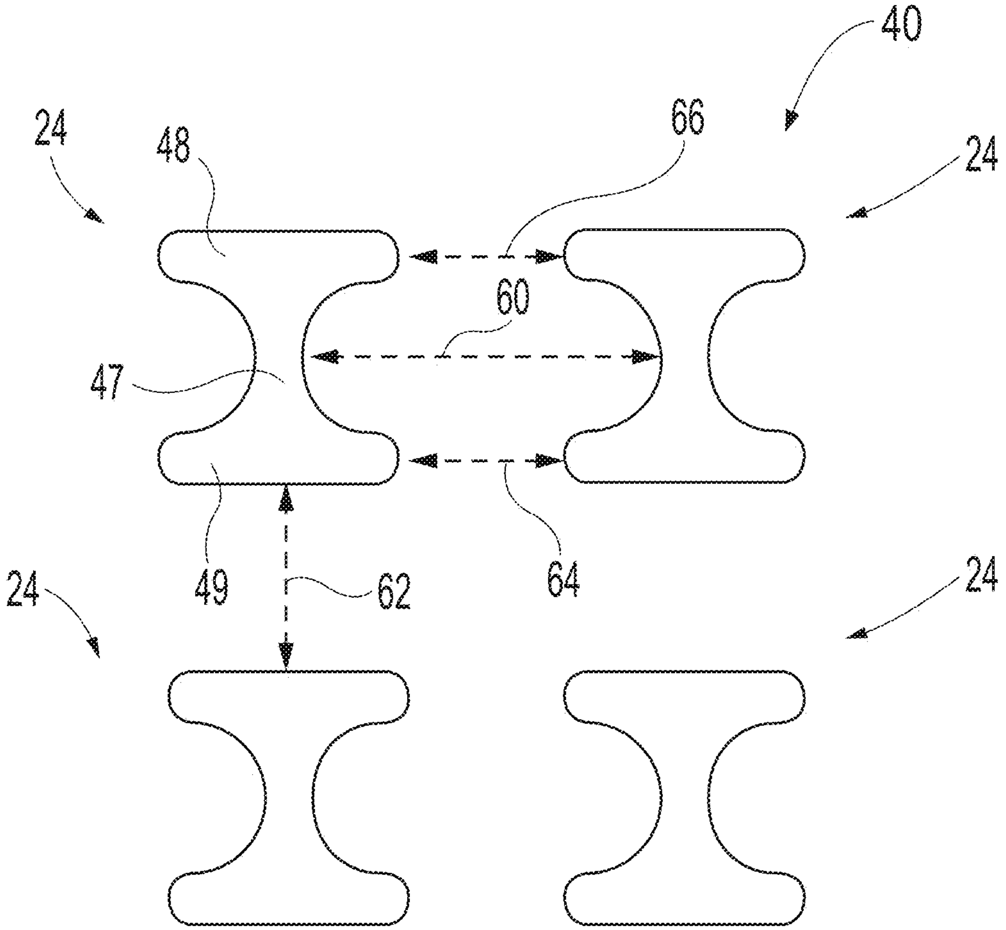
FIG. 10A is an enlarged view of a four Cell Group detailed in FIGS. 5 and 7.
Figure 10B:
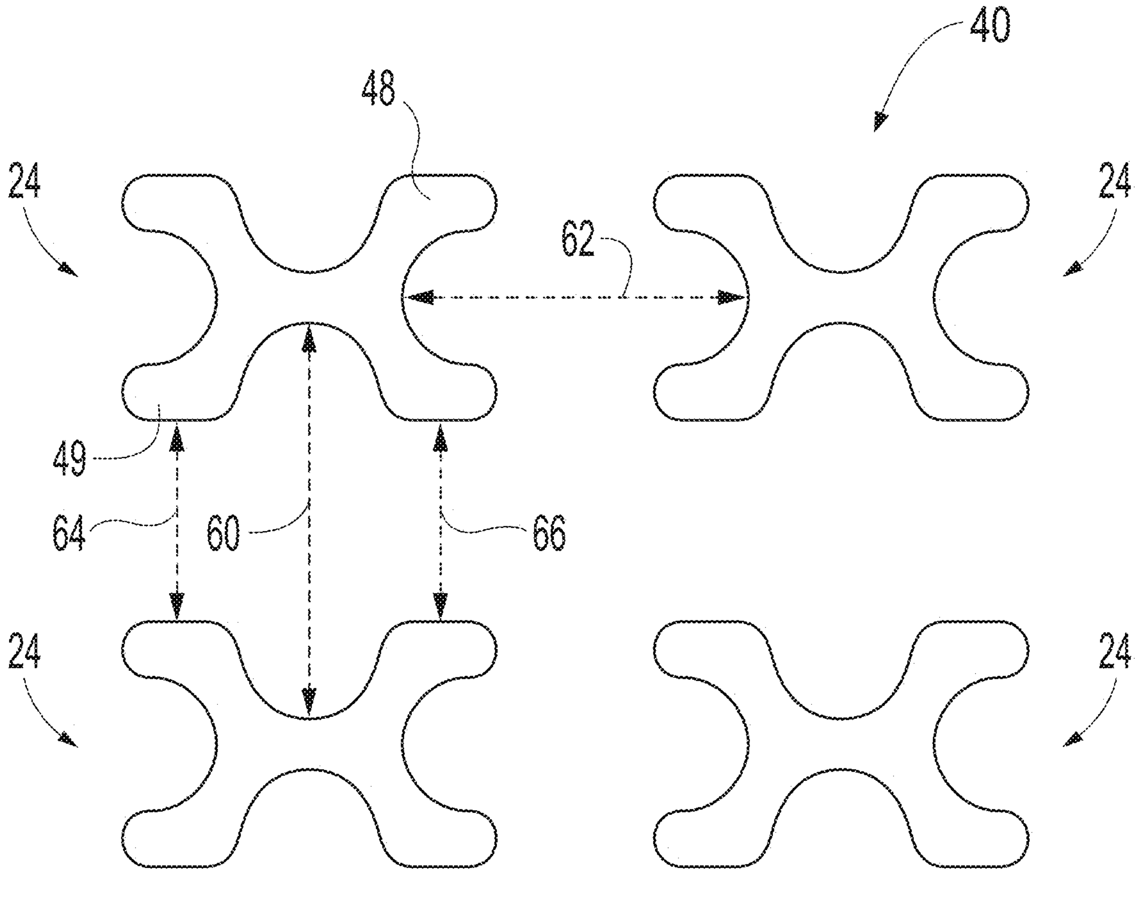
FIG. 10B is an enlarged view of a four Cell Group that may be used in the present disclosure.
Figure 10C:
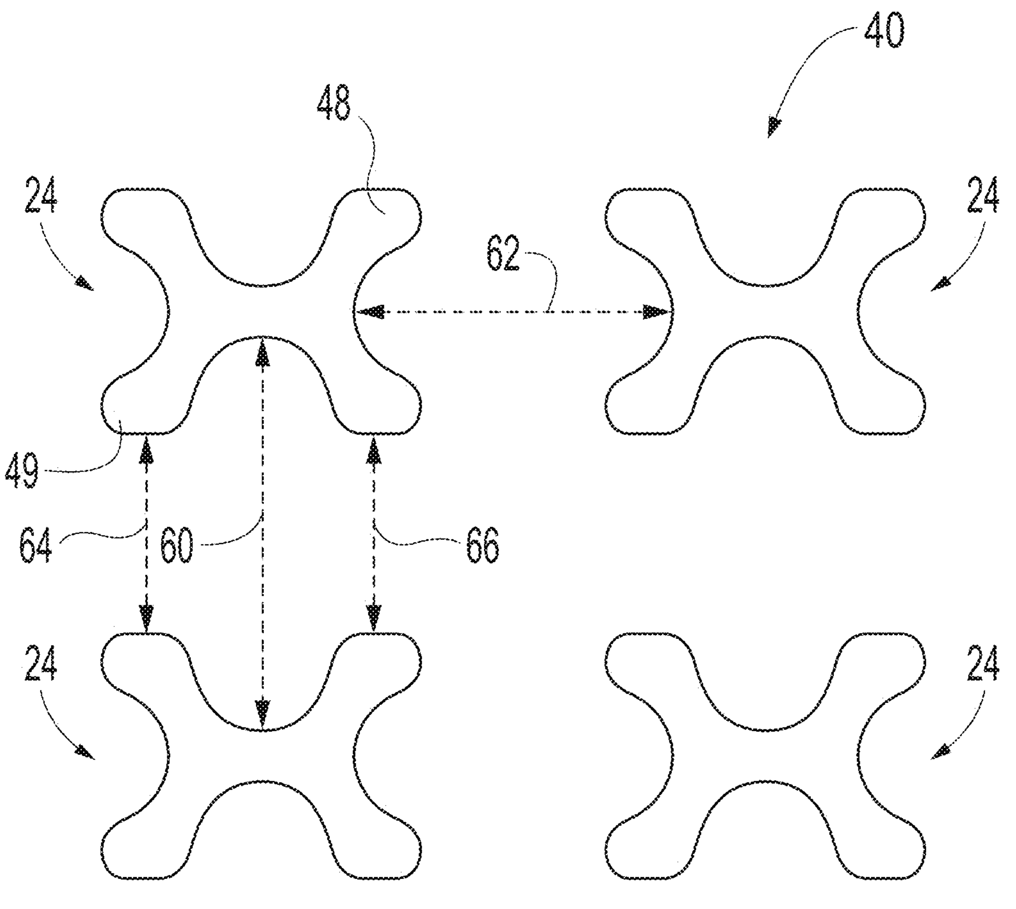
FIG. 10C is an enlarged view of a four Cell Group that may be used in the present disclosure.
Figure 10D:
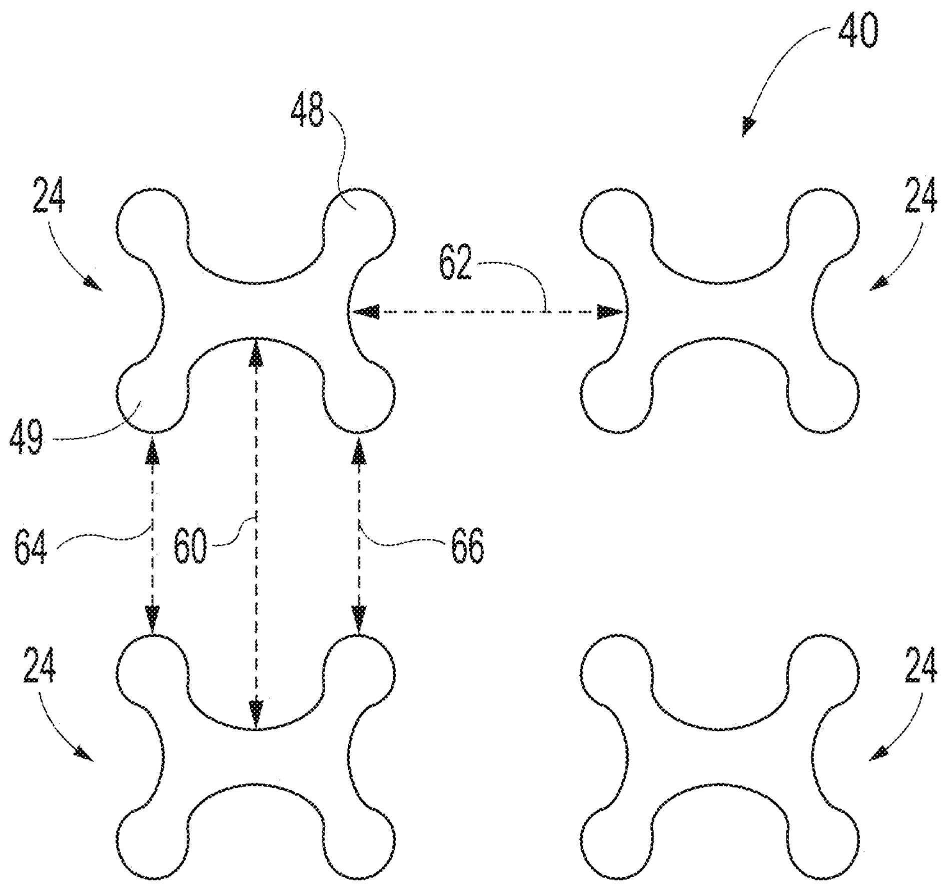
FIG. 10D is an enlarged view of a four Cell Group that may be used in the present disclosure.
Figure 10E:
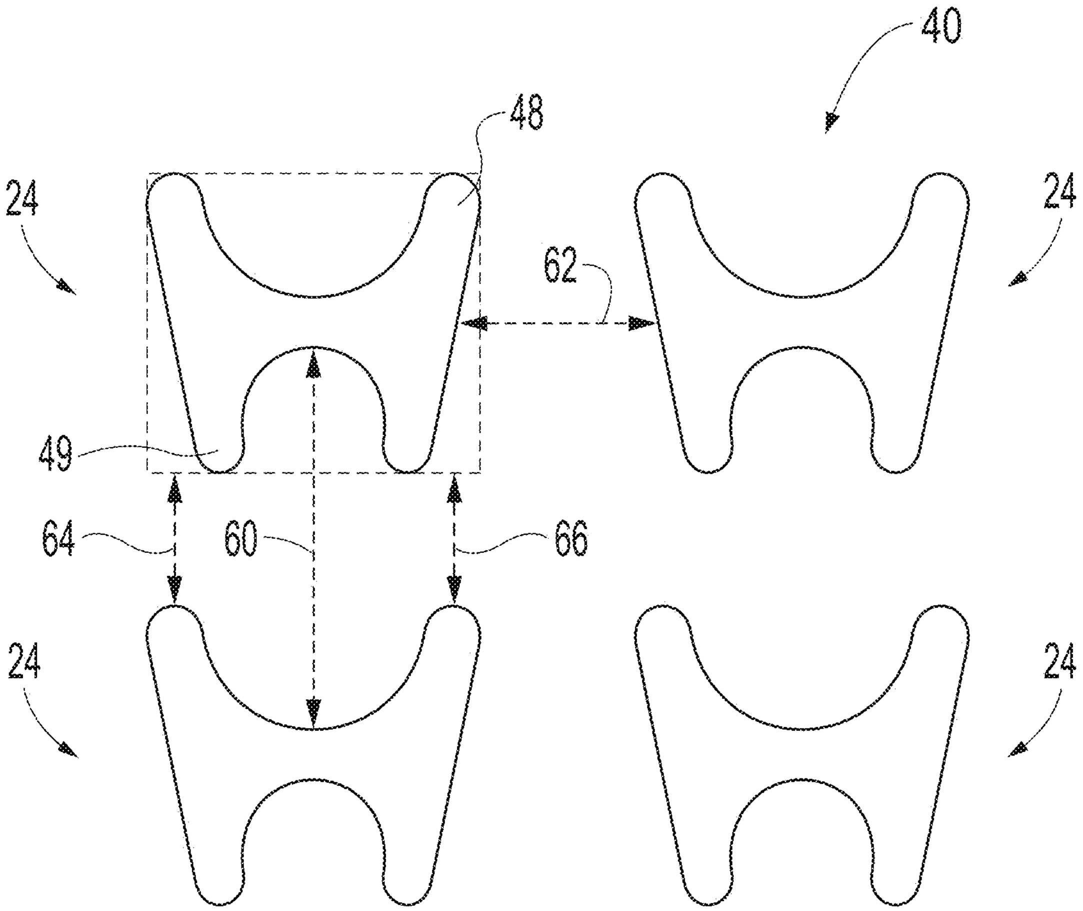
FIG. 10E is an enlarged view of a four Cell Group that may be used in the present disclosure.
Figure 10F:
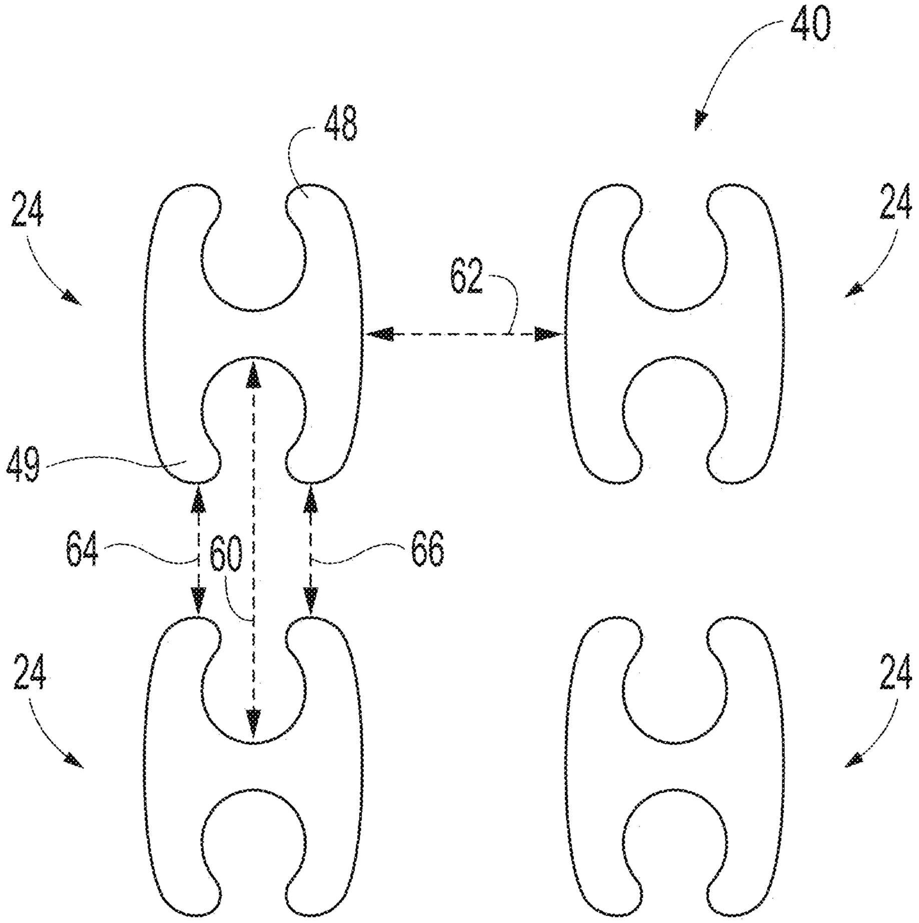
FIG. 10F is an enlarged view of a four Cell Group that may be used in the present disclosure.
Figure 10G:
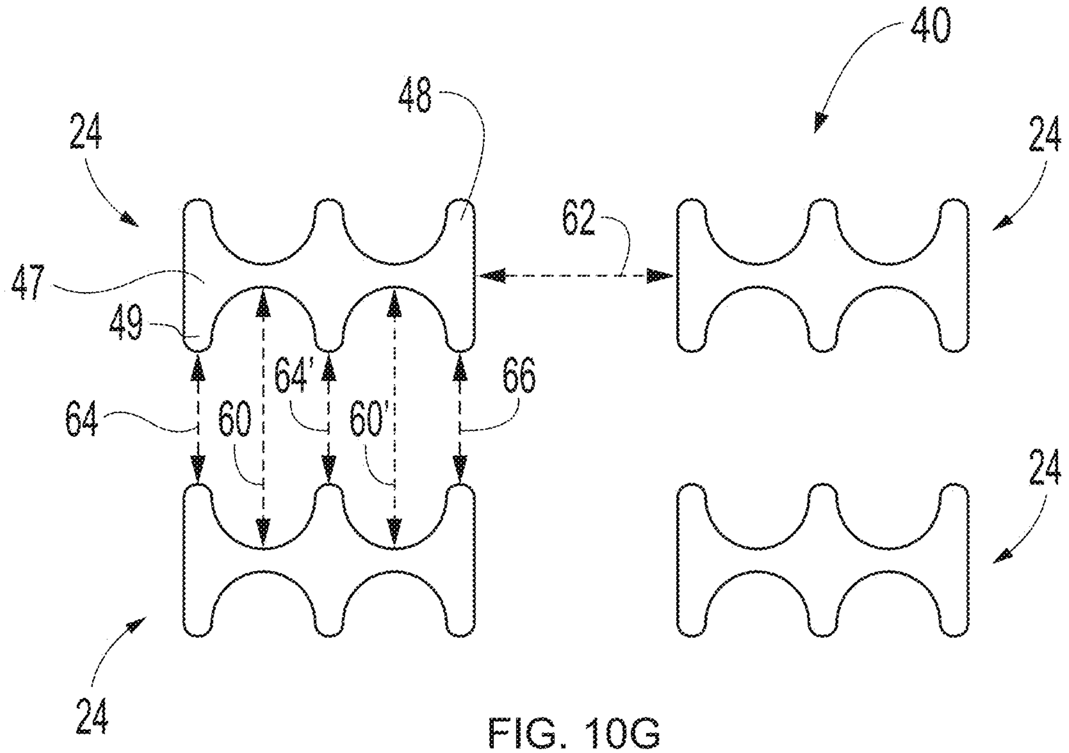
FIG. 10G is an enlarged view of a four Cell Group that may be used in the present disclosure.
Figure 10H:
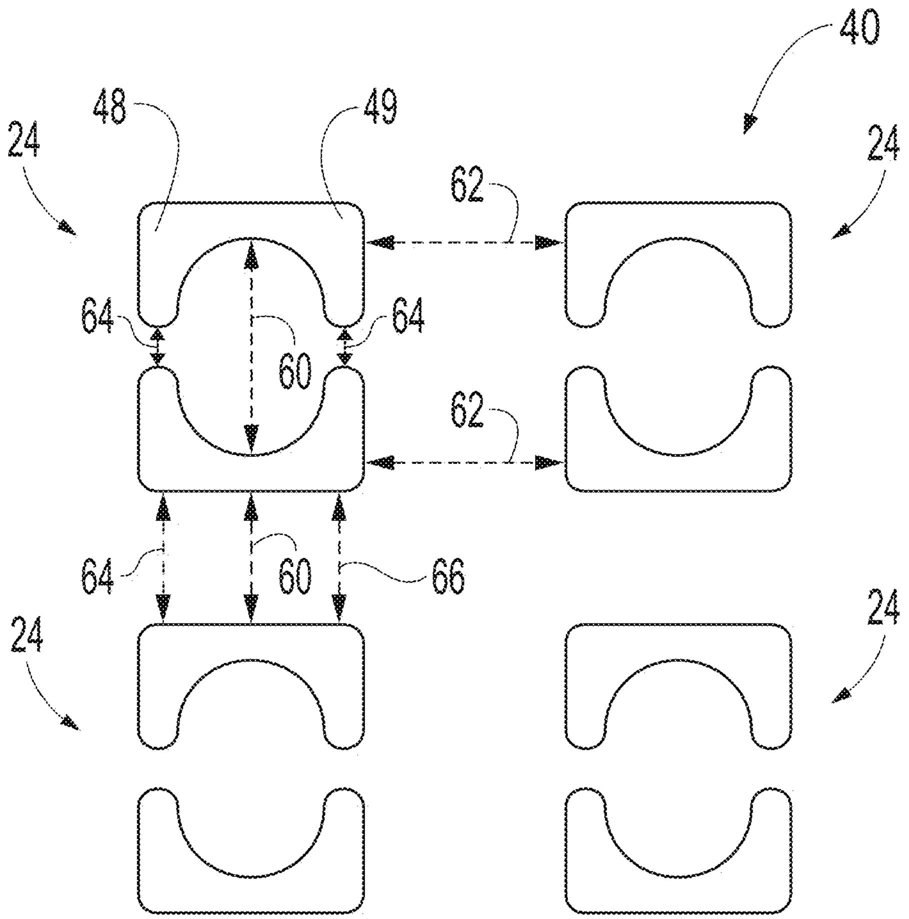
FIG. 10H is an enlarged view of a four Cell Group that may be used in the present disclosure.
Figure 10I:
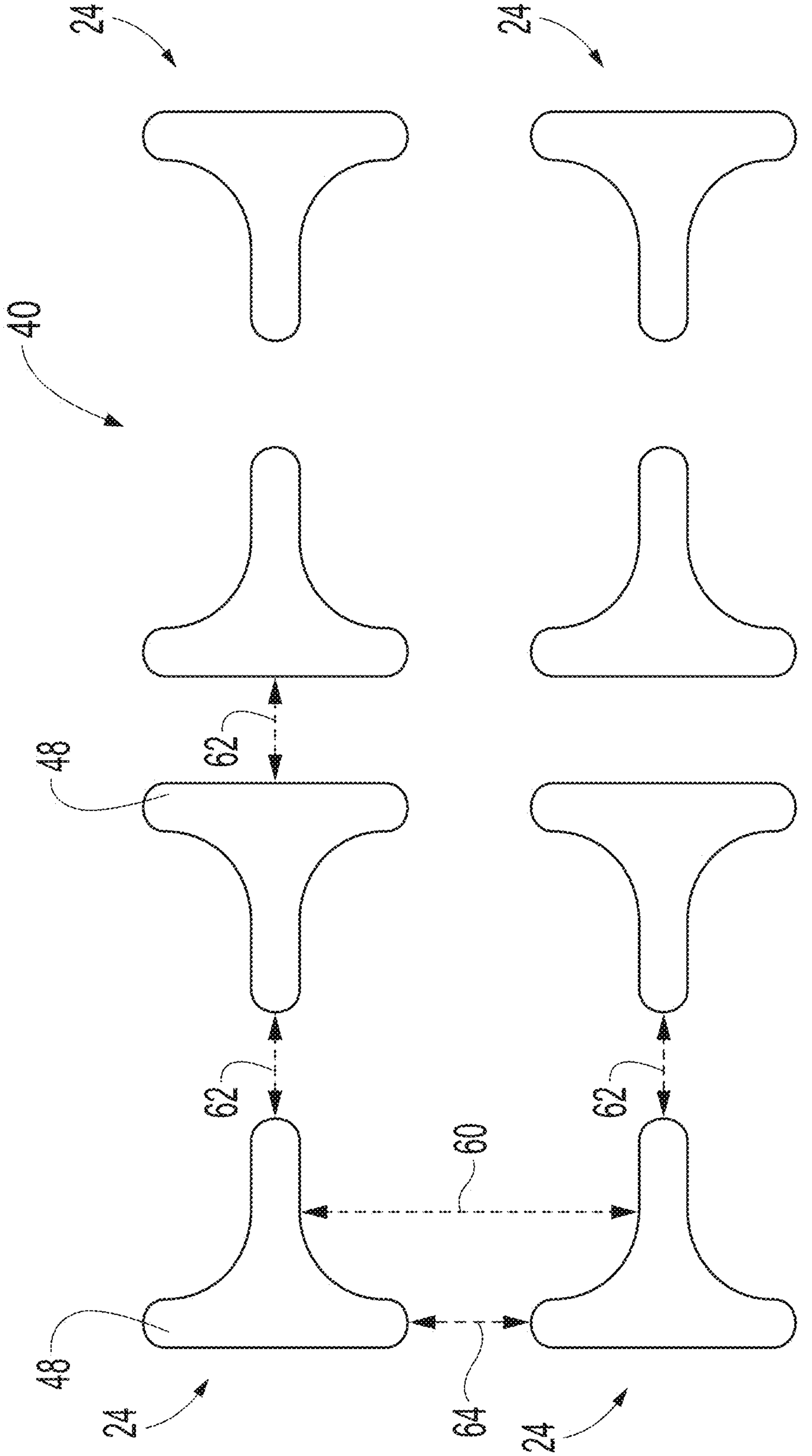
FIG. 10I is an enlarged view of a four Cell Group that may be used in the present disclosure.
Figure 10J:
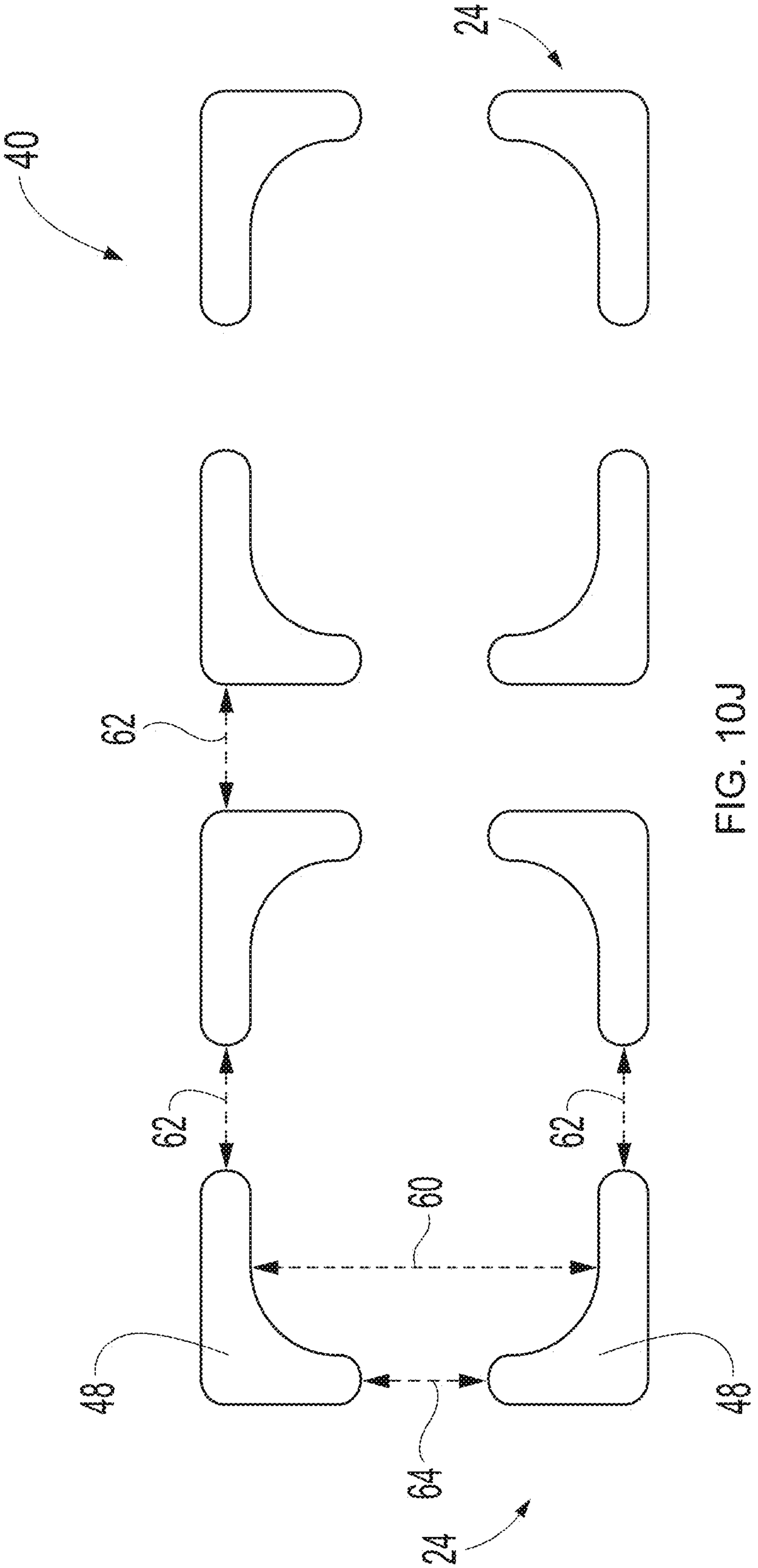
FIG. 10J is an enlarged view of a four Cell Group that may be used in the present disclosure.
Figure 10K:
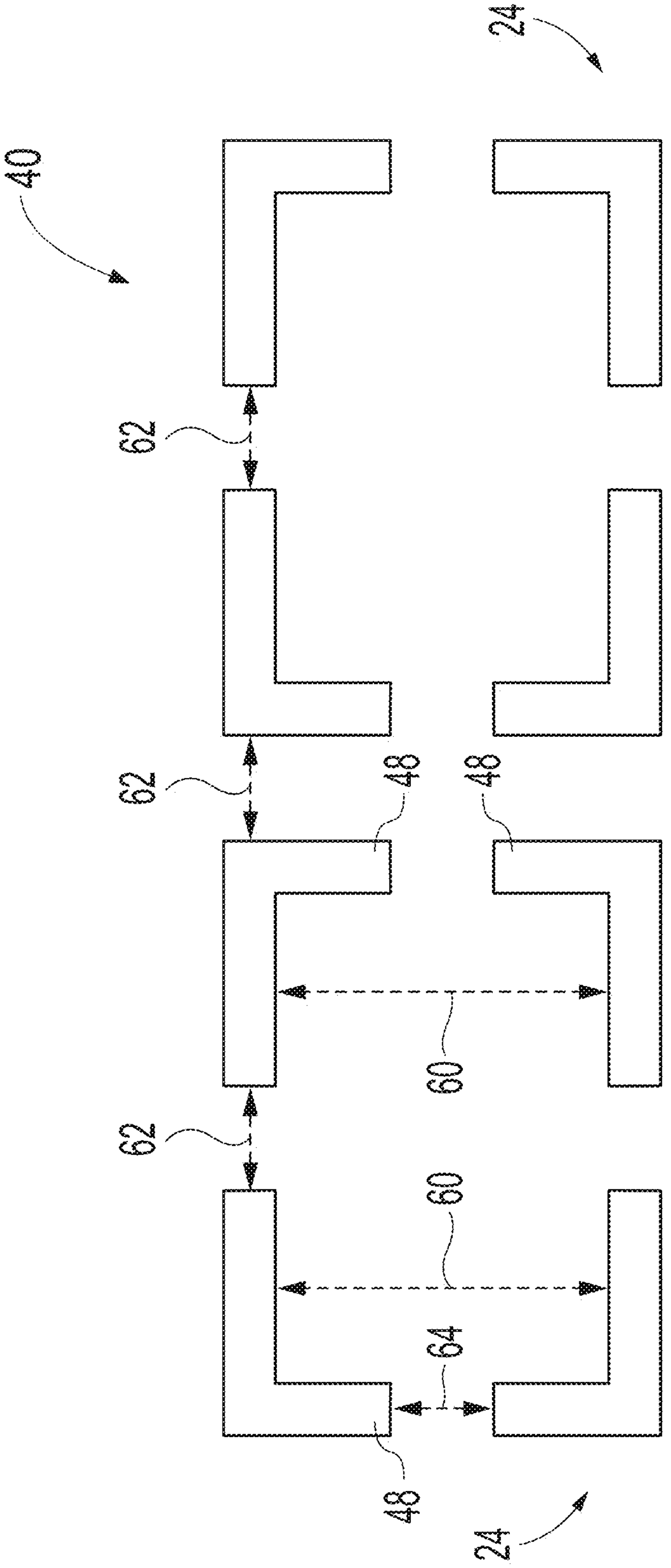
FIG. 10K is an enlarged view of a four Cell Group that may be used in the present disclosure.
Figure 10L:
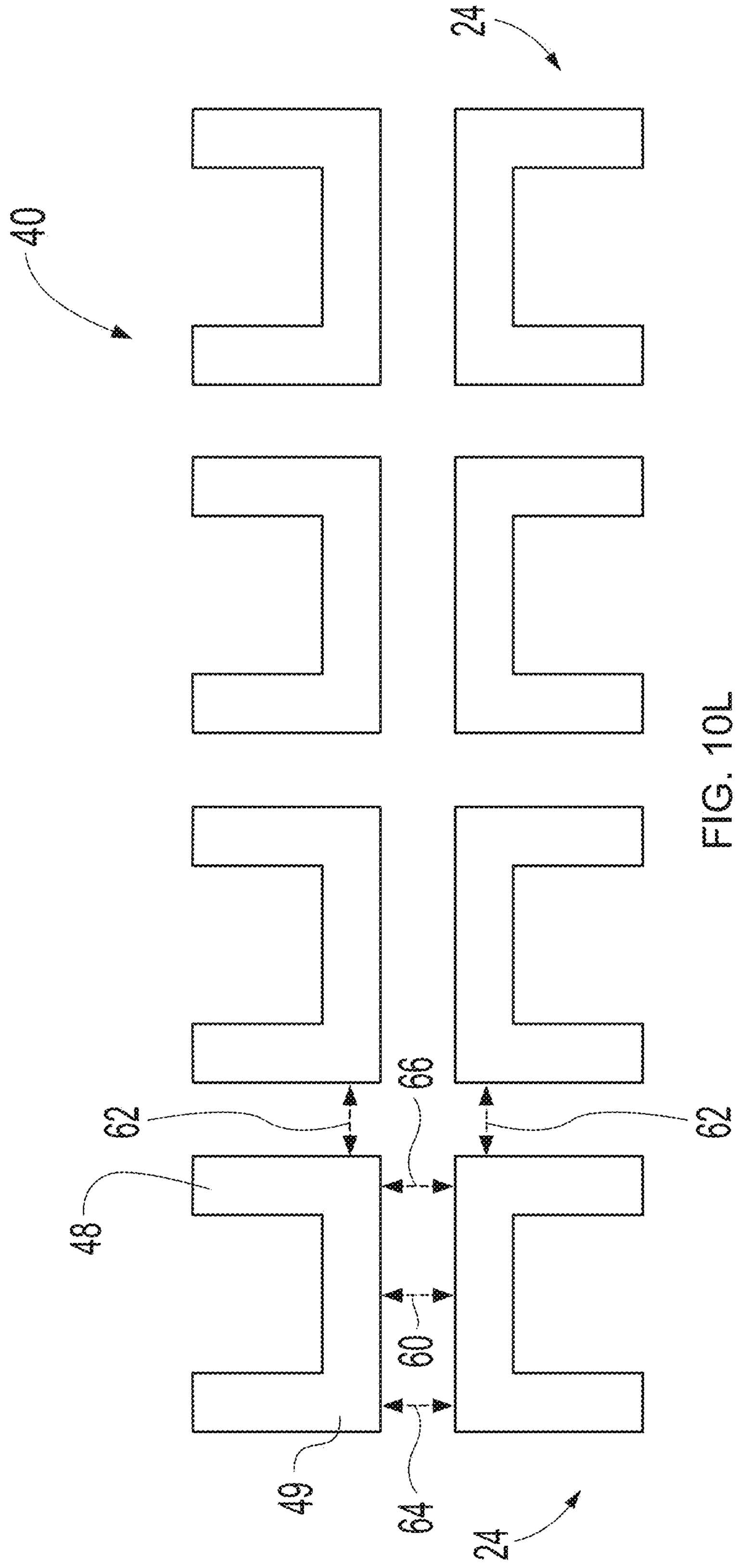
FIG. 10L is an enlarged view of a four Cell Group that may be used in the present disclosure.
Figure 10M:
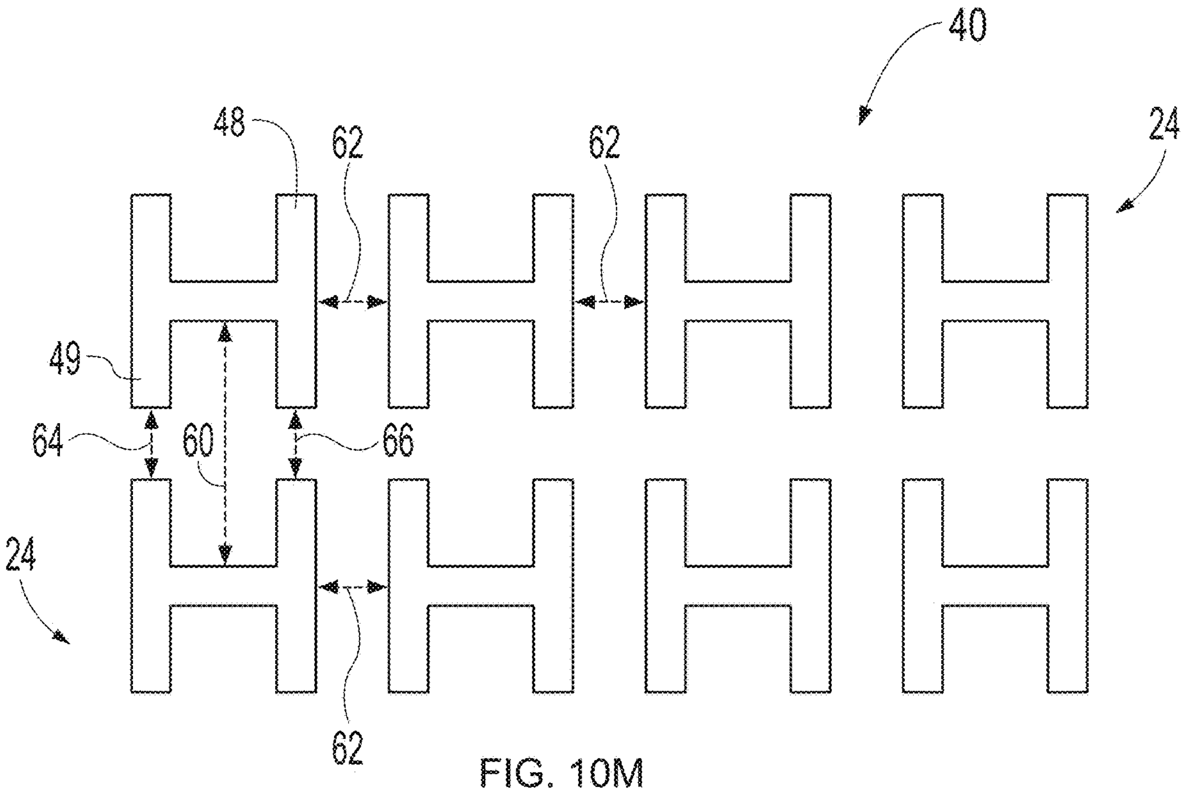
FIG. 10M is an enlarged view of a four Cell Group that may be used in the present disclosure.
Figure 10N:
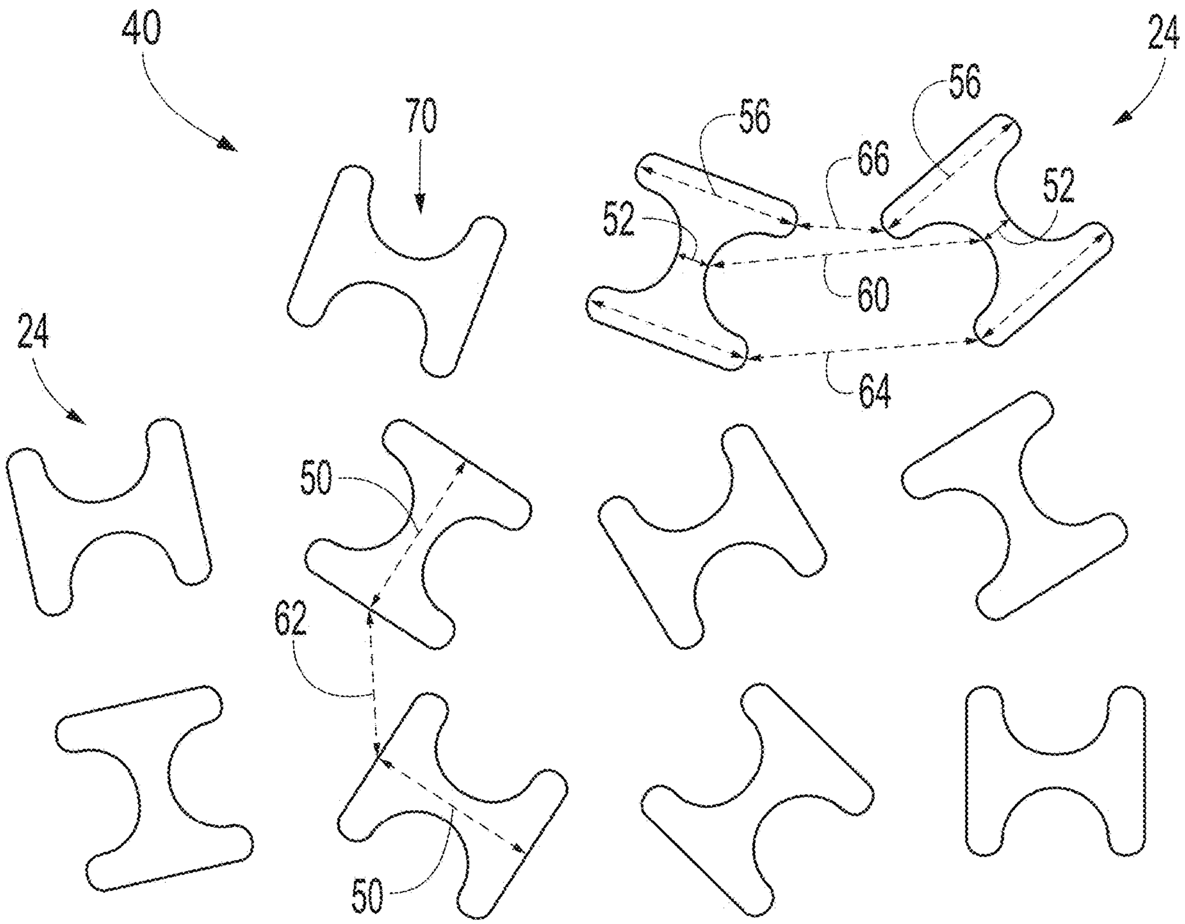
FIG. 10N is an enlarged view of a four Cell Group that may be used in the present disclosure.
Figure 10O:
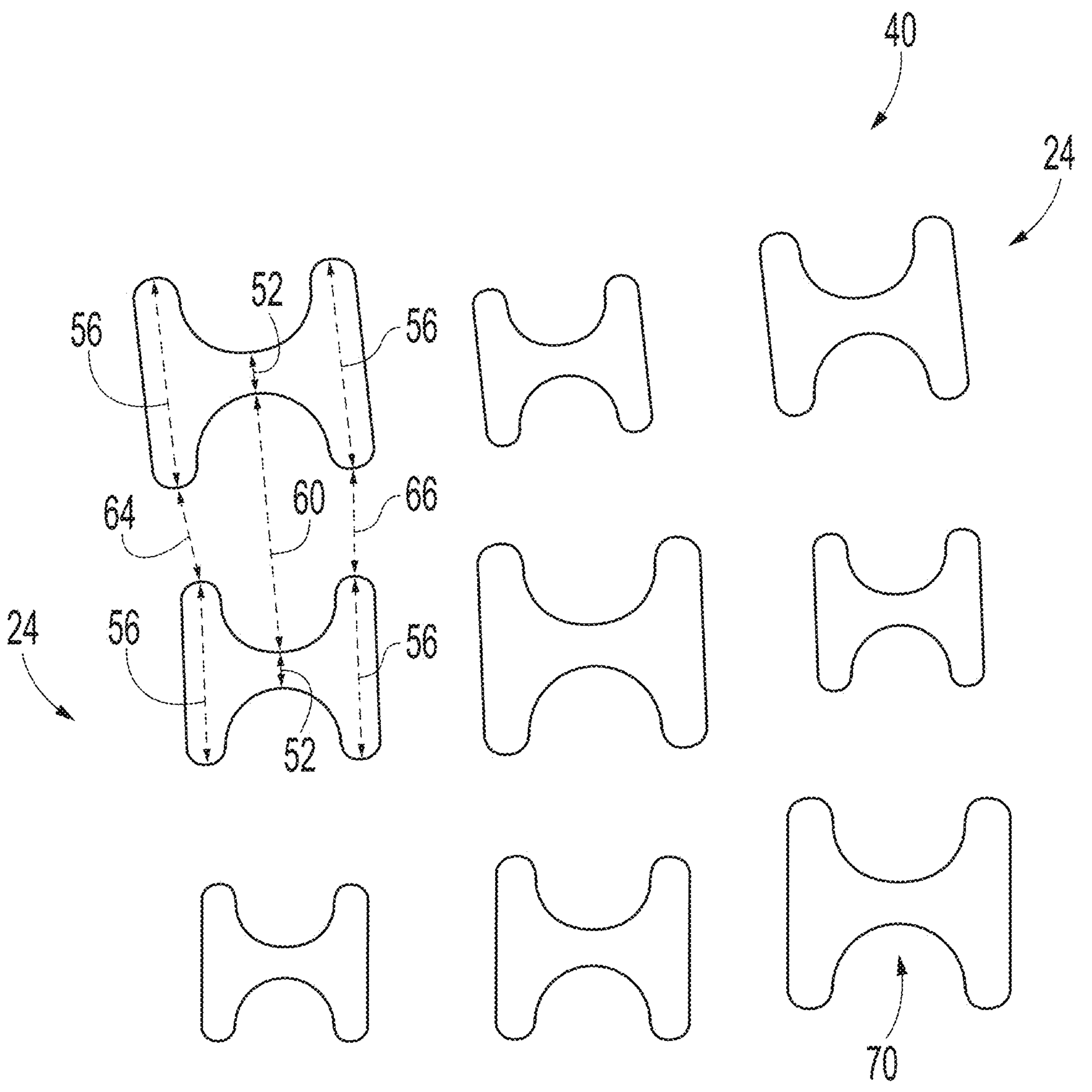
FIG. 10O is an enlarged view of a four Cell Group that may be used in the present disclosure.

The depictions of FIGS. 9A-N and 10A-O are shown for clarity, with FIGS. 9A-N showing a single cell 24 and FIGS. 10A-O showing a Cell Group 40 and the spacing between the cells. The Continuous Region Density Difference Measurement (which uses the Micro-CT Intensive Property Method) may be used to identify a Cell Group 40 of four.

There may be any variation of measurement ratios based on measurements from the cells 24 or area that surrounds the cells. As non-limiting examples, a few examples of measurement ratios include the identified ratios of a ratio of First Leg Separation Distance 64 to Distance Between Saddles 60, a ratio of Leg Length 56 to Saddle Height 52, and/or a ratio of Distance Between Cells 62 to First Leg Separation Distance 64. However, many additional ratios exist that utilize two or more measurements of cell(s) 24.

Cells 24 within a pattern may have a Cell Width 50. Cell Width 50 is depicted in FIGS. 9A-N. Cell Width 50 may be between about 0.035 inches and about 0.480 inches, or between about 0.035 inches and about 0.11 inches, or between about 0.065 inches and about 0.105 inches, or between about 0.070 inches and about 0.100 inches, specifically reciting all 0.001 inch increments within the above-recited ranges and all ranges formed therein or thereby. In certain interesting examples, Cell Width 50 may be about 0.070 inches and about 0.090 inches.

Cells 24 within a pattern may have a Cell Height 55. Cell Height 55 is depicted in FIGS. 9A-N. Cell Height 55 may be between about 0.06 inches and about 0.480 inches, or between about 0.06 inches and about 0.11 inches, or between about 0.065 inches and about 0.105 inches, or between about 0.070 inches and about 0.100 inches, specifically reciting all 0.001 inch increments within the above-recited ranges and all ranges formed therein or thereby. In certain interesting examples, Cell Height may be about 0.070 inches and about 0.090 inches.

Cells 24 within a pattern may have a Cell Area, which is the Cell Width 50 multiplied by the Cell Height 55. Cell Areas of the present disclosure may be from 0.00375 inch$^2$ to 0.0625 inch$^2$, 0.004 inch$^2$ to 0.0225 inch$^2$, or from 0.0045 inch$^2$ to 0.01 inch$^2$, specifically reciting all 0.001 inch$^2$ increments within the above-recited ranges and all ranges formed therein or thereby. These Cell Areas are larger than previously disclosed Cell Areas. In this way, cells of the present disclosure may be signal elements to the consumer more than they have been in the past, where smaller Cell Areas could not decipher, particularly including an inability for users to appreciate the shape of discrete cells in a pattern or as part of a Cell Group. For this reason, it may be desirable to illustrate the cells or Cell Groups of the present disclosure as indicia, or otherwise, on a package comprising the fibrous structures of the present disclosure, such as rolls of toilet paper or paper towels. These discrete cells having a larger Cell Area may be combined with larger fibrous rolls, such as large paper towel rolls having a diameter of greater than 7, 8, 9, or 10 inches—this combination of large rolls and large discrete cells 24 may be synergistic and may satisfy an expectation that the larger rolls will have larger features and greater performance as the fibrous structures of the present disclosure do have.

The shape of the cells of the present disclosure may be emphasized by emboss elements of the present disclosure, where cells comprising one, two, three, or four linear sides may be contrasted by emboss elements comprising non-linear sides (i.e., greater than 50%, 60%, 70%, 80%, 90% or the entirety of the side is non-linear), especially the sides of the longer of emboss width 51 and emboss height 53, and most powerfully when each of the sides of the cell 24 is linear and each of the sides of the emboss 32 is non-linear, or alternatively, cells comprising one, two, three, or four non-linear sides may be contrasted by the emboss elements comprising linear sides (i.e., greater than 50%, 60%, 70%, 80%, 90% or the entirety of the side is linear), especially the sides of the longer of emboss width 51 and emboss height 53, and most powerfully when each of the sides of the cell 24 is non-linear and each of the sides of the emboss 32 is linear.

Figure 22:
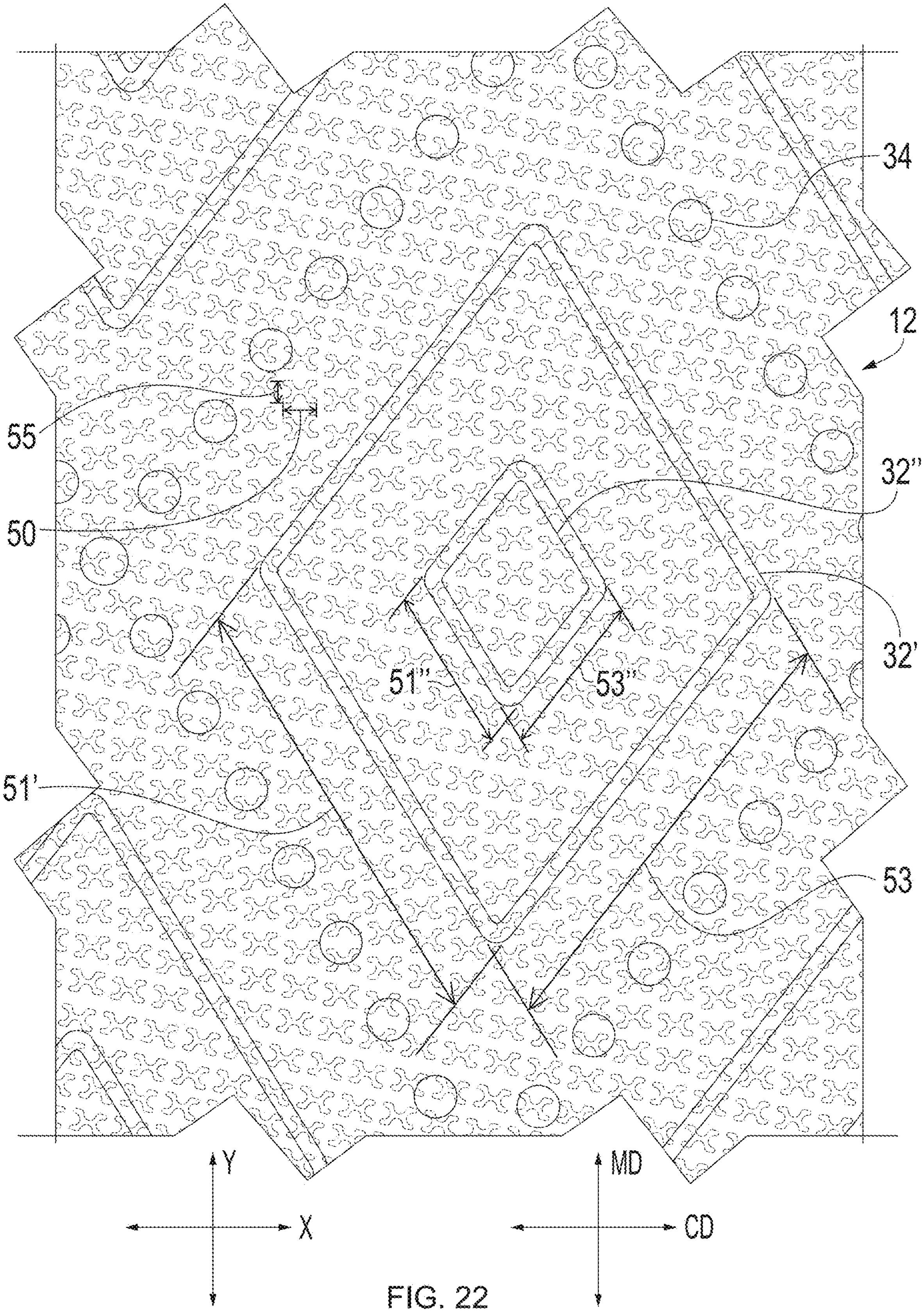
FIG. 22 is a top view of a portion of a new fibrous structure comprising embossments and discrete cells as detailed herein.
Figure 23:
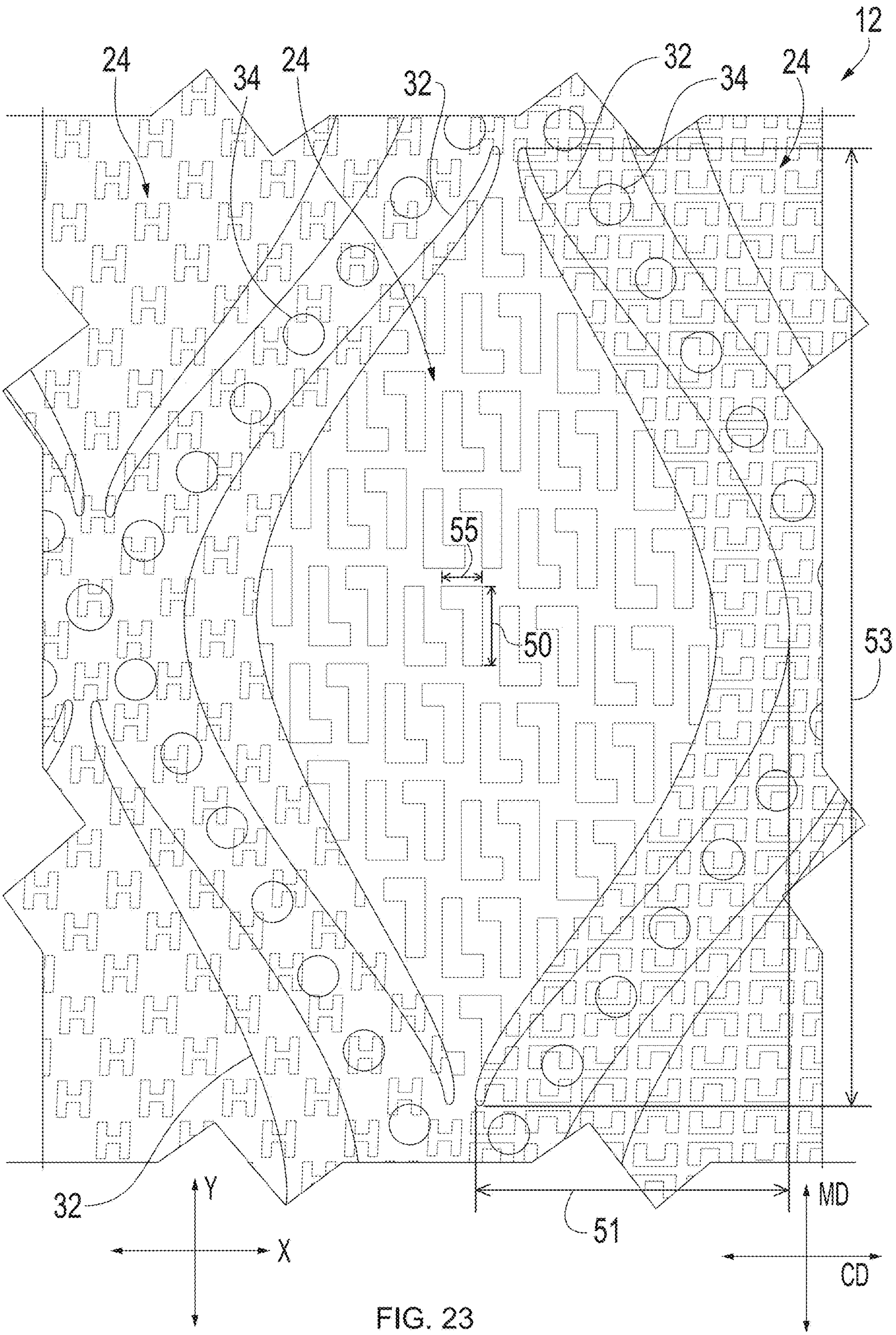
FIG. 23 is a top view of a portion of a new fibrous structure comprising embossments and discrete cells as detailed herein.

Even though it is desirable to have larger cells 24, the relationship between the Cell Area and the Emboss Area (emboss width 51 times the emboss height 53) may desirably allow at least multiple whole cells 24 (at least 2, 3, 4, 5, or 6 whole cells) along an axis (e.g., an MD or CD-axis, an X or Y-axis) to fit within a partially enclosed or fully enclosed emboss—see, for example, FIGS. 22 and 23. Further, when a major emboss 32' encompasses a minor emboss 32", such as in FIG. 22, it may be desirable to use a cell pattern that allows multiple whole cells along an axis (e.g., an MD or CD-axis, an X or Y-axis) to fit within a major emboss and also multiple whole cells to also fit within the minor emboss. Further, the Emboss Height 53 may be greater than the Cell Height and/or greater than the Cell Width 50; and the Emboss Width 51 may be greater than the Cell Height 55 and/or greater than the Cell Width 50. Still further, the Emboss/Cell Width Ratio may be greater than about 5.5, about 6.5, or about 7.5; and the Emboss/Cell Length Ratio may be greater than about 5.5, about 6.5, or about 7.5, specifically reciting all 0.5 increments within the above-recited ranges and all ranges formed therein or thereby. Due, in part, to the relationship of the of the emboss elements and the cells, the fibrous structures of the present disclosure may have a Flexural Rigidity/TDT of greater than about 0.30, about 0.41, about 0.45, or about 0.50, specifically reciting all 0.05 increments within the above-recited ranges and all ranges formed therein or thereby. These properties may be evenly distributed over the Emboss Height 53 as the overlap of the emboss line 32 with discrete cells 24 is substantially even over the distance of the Emboss Height 53—such that, if an emboss line 32 was divided into equal segments (e.g., in half), each segment would have substantially the same overlap percentage (with the discrete cells). The same may be true for emboss dots if the dots are large enough to overlap with multiple discrete cells. As mentioned above, it may be desirable to illustrate said relationships of cells or Cell Groups of the present disclosure along with emboss elements (32, 34) as indicia, or otherwise, on a package comprising the fibrous structures of the present disclosure, such as rolls of toilet paper or paper towels.

Cells 24 within a pattern may have a Saddle Height 52. Saddle Height 52 is depicted in FIGS. 9A-N. Saddle Height 52 may be between about 0.008 inches and about 0.180 inches, or between about 0.008 inches and about 0.035 inches, or between about 0.010 inches and about 0.030 inches, or between about 0.010 inches and about 0.020 inches, specifically reciting all 0.001 inch increments within the above-recited ranges and all ranges formed therein or thereby. In certain interesting examples, Saddle Height 52 may be about 0.15 inches.

Cells 24 within a pattern may have a Saddle Width 54. Saddle Width 54 is depicted in FIGS. 9A-O—in this non-limiting example of taking the diameter of the circle that forms saddle 47 of cell 24, with legs 48, 49 on either side of the saddle. Another way to measure Saddle Width 54 is to take the Cell Width 50 and subtract out the leg widths (defined below). Saddle Width 54 may be between about 0.020 inches and about 0.210 inches, or between about 0.025 inches and about 0.075 inches, or between about 0.030 inches and about 0.065 inches, or between about 0.035 inches and about 0.060 inches, specifically reciting all 0.001 inch increments within the above-recited ranges and all ranges formed therein or thereby. In certain interesting examples, Saddle Width 54 may be between about 0.035 inches and about 0.050 inches.

Cells 24 within a pattern may have a Leg Length 56. Leg Length is depicted in FIGS. 9A-N. In the example of the pattern depicted herein, cell 24 has two legs of equal length. However, in other examples of pattern contemplated herein, the cell may have two legs (or more) of dissimilar length. In such embodiments, the Leg Length dimension should be the larger or largest of the leg length dimensions. Leg Length 56 may be between about 0.020 inches and about 0.240 inches, or between about 0.025 inches and about 0.110 inches, or between about 0.040 inches and about 0.095 inches, or between about 0.060 inches and about 0.090 inches, specifically reciting all 0.001 inch increments within the above-recited ranges and all ranges formed therein or thereby. In certain interesting examples, Leg Length 56 may be between about 0.070 inches about 0.080 inches.

Cells 24 within a pattern may have a Leg Width 58. Leg Width is depicted in FIG. 9A-N. In the example of the pattern depicted herein, cell 24 has two legs of equal width. However, in other examples of pattern contemplated herein, the cell may have two legs (or more) of dissimilar width. In such embodiments, the Leg Width dimension should be the larger or largest of the leg width dimensions. Leg Width 58 may be between about 0.008 inches and about 0.180 inches, or between about 0.008 inches and about 0.030 inches, or between about 0.011 inches and about 0.025 inches, or between about 0.012 inches and about 0.020 inches, specifically reciting all 0.001 inch increments within the above-recited ranges and all ranges formed therein or thereby. In certain interesting examples, Leg Width 58 may be about 0.015 inches.

Cells 24 of the present disclosure, which may be part of a Cell Group 40, which may be within a pattern, may have an axis along the Cell Width 50 that is intersected at a first intersection point 57 by an axis along a first Leg Length 56 and that is intersected at a second intersection point 59 by an axis along a second Leg Length 56. The dimension between the first and second intersections points 57, 59 is the Intersection Point Separation Distance 61 and can be measured as depicted in FIGS. 9A-H and 9L-O. Intersection Point Separation Distance 61 may be between about 0.030 inches and about 0.472 inches, or between about 0.03 inches and about 0.24 inches, or between about 0.065 inches and about 0.110 inches, or between about 0.070 inches and about 0.100 inches, specifically reciting all 0.001 inch increments within the above-recited ranges and all ranges formed therein or thereby. In FIG. 9G, a third Leg Length 56 intersects with an axis along the Cell Width 50 at a third intersection point 63, halfway between the Intersection Point Separation Distance 61.

Patterns of cells 24 may also be referred to as a Cell Group 40. It may be useful to refer to particular numbers of cells 24 that make up Cell Group, such as 2, 3, 4, 5, 6, 8, 10, 15, 20, 25, 50, 75, 100, etc. cells 24. For instance, FIGS. 10A-10P illustrate particular number of cells 24 making up a Cell Group 40.

Each area that surrounds cells 24 of a pattern may have a Distance Between Saddles 60. Distance Between Saddles 60 is depicted in FIGS. 10A-0. In the example of the pattern depicted herein, cells 24 in the pattern have an equal value for Distance Between Saddles 60. However, in other examples of patterns contemplated herein, the cells may have one or more different distances between saddles. In such embodiments, the Distance Between Saddle 60 for the pattern is the average of the individual distances between saddles for the pattern. Distance Between Saddles 60 may be between about 0.040 inches and about 0.350 inches, or between about 0.040 inches and about 0.140 inches, or between about 0.070 inches and about 0.130 inches, or between about 0.090 inches and about 0.120 inches, specifically reciting all 0.001 inch increments within the above-recited ranges and all ranges formed therein or thereby. In certain interesting examples, Distance Between Saddles 60 may be between about 0.100 inches and about 0.110 inches.

Each area that surrounds cells 24 of a pattern may have a Distance Between Cells 62. Distance Between Cells 62 is depicted in FIGS. 10A-0. In the example of the pattern depicted herein, cells 24 in the pattern have an equal value for Distance Between Cells 62. However, in other examples of patterns contemplated herein, the cells may have one or more different distances between cells. In such embodiments, the Distance Between Cells 62 for the pattern is the average of the individual distances between cells for the pattern. Distance Between Cells 62 may be between about 0.020 inches and about 0.210 inches, or between about 0.040 inches and about 0.070 inches, or between about 0.045 inches and about 0.070 inches, or between about 0.050 inches and about 0.068 inches, specifically reciting all 0.001 inch increments within the above-recited ranges and all ranges formed therein or thereby. In certain interesting examples, Distance Between Cells 62 may be between about 0.062 inches and about 0.065 inches.

Each area that surrounds cells 24 of a pattern may have a First Leg Separation Distance 64 and a Second Leg Separation Distance 66. First Leg Separation Distance 64 and Second Leg Separation Distance 66 are measured in the same manner and are depicted in FIGS. 10A-0. When differentiating between First Leg Separation Distance 64 and Second Leg Separation Distance 66 between two adjacent cells 24, if there is a difference between the two distances, the First Leg Separation Distance is the shorter of the two distances and the Second Leg Separation Distance is the longer of the two distances. In the example of the patterns depicted in FIGS. 10A-O, cells 24 in the pattern have a First Leg Separation Distance 64 between the ends of the legs at the bottom and a Second Leg Separation Distance between the ends of the legs at the top of the illustration. However, in other examples of patterns contemplated herein, the First and Second Leg Separation Distances 64, 66 may be reversed, or the cells may have First and Second Leg Separation Distances that are equidistance. In such embodiments with equidistant leg separation distances, the First and Second Leg Separation Distances 64, 66 are the same value. First and Second Leg Separation Distances 64, 66 may be between about 0.020 inches and about 0.205 inches, or between about inches and about 0.075 inches, or between about 0.025 inches and about 0.070 inches, or between about 0.030 inches and about 0.065 inches, specifically reciting all 0.001 inch increments within the above-recited ranges and all ranges formed therein or thereby. In certain interesting examples, First and Second Leg Separation Distances may be between about 0.037 inches and about 0.063 inches.

Each pattern of cells 24 may have a ratio of First Leg Separation Distance 64 to Distance Between Saddles 60. The ratio of First Leg Separation Distance 64 to Distance Between Saddles may be between about 0.050 and about 0.99, or between about 0.15 and about 0.99, or between about 0.20 and about 0.80 or between about 0.30 and about 0.70, specifically reciting all 0.01 increments within the above-recited ranges and all ranges formed therein or thereby. In certain interesting examples, Distance Between Saddles 60 may be between about 0.40 and about 0.50.

Each cell 24 may have a ratio of Leg Length 56 to Saddle Height 52. The ratio of Leg Length 56 to Saddle Height 52 may be between about 1.02 and about 24.0, or between about 1.02 and about 6.70, or between about 2.50 and about 6.20, or between about 4.00 and about 6.00, specifically reciting all 0.01 increments within the above-recited ranges and all ranges formed therein or thereby. In certain interesting examples, the ratio of Leg Length 56 to Saddle Height 52 may be between about 4.70 and about 5.40.

Each pattern of cells 24 may have a ratio of Distance Between Cells 62 to First Leg Separation Distance 64. The ratio of Distance Between Cells 62 to First Leg Separation Distance 64 may be between about 0.20 and about 10.50, or between about 0.59 and about 3.00, or between about 0.80 and about 2.00 or between about 1.00 and about 1.80, specifically reciting all 0.01 increments within the above-recited ranges and all ranges formed therein or thereby. In certain interesting examples, the ratio of Distance Between Cells 62 to First Leg Separation Distance 64 may be between about 1.25 and about 1.45.

Each of the cells 24 within a pattern may all be of the same size, or the size of the cell may vary within the pattern (i.e., at least two cells within the pattern are of a different size). If a pattern has cells 24 in various sizes, the pattern may include 2, 3, 4, 5, 6, 7, 8, 9, 10, 15 or more different sizes. In one interesting example, the new fibrous structure patterns have three different cell sizes. In such examples, the different cell sizes may each have unique measurements and measurement ratios as detailed herein. For example, in a fibrous structure that has a pattern with three different cell sizes, a first cell size may have a Cell Width of 0.070 inches, a second cell size may have a Cell Width of 0.080 inches, and a third cell size may have a Cell Width of 0.090 inches. In that same fibrous structure pattern, the three different cell sizes may have the same Saddle Height (e.g., inches) or the three cells may have different Saddle Heights. Accordingly, the aspect ratios and measurement ratios (e.g., a ratio of First Leg Separation Distance to Distance Between Saddles, a ratio of Leg Length to Saddle Height, and/or a ratio of Distance Between Cells to First Leg Separation Distance) for each cell size may be the same or different. The pattern of cells 24, organized by rows, can be understood in the context of an X-Y coordinate plane. A first plurality of rows 26 may be oriented in a direction that is parallel to the X-axis (i.e., an X-direction) and a second plurality of rows 28 may be oriented in a direction that is parallel to the Y-axis (i.e., a Y-direction). Accordingly, the cells 24 of the mask/fibrous structure may each be included within a row 26 oriented in an X-direction and may also be included within a row 28 oriented in a Y-direction. The examples herein describe pluralities of rows that are oriented in a direction either parallel to the X-axis or the Y-axis. However, for other contemplated examples, it is not necessary for the plurality of rows to be oriented in a direction that is parallel to the X-axis and/or Y-axis, as the rows can be oriented in other directions. For example, the rows may be oriented in an X or Y direction that is substantially parallel to the X-axis or Y-axis, or in any other direction that is not parallel to the X-axis or Y-axis. Accordingly, when one skilled in the art reviews the examples stating, "pluralities of rows that are oriented in an X-direction," similar examples where the rows are oriented substantially parallel, or not parallel, to the X-axis should also be contemplated. Moreover, in some examples (not illustrated), the X-Y coordinate plane may correspond to the machine and cross machine directions of the papermaking process as is known in the art. And in other examples, such as illustrated in the masks 14A, 14B, 14C, 14D of FIGS. 5-8, the X-Y coordinate plane does not correspond to the machine and cross machine directions of the papermaking process, such that the Y-axis may deviate from the machine direction axis by at least 5, 10, 15, 20, 25, 30, 35, 40, or 45 degrees; likewise, the X-axis may deviate from the cross machine direction axis by at least 5, 10, 15, 20, 25, 30, 35, 40, or 45 degrees. "Machine Direction" or "MD" as used herein means the direction on a web corresponding to the direction parallel to the flow of a fibrous structure through a fibrous structure making machine. "Cross Machine Direction" or "CD" as used herein means a direction perpendicular to the Machine Direction in the plane of the web. As shown in the exemplary paper towel of FIG. 4, and more clearly depicted through the masks 14A, 14B, 14C, 14D shown in FIGS. 5-8, in addition to the new cell shapes and/or sizes as detailed herein, the new fibrous structures may have at least one of the pluralities of rows 26, 28 of cells 24 that is curved. However, examples of the contemplated fibrous structure/belts herein do not need to include curved rows of cells as described herein. In some examples, as illustrated in fibrous structure 12A of FIG. 4 and the corresponding mask 14A of FIG. 5 (as well as masks 14B, C and D of FIGS. 6, 7 and 8), both the plurality of rows 26 that are oriented in an X-direction and the plurality of rows 28 that are oriented in a Y-direction are curved. In other examples (not illustrated), the plurality of rows 26 that are oriented in an X-direction are curved, and the plurality of rows 28 that are oriented in a Y-direction are straight/substantially straight. In yet other examples (not illustrated), the plurality of rows 28 that are oriented in a Y-direction are curved, and the plurality of rows 26 that are oriented in an X-direction are straight/substantially straight. Thus, rows in the X-direction and rows in the Y-direction may or maynot be perpendicular; when not perpendicular, they may be at an angle R that is 5, 10, 15, 20, 25, 30, 35, 40, or 45 degrees from perpendicular as illustrated in FIG. 22B.

The curved rows may be shaped in a variety of regular and/or irregular curvatures. In some examples, the curved rows may be shaped in a repeating wave pattern, such as for example, a repeating sinusoidal wave pattern. The sinusoidal wave pattern may be regular (i.e., a repeating amplitude and wavelength) or irregular (a varying amplitude and/or wavelength). The amplitude of the sinusoidal wave pattern (i.e., vertical distance between a peak or a valley and the equilibrium point of the wave) may be between about 0.75 mm and about 4.0 mm, or between about 0.75 mm and about 3.0 mm, or between about 1.0 mm and about 3.0 mm, or between about 1.0 mm and about 2.5 mm, or between about 1.25 mm and about 2.5 mm, or between about 1.25 mm and about 2.25 mm, or between about 1.5 mm and about 2.0 mm, or between about 1.6 mm and about 1.9 mm, or about 1.75 mm, specifically reciting all 0.05 mm increments within the above-recited ranges and all ranges formed therein or thereby. The wavelength of the sinusoidal wave pattern (i.e., the distance between two successive crests or troughs of the wave) may be between about mm and about 125.0 mm, or between about 25.0 mm and about 100.0 mm, or between about mm and about 75.0 mm, or between about 35.0 and about 65.0, or between 40.0 mm and about 60.0 mm, or between about 45.0 mm and about 55.0 mm, or about 50 mm, or about 52 mm, specifically reciting all 5 mm increments within the above-recited ranges and all ranges formed therein or thereby. The sinusoidal wave pattern may have an amplitude to wavelength ratio of between about 2 and about 7, or between about 2 and about 5, or between about 2.5 and about 5, or between about 3 and about 4, or between about 3.1 and about 3.8, or between about 3.2 and about 3.6, or between about 3.3 and about 3.4, or about 3.33, specifically reciting all 0.01 increments within the above-recited ranges and all ranges formed therein or thereby.

The fibrous structures containing the new wet-laid patterns as detailed herein (and shown in FIG. 4 as a non-limiting example), deliver a smoother, fuzzier, more cloth-like feel feeling surface when compared with previously-marketed BOUNTY® paper towels (as shown in FIG. 2), while also maintaining a desirable textured surface feel. This is because of the new cell shapes and/or sizes (as detailed herein), and in some embodiments, the curvature of the rows within the new patterns of cells (e.g., repeating sinusoidal wave with an amplitude and wavelength as detailed herein). Without being bound by theory, the new cell shapes and/or sizes allow for semi-discrete pillows or knuckles between the legs of the knuckle or pillow, respectfully—in addition to the continuous pillows—and such semi-discrete pillows allow for further improvements in absorbency and uptake parameters. Accordingly, these new cell shapes and/or sizes allow for fibrous structures with the parameters as detailed herein. The combination of the semi-discrete and non-discrete pillows contribute structural resiliency that provides improved dry and wet thickness.

Figure 20A:
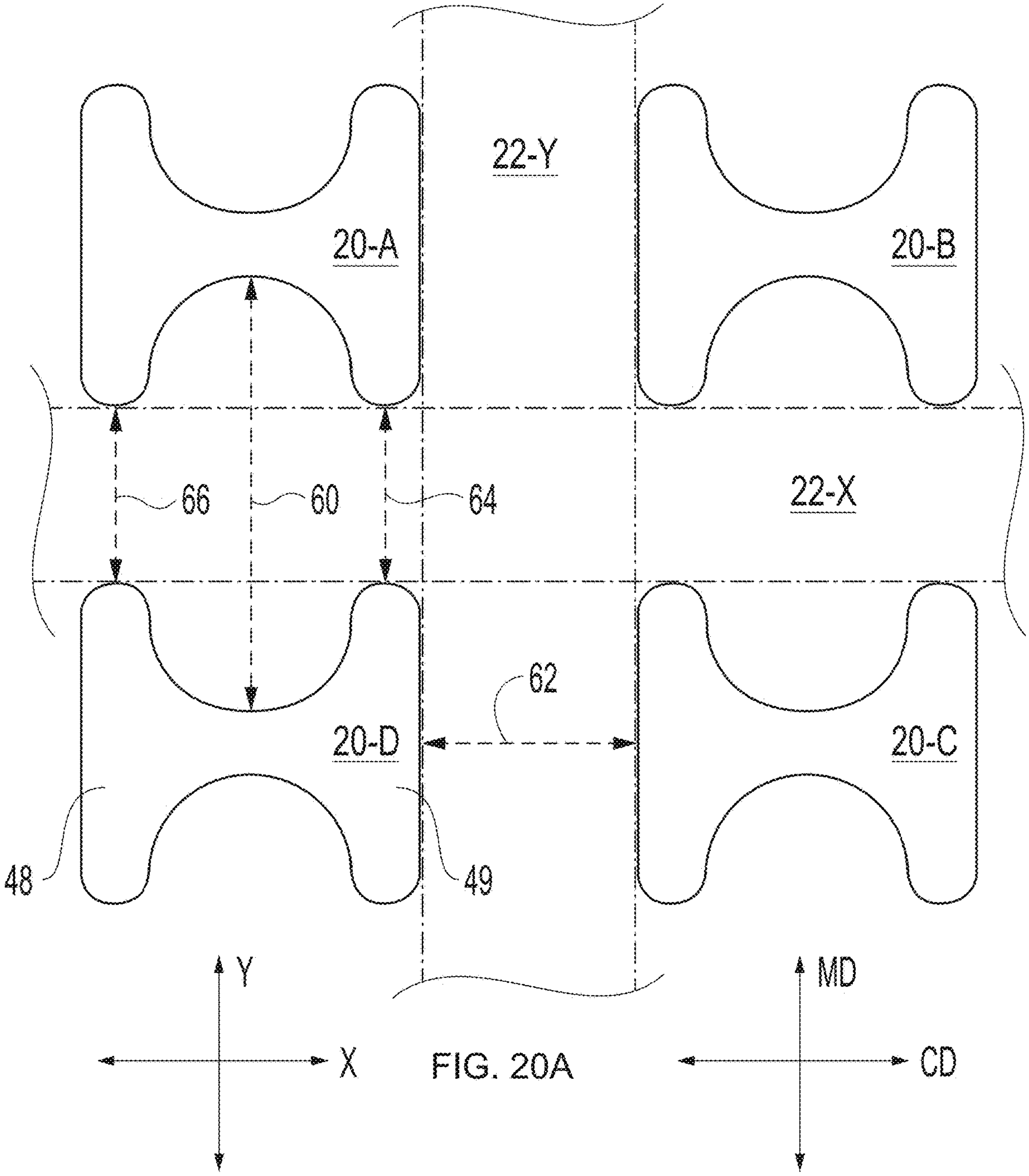
FIG. 20A is an enlarged view of a Cell Group showing a first continuous pillow along an X-direction and a second continuous pillow along a Y-direction, where the X-axis and the Y-axis are perpendicular to each other.
Figure 20B:
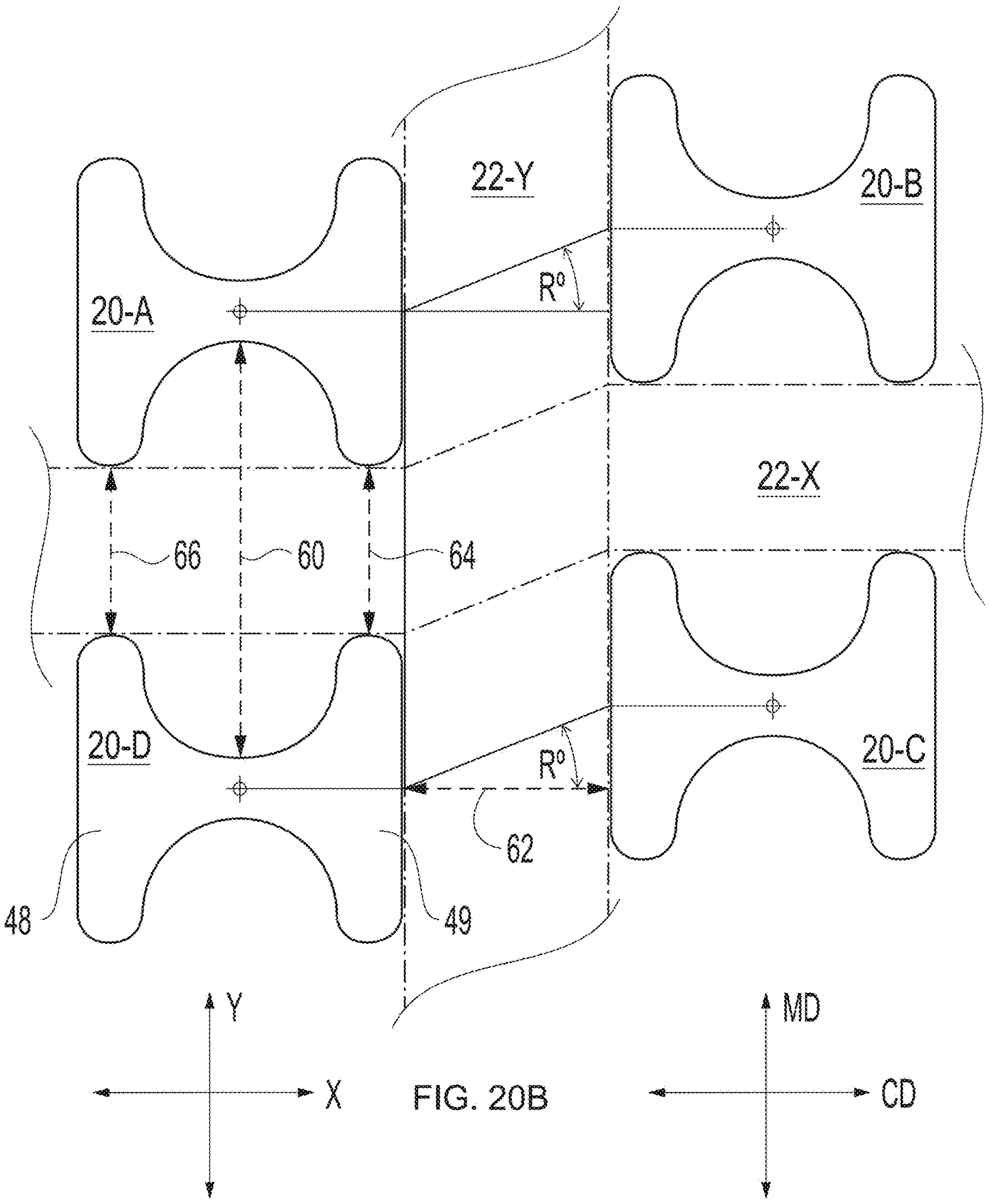
FIG. 20B is an enlarged view of a Cell Group showing a first continuous pillow along an X-direction and a second continuous pillow along a Y-direction, where the Cell Group is staggered, where the X-axis is not perpendicular with the Y-axis.
Figure 21A:
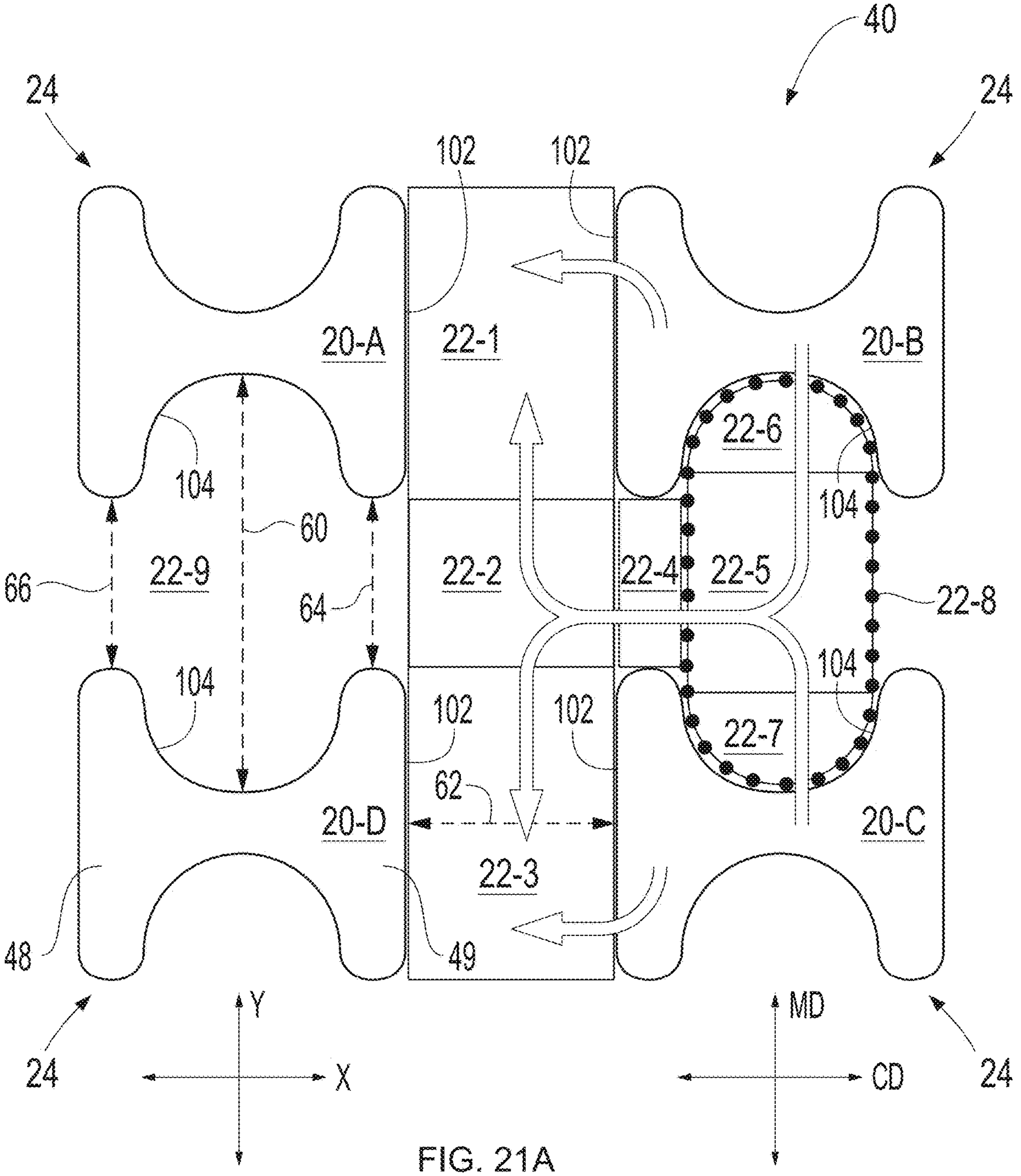
FIG. 21A is an enlarged view of a Cell Group showing distinct pillow regions within continuous pillows.

More particularly, when the discrete cells of the present disclosure are knuckles comprising one or more legs, fibers from the forming process flow around the legs to create continuous pillow area(s) having distinctly different densities, which creates distinct pillow regions—see, for example, FIGS. 20A and B illustrating a first continuous pillow 22-X along the X-direction and second continuous pillow 22-Y in the Y-direction, and see also, for example in FIGS. 21A and B, distinct pillow regions 22-1 through 22-9, where each of the pillow regions 22-1 through 22-9 may have distinctly different densities versus an adjacent pillow region. Percent density differences of continuous pillow and knuckle regions of interest can be found using the Continuous Region Density Difference Measurement below. For instance, distinct pillow regions of interest (e.g., 22-1, 22-2, 22-3, 22-8, and 22-9 in FIG. 21C) within a Cell Group of four may be at least 5%, 10%, 15, 20%, 25%, 30%, 35%, 40%, 45%, 50%, 55%, 60%, 65%, 70%, 75%, 80%, 85%, or 90% different from adjacent pillow regions of interest within the Cell Group of four. Still referring to FIGS. 21A and B, pillow region 22-2 may have a density at least 25%, 30%, 35%, 40%, 45%, 50% or greater than pillow region 22-1, and pillow region 22-1 and 22-3 may be substantially the same density, and pillow regions 22-6 and 22-7 may also be substantially the same density even though pillow pillow region 22-7 may be on a trailing edge of the knuckle 20-C, while pillow region 22-6 may be on a leading edge of knuckle 20-B. In this example, pillow regions 22-4, 22-5, 22-6, and 22-7 may have intermediate densities, such that pillow region 22-4, 22-5, 22-6, and 22-7 are at least 5%, 10%, 15%, or 20% less dense than pillow region 22-2, but at least 5%, 10%, 15%, or 20% more dense than pillow region 22-1. Continuing with this particular example illustrated in FIGS. 21A and B, the knuckle regions 20-A through 20-D each have densities greater than each of pillow regions 22-1 through 22-9, such that the absorption in this example is most driven by the most dense knuckle regions 20-A-20-D and fluid flows (illustrated in FIGS. 21A and B by the exaggerated hollow arrows) to less dense pillow regions 22-6 and 22-7, and continues to flow out to pillow region 22-5 and 22-4. Because of their density, knuckle regions 20-A through 20-D drive flow, but do not have as much fluid holding capacity as the lower density pillow regions 22-1 through 22-9. So as the fluid flows to pillow region 22-6, 22-7, and 22-5, part of the fluid starts to be held and, another part, if there is enough fluid, flows out through pillow region 22-4; thus, the fluid can then flow from pillow region 22-4 to pillow region 22-2, that is the most dense pillow region, so it acts like a pump, due to its relatively high density, to send the fluid to the least dense pillow region, 22-1, which has the greatest holding capacity due to its relatively low density. Some fluid also flows directly from knuckle regions A-D to pillow region 22-1. The details of this paragraph and as illustrated by FIGS. 21A and B are only one example of discrete cells comprising at least one leg and/or at least one concavity, but it nicely illustrates the functional benefit of such cells. Further, if the discrete cells are too close together or too far apart, desirable absorption speeds and holding capacities may not be achieved. Applicants have disclosed inventive spacing of inventive discrete cells, Cell Groups, and patterns herein. FIGS. 21A and B further illustrates that linear sides 102 (i.e., greater than 50%, 60%, 70%, 80%, 90% or the entirety of the side is linear) of cells 24 (e.g., 20A-D) may frame in pillow regions (e.g., 22-1 and 22-3) along a first axis (e.g., a Y-axis), while non-linear sides 104 (greater than 50%, 60%, 70%, 80%, 90% or the entirety of the side is non-linear) may frame in pillow regions (e.g., 22-8 and 22-9) along a second axis (e.g., an X-axis). The non-linear sides 104 of 20-B and 20-C are opposing concavities that frame in pillow region 22-8.

Figure 21B:
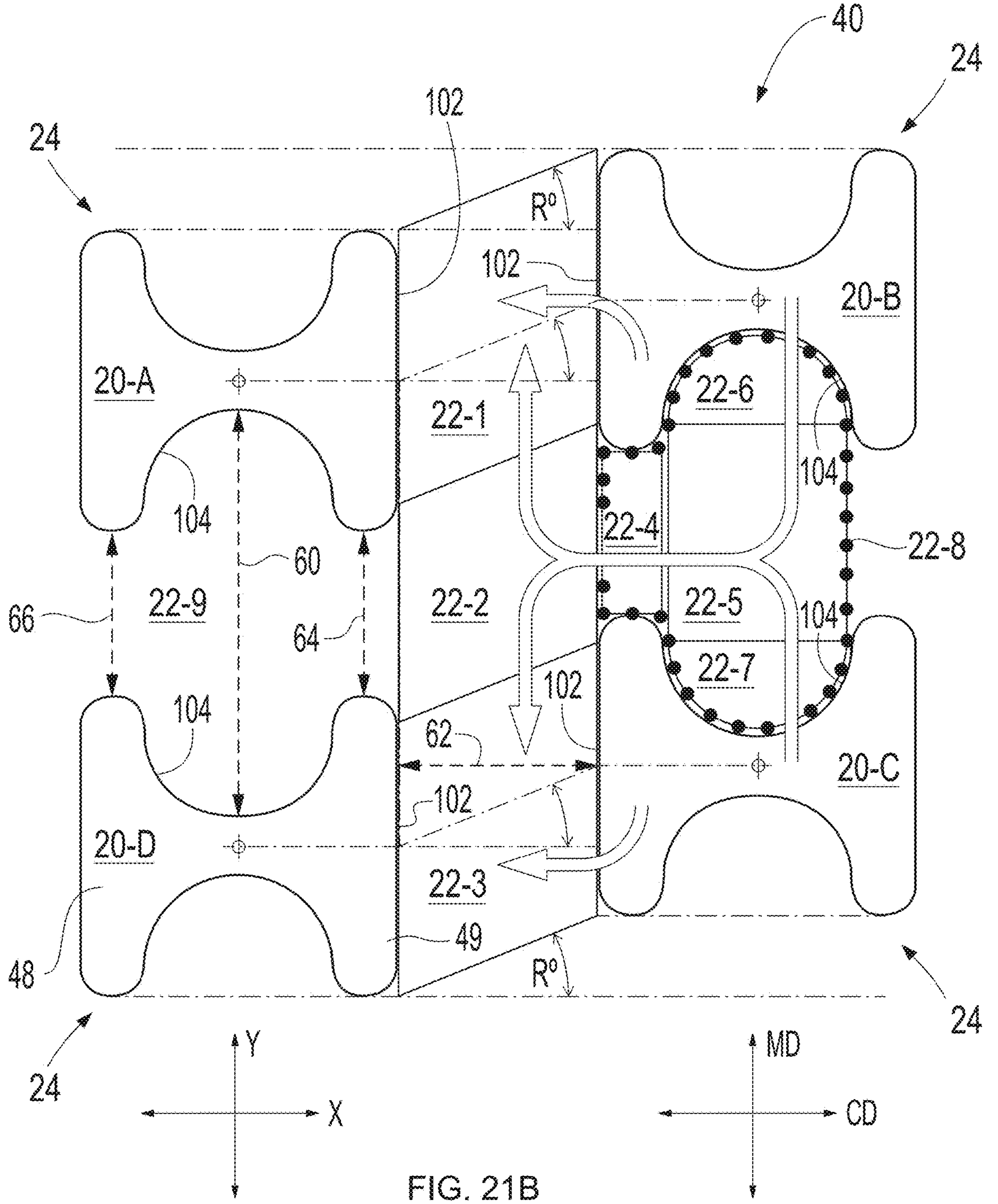
FIG. 21B is an enlarged view of a Cell Group comprising multiple distinct pillow regions within continuous pillows, where the Cell Group is staggered.

While FIGS. 21A and B illustrate pillow regions 22-4, 22-5, 22-6, and 22-7 as distinct pillow regions, pillow regions 22-5, 22-6, and 22-7 may be very similar to each other, may have similar densities, and may perform more like a single group that is denoted by the grouping of larger pillow region 22-8 in FIG. 21A and, this group may further comprise pillow regions 22-4, along with 22-5, 22-6, and 22-7 to form a larger pillow region 22-8 as in FIG. 21B.

Also, without being bound by theory, the curvature of the rows within the patterns of cells 14A, 14B, 14C, 14D provides a fibrous structure surface without an easily detectible ridge line when compared with previous fibrous structures having patterns that only included straight rows. Accordingly, as a consumer's finger moves across the surface of the new fibrous structures, the fingertip transitions from one cell 24 surface to the next without felling any distinct ridges. Moreover, from an aesthetic design perspective, the curvature of the rows in the patterns 14A, 14B, 14C, 14D allows for placement of larger or smaller pillow zones in closer proximity to one another without effecting the overall visual aesthetics. This allows the use of increased pillow zone sizes (i.e., farther distances between rows) that will increase absorbency in the fibrous structures (as measured by SST, for example) without a consumer noticeable impact to visual aesthetics. Such improvements in fibrous structure performance/aesthetics are noted in patterns wherein the pluralities of rows in one direction are curved (e.g., the plurality of rows oriented in an X-direction are curved or the plurality of rows oriented in a Y-direction are curved), and even further improved in patterns wherein pluralities of rows in both directions are curved (e.g., the plurality of rows oriented in an X-direction are curved and the plurality of rows oriented in a Y-direction are curved). Such improvements in fibrous structure performance/aesthetics can also be further improved in patterns that utilize knuckles of various size within the pattern, for example three different size knuckles within the pattern.

As detailed for the exemplary paper towel 10A of FIG. 4, the fibrous structures detailed herein can also be embossed to contain a series of line embossments 32 and dot embossments 34 in combination with the wet-formed knuckles 20 and pillows 22 pattern described herein to provide a desired aesthetic. Nonlimiting examples of the new fibrous structures as detailed herein, including the paper towel of FIG. 4, may have the following properties:

A basis weight of between about 30 g/m$^2$ and about 100 g/m$^2$, or between about 40 g/m$^2$ and about 65 g/m$^2$, or between about 45 g/m$^2$ and about 60 g/m$^2$, or between about 50 g/m$^2$ and about 58 g/m$^2$, or between about 50 g/m$^2$ and about 55 g/m$^2$, specifically reciting all 0.1 g/m$^2$ increments within the above-recited ranges and all ranges formed therein or thereby.

A TS7 value of less than about 40.00 dB V$^2$ rms, or less than about 20.00 dB V$^2$ rms, or less than about 19.50 dB V$^2$ rms, or less than about 19.00 dB V$^2$ rms, or less than about 18.50 dB V$^2$ rms, or less than about 18.00 dB V$^2$ rms, or less than about 17.50 dB V$^2$ rms, or between about 0.01 dB V$^2$ rms and about 20.00 dB V$^2$ rms, or between about 0.01 dB V$^2$ rms and about 19.50 dB V$^2$ rms, or between about 0.01 dB V$^2$ rms and about 19.00 dB V$^2$ rms, or between about 0.01 dB V$^2$ rms and about 18.50 dB V$^2$ rms, or between about 0.01 dB V$^2$ rms and about 18.00 dB V$^2$ rms, or between about 0.01 dB V$^2$ rms and about 17.50 dB V$^2$ rms, or between about 5.0 dB V$^2$ rms and about 20.00 dB V$^2$ rms, or between about 10.00 dB V$^2$ rms and about 20.00 dB V$^2$ rms, or between about 15.00 dB V$^2$ rms and about 20.00 dB V$^2$ rms, specifically reciting all 0.01 dB V$^2$ rms increments within the above-recited ranges and all ranges formed therein or thereby.

An SST value (absorbency rate) of greater than about 0.80 g/sec$^{0.5}$, greater than about 1.60 g/sec$^{0.5}$, or greater than about 1.65 g/sec$^{0.5}$, or greater than about 1.70 g/sec$^{0.5}$, or greater than about 1.75 g/sec$^{0.5}$, or greater than about 1.80 g/sec$^{0.5}$, or greater than about 1.82 g/sec$^{0.5}$, or greater than about 1.85 g/sec$^{0.5}$, or greater than about 1.88 g/sec$^{0.5}$, or greater than about 1.90 g/sec$^{0.5}$, or greater than about 1.95 g/sec$^{0.5}$, or greater than about 2.00 g/sec$^{0.5}$, or between about 1.60 g/sec$^{0.5}$ and about 2.50 g/sec$^{0.5}$, or between about 1.65 g/sec$^{0.5}$ and about 2.50 g/sec$^{0.5}$, or between about 1.70 g/sec$^{0.5}$ and about 2.40 g/sec$^{0.5}$, or between about 1.75 g/sec$^{0.5}$ and about 2.30 g/sec$^{0.5}$, or between about 1.80 g/sec$^{0.5}$ and about 2.20 g/sec$^{0.5}$, or between about 1.82 g/sec$^{0.5}$ and about 2.10 g/sec$^{0.5}$, or between about 1.85 g/sec$^{0.5}$ and about 2.00 g/sec$^{0.5}$, specifically reciting all 0.1 g/sec$^{0.5}$ increments within the above-recited ranges and all ranges formed therein or thereby.

A Plate Stiffness value of greater than about 8.0 N*mm, or greater than about 12.0 N*mm, or greater than about 12.5 N*mm, or greater than about 13.0 N*mm, or greater than about 13.5 N*mm, or greater than about 14 N*mm, or greater than about 14.5 N*mm, or greater than about 15 N*mm, or greater than about 15.5 N*mm, or greater than about 16 N*mm, or greater than about 16.5 N*mm, or greater than about 17 N*mm, or between about 12 N*mm and about 20 N*mm, or between about 12.5 N*mm and about 20 N*mm, or between about 13 N*mm and about 20 N*mm, or between about 13.5 N*mm and about 20 N*mm, or between about 14 N*mm between about 20 N*mm, or between about 14.5 N*mm and about 20 N*mm, or between about 15 N*mm and about 20 N*mm, or between about 15.5 N*mm and about 20 N*mm, or between about 16 N*mm and about 20 N*mm, or between about 16.5 N*mm and about 20 N*mm, or between about 17 N*mm and about 20 N*mm, specifically reciting all 0.1 N*mm increments within the above-recited ranges and all ranges formed therein or thereby.

A Resilient Bulk value of greater than about 60 cm$^3$/g, or greater than about 85 cm$^3$/g, or greater than about 90 cm$^3$/g, or greater than about 95 $cm^3/g$, or greater than about 100 $cm^3/g$, or greater than about 102 $cm^3/g$, or greater than about 105 $cm^3/g$, or between about 85 $cm^3/g$ and about 110 $cm^3/g$, or between about 90 $cm^3/g$ and about 110 $cm^3/g$, or between about 95 $cm^3/g$ and about 110 $cm^3/g$, or between about 100 $cm^3/g$ and about 110 $cm^3/g$, specifically reciting all 1 $cm^3/g$ increments within the above-recited ranges and all ranges formed therein or thereby.

A Total Wet Tensile value of greater than about 300 g/in, or greater than about 400 g/in, or greater than about 450 g/in, or greater than about 500 g/in, or greater than about 550 g/in, or greater than about 600 g/in, or greater than about 650 g/in, or greater than about 700 g/in, or greater than about 750 g/in, or greater than about 800 g/in, or greater than about 850 g/in, or greater than about 900 g/in, or between about 300 g/in and about 1000 g/in, or between about 400 g/in and about 900 g/in, or between about 500 g/in and about 900 g/in, or between about 550 g/in and about 900 g/in, or between about 600 g/in and about 900 g/in, or between about 650 g/in and about 900 g/in, or between about 700 g/in and about 900 g/in, specifically reciting all 10 g/in increments within the above-recited ranges and all ranges formed therein or thereby.

A Wet Burst value of greater than about 200 g, greater than about 300 g, or greater than about 350 g, or greater than about 400 g, or greater than about 450 g, or greater than about 500 g, or greater than about 550 g, or greater than about 600 g, or between about 200 g and about 700 g, or between about 350 g and about 600 g, or between about 350 g and about 550 g, or between about 400 g and about 550 g, or between about 400 g and about 525 g, specifically reciting all 10 g increments within the above-recited ranges and all ranges formed therein or thereby. A Flexural Rigidity value of greater than about 175 mg-cm, or greater than about 700 mg-cm, or greater than about 800 mg-cm, or greater than about 900 mg-cm, or greater than about 1000 mg-cm, or greater than about 1100 mg-cm, or greater than about 1200 mg-cm, or greater than about 1300 mg-cm, or greater than about 1400 mg-cm, or greater than about 1500 mg-cm, or greater than about 1600 mg-cm, or greater than about 1700 mg-cm, or between about 700 mg-cm and about 1800 mg-cm, or between about 800 mg-cm and about 1600 mg-cm, or between about 900 mg-cm and about 1400 mg-cm, or between about 1000 mg-cm and about 1350 mg-cm, or between about 1050 mg-cm and about 1350 mg-cm, or between about 1100 mg-cm and about 1350 mg-cm, or between about 1100 mg-cm and about 1300 mg-cm, specifically reciting all 10 mg-cm increments within the above-recited ranges and all ranges formed therein or thereby.

A Dry Caliper value of greater than about 26.0 mils, or greater than about 40 mils, or between about 26.0 mils and about 80.0 mils, or between 40.0 mils and 60.0 mils, specifically reciting all 0.10 mil increments within the above-recited ranges and all ranges formed therein or thereby.

A Wet Caliper value of greater than about 17.0 mils, or greater than about 26 mils, or between about 26.0 mils and about 70.0 mils, or between about 26.0 mils and about 40.0 mils, specifically reciting all 0.10 mil increments within the above-recited ranges and all ranges formed therein or thereby.

A Total Dry Tensile (Total Tensile) value of greater than about 1300 g/in, or greater than about 1700 g/in, or between about 1300 g/in and about 4000 g/in, or between about 1800 g/in and about 2800 g/in, specifically reciting all 10 g/in increments within the above-recited ranges and all ranges formed therein or thereby.

A Geometric Mean Dry Modulus value of greater than about 1000 g/cm, or greater than about 1700 g/cm, or between about 1800 g/cm and about 4000 g/cm, or between about 1800 g/cm and about 3500 g/cm, specifically reciting all 10 g/cm increments within the above-recited ranges and all ranges formed therein or thereby.

A Wet Tensile Geometric Mean Modulus value of greater than about 250 g/cm, or greater than about 375 g/cm, or between about 250 g/cm and about 700 g/cm, or between about 250 g/cm and about 525 g/cm, or between about 375 g/cm and 525 g/cm, specifically reciting all 10 g/cm increments within the above-recited ranges and all ranges formed therein or thereby.

A CRT rate value of greater than about 0.30 g/sec, or greater than about 0.61 g/sec, or between about 0.30 g/sec and about 1.00 g/sec, or between about 0.61 g/sec and about 0.85 g/sec, specifically reciting all 0.05 g/sec increments within the above-recited ranges and all ranges formed therein or thereby.

CRT capacity value of greater than about 10.0 g/g, or greater than about 12.5 g/g, or between about 12.5 g/g and about 23.0 g/g, or between about 16.5 g/g and about 21.5 g/g, specifically reciting all 0.1 g/g increments within the above-recited ranges and all ranges formed therein or thereby.

Emtec TS750 value of greater than about 40 dB $V^2$ rms, or greater than about 50 dB $V^2$ rms, or between about 50 dB $V^2$ rms and about 100 dB $V^2$ rms, specifically reciting all 10 dB $V^2$ rms increments within the above-recited ranges and all ranges formed therein or thereby.

Slip-stick value of greater than about 700, or between about 700 and about 1150, or between about 725 and about 1130, specifically reciting all increments of 10 within the above-recited ranges and all ranges formed therein or thereby.

Kinetic CoF value of greater than about 0.85, or between about 0.85 and about 1.30, or between about 0.85 and about 1.20, specifically reciting all 0.05 increments within the above-recited ranges and all ranges formed therein or thereby.

A Dry Depth value of more negative than −240 um, or more negative than −255 um, or more negative than −265 um, or more negative than −275 um, or more negative than −285 um, or more negative than −295 um, or more negative than −300 um, or between about −240 um and about −310 um, or between about −245 um and about −305 um, or between about −255 um and about −303 um, or between about −265 um and about −302 um, or between about −275 um and about −300 um, specifically reciting all 20 um increments within the above-recited ranges and all ranges formed therein or thereby. Particular inventive embodiments are disclosed in Table 9.

A Moist Depth value of more negative than −275 um, or more negative than −285 um, or more negative than −295 um, or more negative than −300 um, or more negative than −310 um, or more negative than −320 um, or more negative than −330 um, or between about −275 um and about −340 um, or between about −285 um and about −335 um, or between about −295 um and about −332 um, or between about −300 um and about −330 um, or between about −305 um and about −328 um, specifically reciting all 20 um increments within the above-recited ranges and all ranges formed therein or thereby.

A Moist Contact Area value of greater than 25%, or greater than 27%, or greater than 29%, or greater than 31%, or greater than 32%, or greater than 34%, or greater than 36%, or between about 25% and about 38%, or between about 27% and about 37%, or between about 29% and about 36%, or between about 30% and about 35%, or between about 31% and about 34%.

A Dry Contact Area value of greater than 17%, or greater than 20%, or greater than 22%, or greater than 24%, or greater than 26%, or greater than 28%, or greater than 30%, or between about 17% and about 33%, or between about 20% and about 31%, or between about 22% and about 30%, or between about 23% and about 30%, or between about 24% and about 29%.

Particular inventive embodiments are disclosed in Table 9. Regarding Dry and Moist Depth and Contact Area, it should be understood that a towel surface structure that holds up dry and wet will allow for resilient deep pockets that create reservoirs and edges for cleaning and absorbency. Contact Area may be viewed as is important when certain embodiments of the present disclosure create depth at the same time as increasing contact area. This can be important for cleaning for both paper towels, and especially for toilet paper. substrate that increases contact area along with depth can improve residual soil and liquid pick-up for thin films. Deeper dry and wet depth convey deeper visual texture while the dry and wet contact area can convey smootheness. Without being bound by theory, the new cell shapes provide enhanced columnar mechanics that allow for further improvements in depth that doesn't collapse in the dry or moist state. As discussed earlier the forming process flow around the legs to create continuous pillow area(s) having distinctly different densities further improve the contact area especially in the moist state.

A Dry Compression (value at 10 g force in mils) of greater than about 30 mils, or greater than about 45 mils, or greater than about 50 mils, or greater than about 55 mils, or greater than about 60 mils, or greater than about 65 mils, or greater than about 70, or greater than about 85 mils, or between about 40 mils and about 100 mils, or between about 50 mils and about 80 mils, or between about 50 mils and about 65 mils, or between about 50 mils and about 60 mils, or between about 55 mils and about 60 mils, specifically reciting all 5 mil increments within the above-recited ranges and all ranges formed therein or thereby.

A Wet Compression value (at 10 g force value) in mils of greater than about 30 mils, or greater than about 20 mils, or greater than about 30 mils, or greater than about 40 mils, or greater than about 50 mils, or greater than about 55, or greater than about 60 mils, or greater than about 70 mils, or between about 30 mils and about 100 mils, or between about 40 mils and about 70 mils, or between about 45 mils and about 60 mils, or between about 47 mils and about 58 mils, or between about 50 mils and about 55 mils, specifically reciting all 5 mil increments within the above-recited ranges and all ranges formed therein or thereby.

A Dry Bulk Ratio value of greater than about 15, or greater than about 22 or greater than about 25, or greater than about 27, or greater than about 33, or greater than about 35, or greater than about 40, or greater than about 50, or between about 15 and about 60, or between about 22 and about 50, or between about 25 and about 35, or between about 27 and about 35, or between about 27 and about 33, specifically reciting all 0.5 increments within the above-recited ranges and all ranges formed therein or thereby. "Dry Bulk Ratio" may be calculated as follows:

$$(\text{Dry Compression} \times \text{Flexural Rigidity})/\text{TDT}$$

Figure 16A:
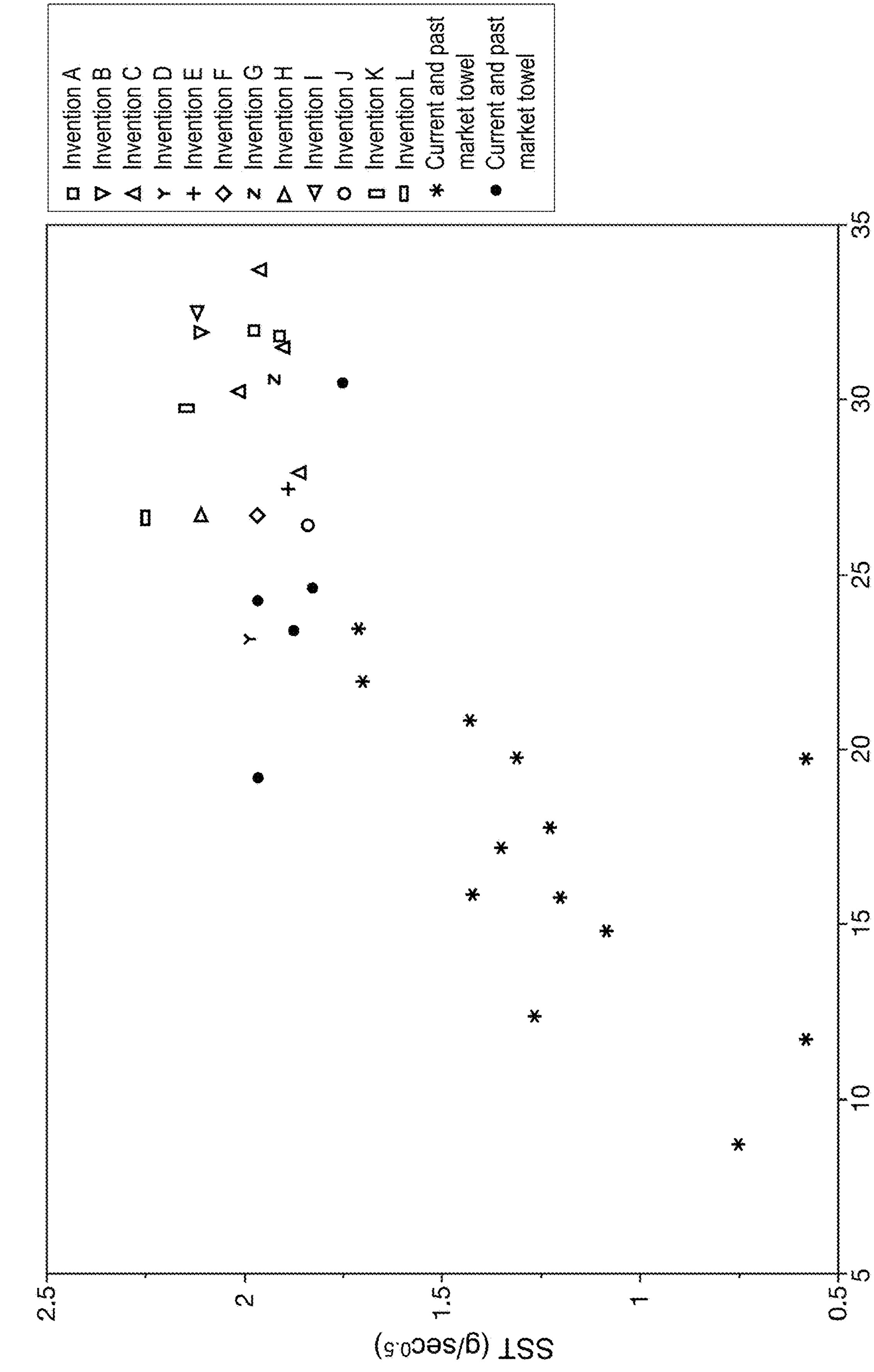
FIG. 16A is a graph illustrating SST vs. Dry Bulk Ratio data.
Figure 16B:
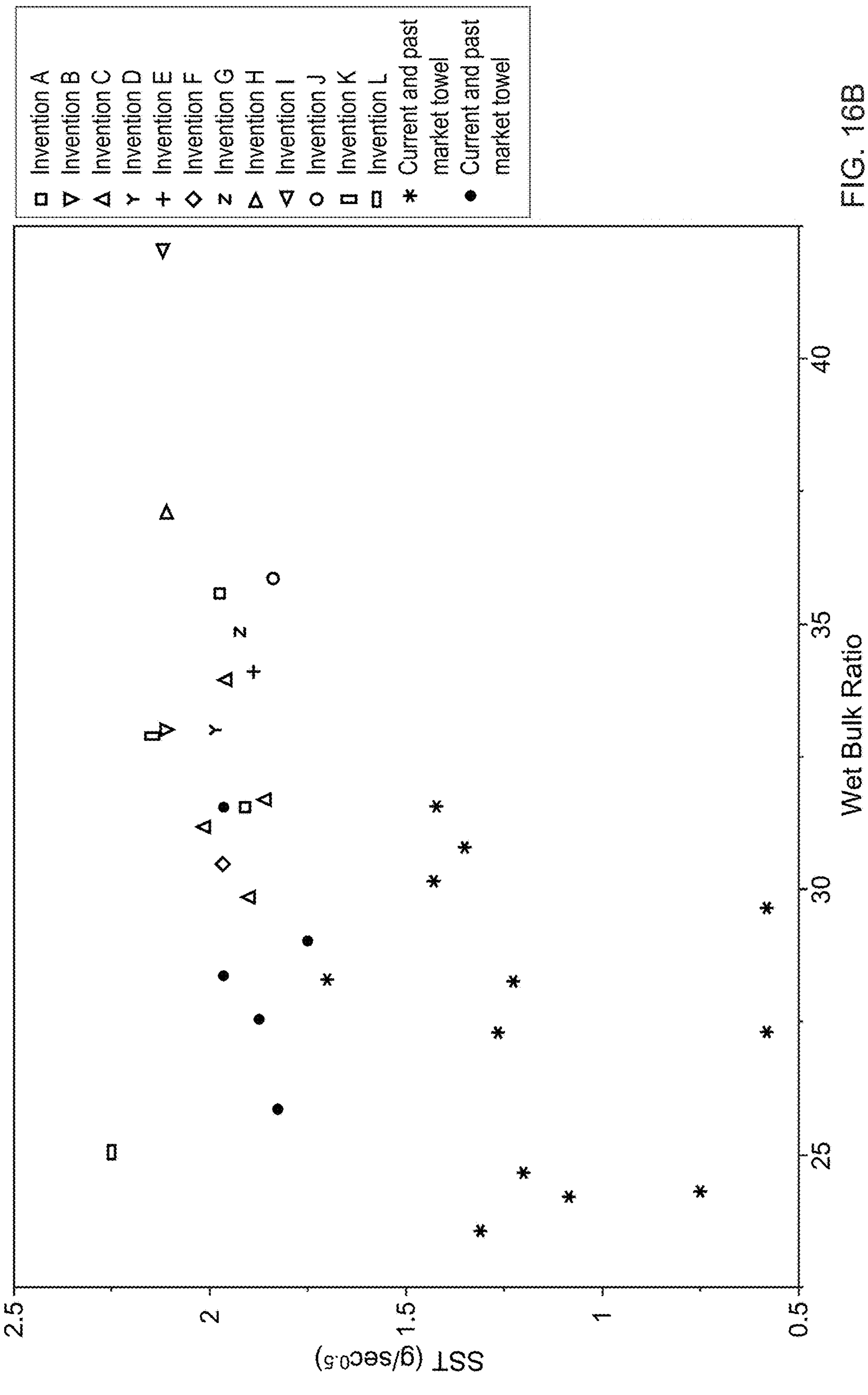
FIG. 16B is a graph illustrating SST vs. Wet Bulk Ratio data.
Figure 16C:
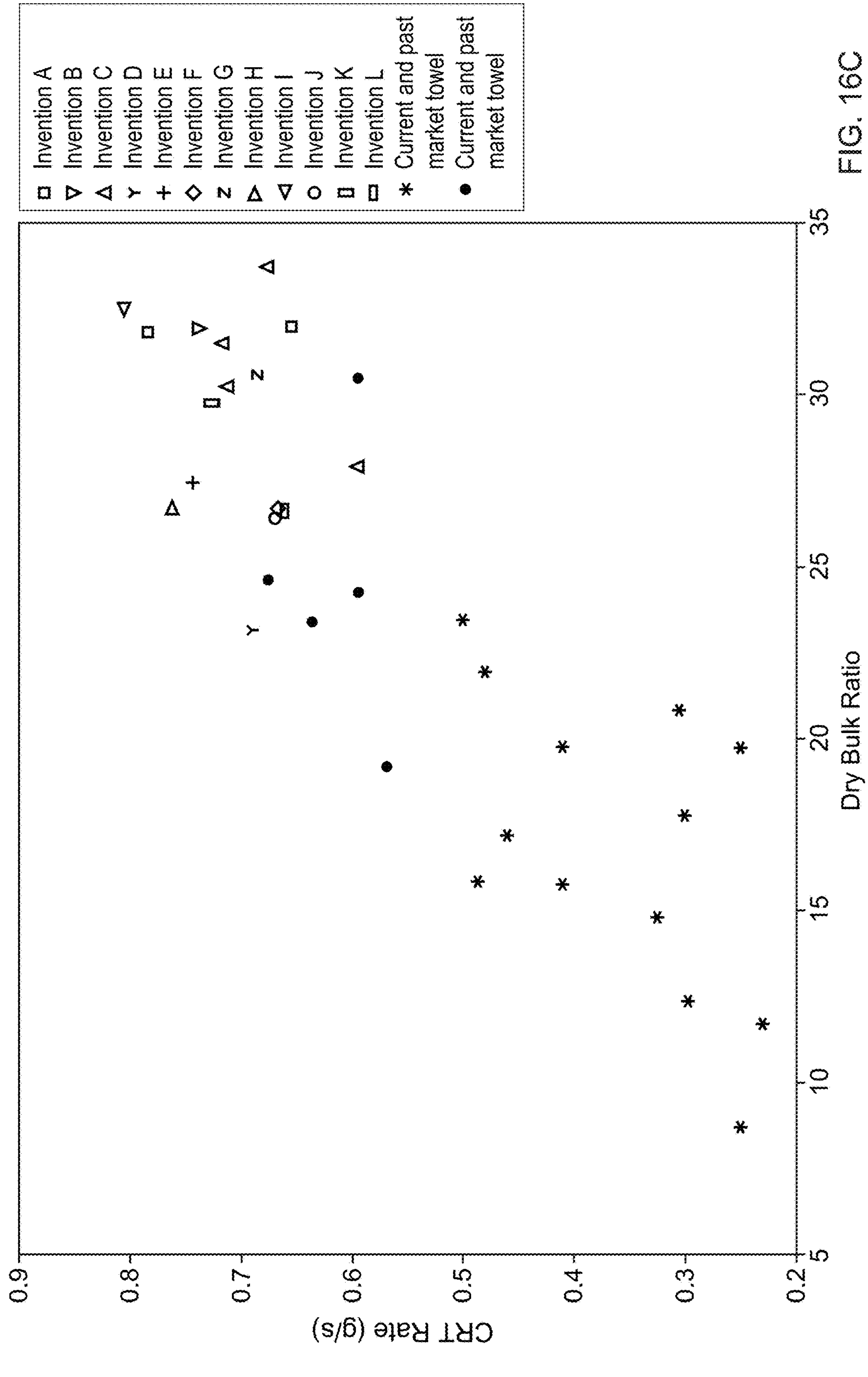
FIG. 16C is a graph illustrating CRT Rate vs. Dry Bulk Ratio data.
Figure 16D:
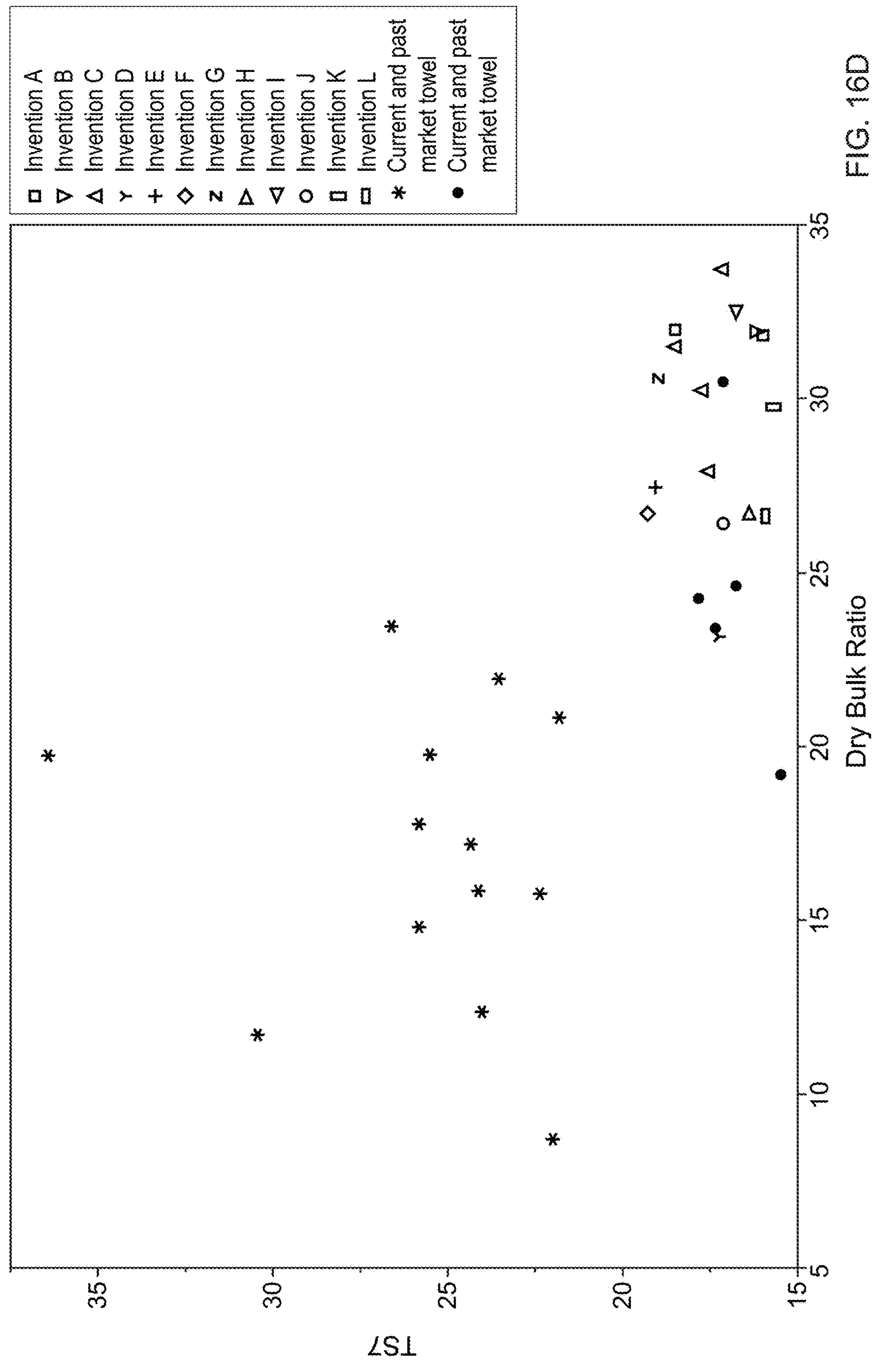
FIG. 16D is a graph illustrating TS7 vs Dry Bulk Ratio data.

This measure may is useful because in use or even prior to use, a fibrous structure with a Dry Bulk Ratio as disclosed herein gives the consumer the impression that the fibrous structure is thick enough and sturdy enough to last through a tough job. It should be understood that this property in combination with either CRT rate (g/s) or SST (g/sec$^{0.5}$) (see FIGS. 16A & 16C) results in a paper towel with improved Dry Bulk thickness and sturdiness with improved liquid uptake. Additionally, this property in combination with TS7 (see FIG. 16D) results in a paper towel with improved Dry Bulk thickness and sturdiness with improved surface feel. A paper towel with this combination of properties offers the consumer a unique combination of dry thickness and sturdiness combined with rapid liquid uptake with an improved surface feel, which is a particularly difficult set of properties to achieve at the same time.

A Wet Bulk Ratio value of greater than about 20, or greater than about 22, or greater than about 25, or greater than about 28, or greater than about 30, or greater than about 34, or greater than about 40, or greater than about 45, or greater than about 50, or greater than about 55, or between about 22 and about 50, or between about 20 and about 50, or between about 25 and about 45, or between about 28 and about 40, or between about 30 and about 34, specifically reciting all 0.5 inch increments within the above-recited ranges and all ranges formed therein or thereby. Wet Bulk Ratio may be calculated as follows:

$$(\text{Wet Compression} \times \text{Geometric Mean Wet Modulus})/\text{Total Wet Tensile}$$

Figure 16E:
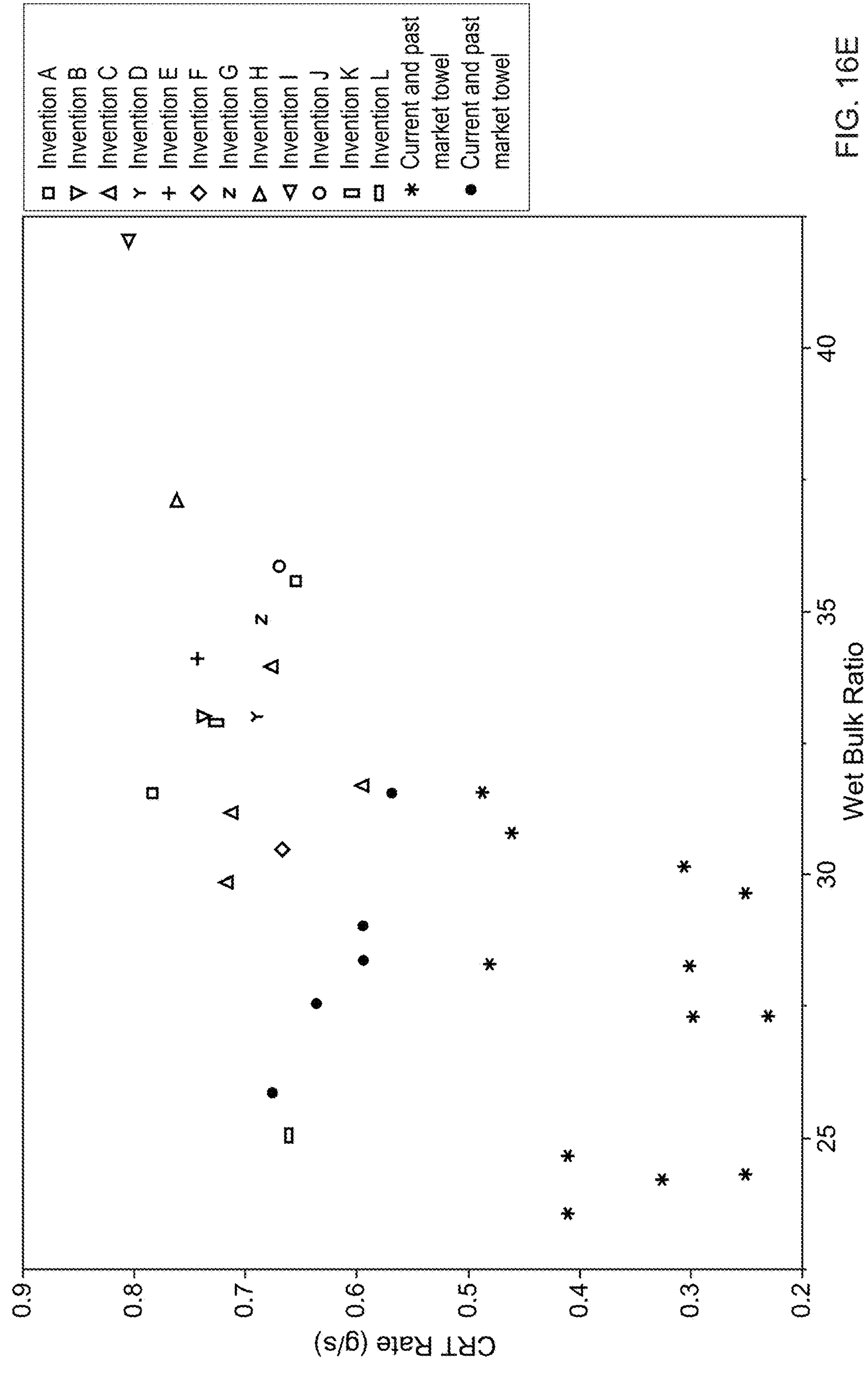
FIG. 16E is a graph illustrating CRT Rate vs. Wet Bulk Ratio data.
Figure 16F:
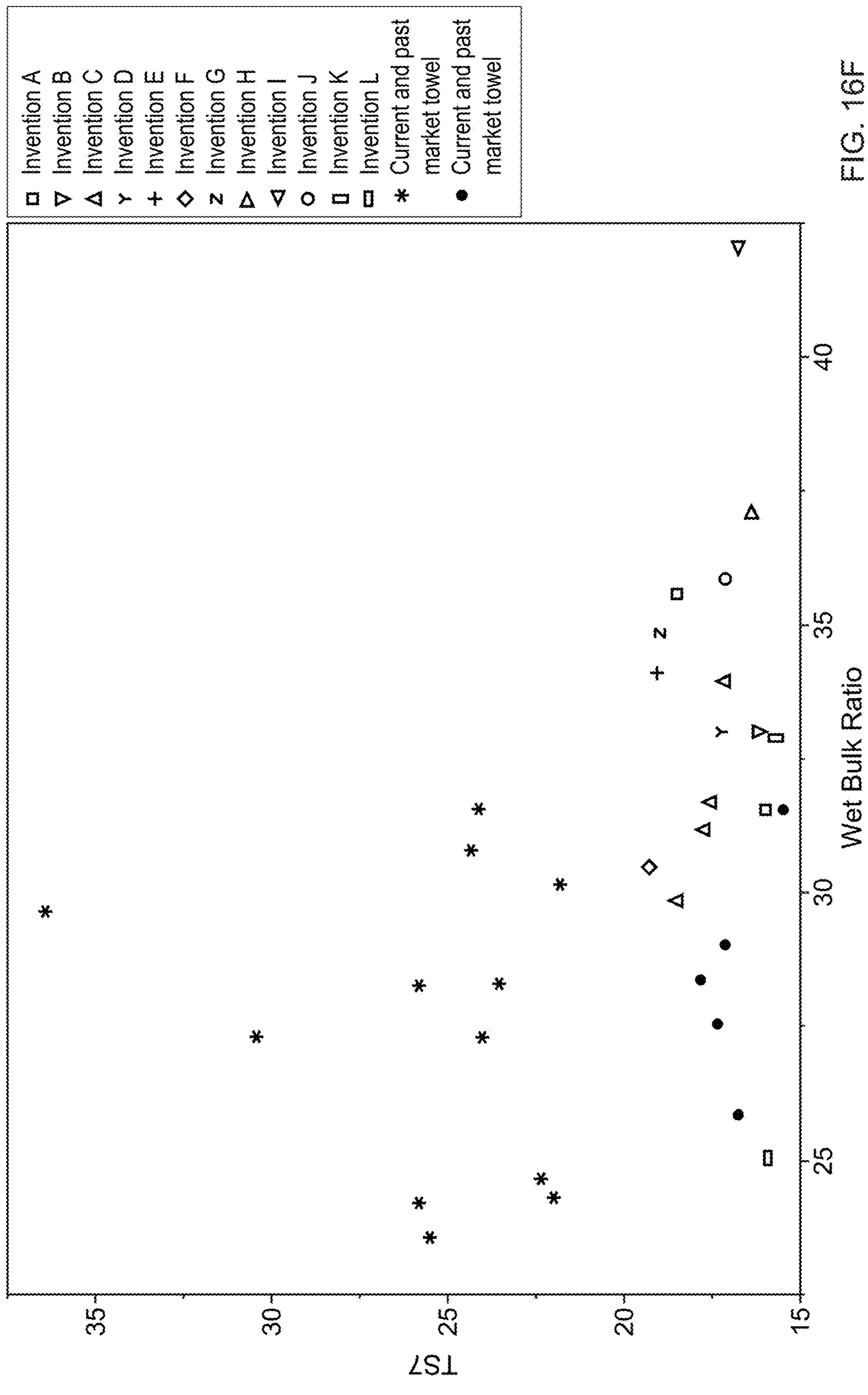
FIG. 16F is a graph illustrating TS7 vs. Wet Bulk Ratio data.
Figure 16G:
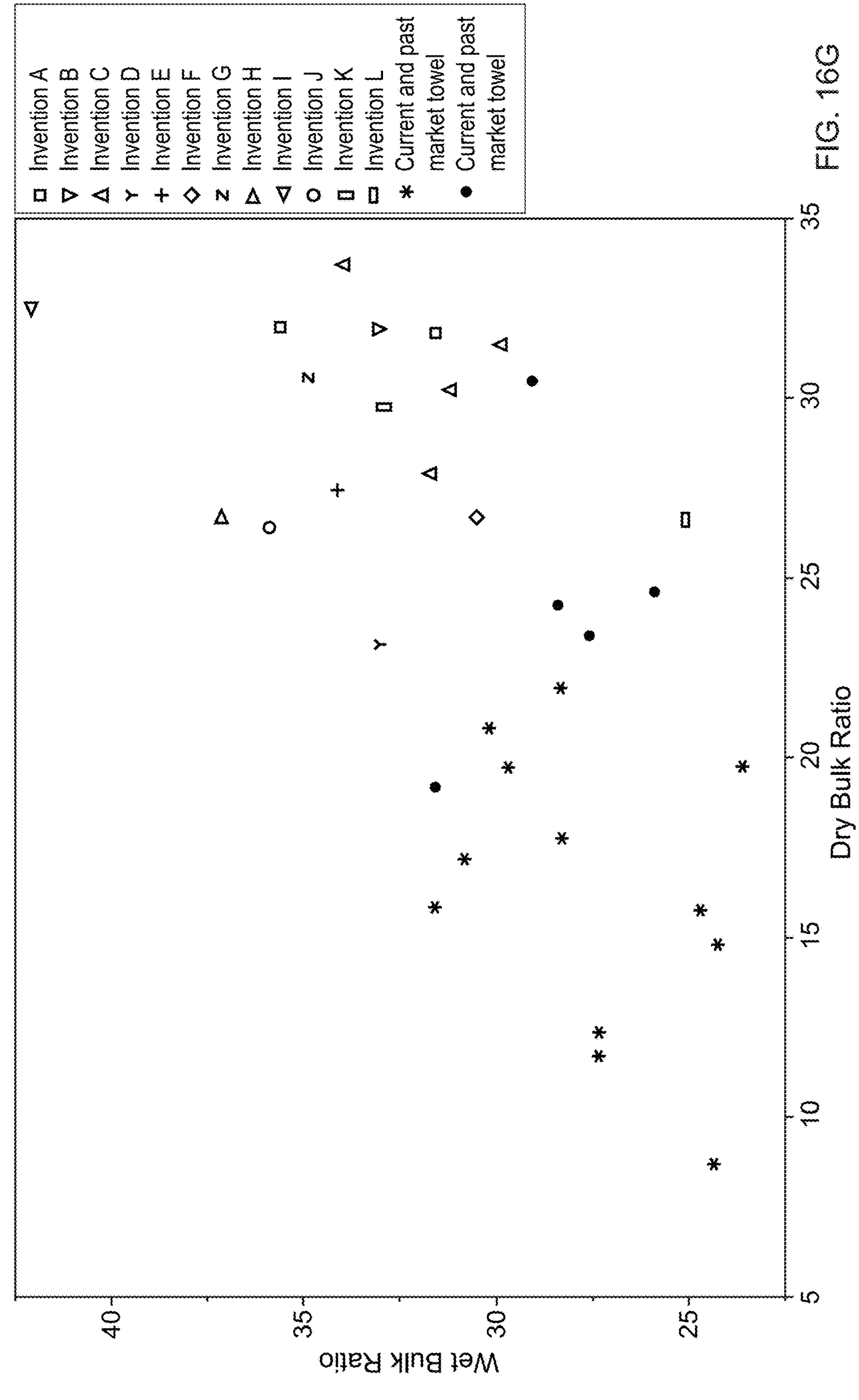
FIG. 16G is a graph illustrating Wet Bulk Ratio vs. Dry Bulk Ratio data.

This measure may is useful because in use, a fibrous structure with a Wet Bulk Ratio as disclosed herein gives the consumer the impression that the fibrous structure is thick enough and sturdy enough to last through a tough wet job. It should be understood that this property in combination with either CRT rate (g/s) or SST (g/sec$^{0.5}$) (see FIGS. 16B & 16E) results in a paper towel with improved Wet Bulk thickness and sturdiness with improved liquid uptake. Additionally, this property in combination with TS7 (see FIG. 16D) results in a paper towel with improved Wet Bulk thickness and sturdiness with improved surface feel. A paper towel with this combination of properties offers the consumer a unique combination wet thickness and sturdiness combined with rapid liquid uptake with an improved surface feel. Providing a paper towel with both improved wet bulk properties and dry bulk properties (see FIG. 16G) and with both improved liquid uptake and improved surface feel is a combination that has not yet, to the level of the fibrous structures of the present disclosure, been fully achieved with currently available paper towels.

A Concavity Ratio Measurement of greater than about 0.1, or greater than about 0.15, or greater than about 0.20, or greater than about 0.25, or greater than about 0.30, or greater than about or greater than about 0.40, or greater than about 0.45, or greater than about 0.50, or greater than about 0.55 or between about 0.10 and about 0.95, or between about 0.15 and about 0.90, or between about 0.20 and about 0.85, specifically reciting all 0.01 increments within the above-recited ranges and all ranges formed therein or thereby.

A Packing Fraction Measurement of greater than about 0.05, or greater than about 0.08, or greater than about 0.10, or greater than about 0.12, or greater than about 0.15, or greater than about or between about 0.05 and about 0.75, or between about 0.10 and about 0.80, or between about 0.15 and about 0.85, specifically reciting all 0.01 increments within the above-recited ranges and all ranges formed therein or thereby.

A density of pillow zones greater than about 0.05 g/cc, or greater than about 0.07 g/cc, or greater than about 0.09 g/cc, or greater than about 0.11 g/cc, or greater than about 0.12 g/cc, or greater than about 0.14 g/cc, or between about 0.05 g/cc and about 0.70 g/cc, or between about g/cc and about 0.65 g/cc, or between about 0.15 g/cc and about 0.6 g/cc, specifically reciting all 0.01 increments within the above-recited ranges and all ranges formed therein or thereby. The Micro-CT Intensive Property Measurement Method can be used to determine density of an area of interest.

Further nonlimiting examples of the new fibrous structures as detailed herein, including the paper towel of FIG. 4, may have the properties disclosed in the tables below and the graphs depicted in FIGS. 16A-G and 17A-C and made using the belt design in the tables below:

Belt Options AB, A, B C, D, E, F, G, I, J, K, L, M, N, O, and P of Table 1 are belts made with the specific patterns of cells as detailed herein:

TABLE 1

| Option | Cell Width, in | Saddle Height, in | Saddle Width, in | Leg Length, in | Leg Width, in | Distance Between Saddles, in | First leg Sep., in | Second Leg Sep., in | Distance Between Cells, in | First leg Sep./ Distance Between Saddles | Leg Length/ Saddle Height | Distance Between Cells/Leg Sep. |
|---|---|---|---|---|---|---|---|---|---|---|---|---|
| AB | 0.080 | 0.015-0.020 | 0.042-0.043 | 0.046-0.052 | 0.019-0.020 | 0.075-0.080 | 0.040-0.045 | 0.044-0.049 | 0.061-0.063 | 0.50-0.60 | 2.30-3.47 | 1.24-1.58 |
| A | 0.080 | 0.015 | 0.043 | 0.046 | 0.019 | 0.080 | 0.045 | 0.049 | 0.063 | 0.56 | 3.07 | 1.28 |
| B | 0.080 | 0.020 | 0.042 | 0.052 | 0.020 | 0.075 | 0.040 | 0.044 | 0.061 | 0.54 | 2.60 | 1.39 |
| C | 0.080 | 0.015 | 0.030 | 0.032 | 0.016 | 0.054 | 0.037 | 0.039 | 0.053 | 0.68 | 2.10 | 1.35 |
| E | 0.080 | 0.015 | 0.050 | 0.080 | 0.015 | 0.111 | 0.044 | 0.049 | 0.063 | 0.39 | 5.33 | 1.27 |
| F | 0.070 | 0.015 | 0.040 | 0.070 | 0.015 | 0.101 | 0.043 | 0.049 | 0.062 | 0.43 | 4.67 | 1.28 |
| G | 0.080 | 0.015 | 0.050 | 0.080 | 0.015 | 0.111 | 0.044 | 0.049 | 0.043 | 0.39 | 5.33 | 0.88 |
| I | 0.090 | 0.015 | 0.060 | 0.089 | 0.015 | 0.121 | 0.043 | 0.049 | 0.063 | 0.35 | 5.93 | 1.28 |
| J | 0.080 | 0.015 | 0.050 | 0.099 | 0.015 | 0.131 | 0.043 | 0.050 | 0.061 | 0.33 | 6.60 | 1.22 |
| K | 0.080 | 0.015 | 0.050 | 0.080 | 0.015 | 0.131 | 0.063 | 0.070 | 0.063 | 0.48 | 5.33 | 0.90 |
| L | 0.100 | 0.015 | 0.050 | 0.080 | 0.025 | 0.111 | 0.043 | 0.049 | 0.063 | 0.39 | 5.33 | 1.29 |
| M | 0.070-0.090 | 0.015 | 0.040-0.060 | 0.070-0.090 | 0.015 | 0.111 | 0.039-0.049 | 0.045-0.054 | 0.047-0.057 | 0.35-0.44 | 4.67-6.00 | 0.87-1.46 |
| N | 0.080 | 0.015 | 0.050 | 0.080 | 0.015 | 0.093 | 0.0308 | 0.026 | 0.043 | 0.33 | 5.33 | 1.65 |
| O | 0.110 | 0.020 | 0.069 | 0.110 | 0.200 | 0.128 | 0.036 | 0.043 | 0.059 | 0.28 | 5.50 | 1.37 |
| P | 0.066 | 0.013 | 0.042 | 0.066 | 0.013 | 0.077 | 0.022 | 0.026 | 0.035 | 0.29 | 5.08 | 1.35 |

Fibrous Structure Options AB, A, B, C, D, E, F, G, I, J, K, L, M, N, O, P, and Q of Table 2 were also tested as detailed herein (and correspond to the Belt Options AB-M above) and have the following parameters:

TABLE 2

| Option | Belt Option | Basis Wt (lb/3000 ft^2) | Dry Caliper (mils) | Wet Caliper (mils) | Total Dry Tensile (g/in) | Geometric Mean (GM) Dry Modulus (g/cm) | Wet Burst (g) | Total Wet Tensile (g/in) | Wet Tensile Geometric Mean (GM) Modulus (g/cm) |
|---|---|---|---|---|---|---|---|---|---|
| AB | AB | 34.9 | 45.3 | 31.2 | 2286 | 2425 | 471 | 697 | 411 |
| A | A | 35.3 | 45.5 | 30.2 | 2157 | 2479 | 422 | 638 | 427 |
| B | B | 34.6 | 45.2 | 31.9 | 2363 | 2393 | 501 | 733 | 401 |
| C | C | 35.2 | 49.0 | 33.1 | 2287 | 2130 | 462 | 708 | 421 |
| E | E | 35.4 | 48.0 | 34.0 | 2264 | 2284 | 453 | 698 | 449 |
| F | F | 35.0 | 46.3 | 33.3 | 2451 | 2645 | 501 | 768 | 435 |
| G | G | 34.8 | 47.5 | 32.9 | 2392 | 2171 | 472 | 736 | 457 |
| I | I | 35.4 | 47.0 | 31.4 | 2335 | 2382 | 482 | 735 | 436 |
| J | J | 35.6 | 46.3 | 32.6 | 2210 | 2233 | 441 | 685 | 414 |
| K | K | 35.1 | 43.9 | 31.4 | 2216 | 2681 | 434 | 641 | 461 |
| L | L | 35.4 | 46.3 | 32.9 | 2327 | 2381 | 421 | 708 | 488 |
| M | M | 34.8 | 45.9 | 32.8 | 2186 | 2577 | 442 | 662 | 467 |
| N | E | 34.5 | 47.8 | 35.3 | 2426 | 2832 | 480 | 747 | 434 |
| O | F | 34.9 | 46.4 | 33.5 | 2495 | 2685 | 513 | 790 | 436 |
| P | E | 35.5 | 48.0 | 33.8 | 2245 | 2219 | 450 | 692 | 451 |
| Q | F | 35.0 | 46.3 | 33.3 | 2451 | 2645 | 501 | 768 | 435 |

Tables 3A, 3B, 4, 5A and 5B disclose performance parameters of the Fibrous Structure Options of Table 2:

TABLE 3A

| Option | Belt Option | Slipstick | Kinetic Coefficient of Friction | Emtec TS7 (dB V^2 rms) | Emtec TS750 (dB V^2 rms) | SST (gm/sec^0.5) | CRT Rate (gm/sec) | CRT Capacity (gm/gm) | Flexural rigidity (mg-cm) |
|---|---|---|---|---|---|---|---|---|---|
| AB | AB | 935 | 1.13 | 16.2 | 48.2 | 2.16 | 0.72 | 20.3 | 1035 |
| A | A | 916 | 1.17 | 15.9 | 45.2 | 2.25 | 0.66 | 20.0 | 982 |
| B | B | 946 | 1.11 | 16.4 | 50.1 | 2.11 | 0.76 | 20.5 | 1067 |
| C | C | 956 | 1.11 | 15.7 | 48.3 | 2.15 | 0.73 | 19.2 | 1113 |
| E | E | 883 | 1.02 | 18.2 | 59.5 | 1.97 | 0.67 | 19.4 | 1148 |
| F | F | 920 | 1.04 | 18.3 | 72.4 | 1.93 | 0.72 | 19.5 | 1319 |
| G | G | 862 | 1.03 | 19.0 | 56.9 | 1.89 | 0.74 | 19.7 | 1130 |
| I | I | 951 | 1.04 | 19.3 | 59.2 | 1.97 | 0.67 | 17.9 | 1054 |
| J | J | 900 | 1.01 | 17.2 | 56.4 | 1.99 | 0.69 | 18.1 | 852 |
| K | K | 1044 | 1.08 | 19.0 | 62.3 | 1.92 | 0.68 | 18.1 | 1211 |
| L | L | 1025 | 1.08 | 17.1 | 65.1 | 1.84 | 0.67 | 17.5 | 1048 |
| M | M | 923 | 1.07 | 16.7 | 56.3 | 2.12 | 0.80 | 20.4 | 1184 |
| N | E | 911 | 1.10 | 16.0 | 77.6 | 1.91 | 0.78 | 21.1 | 1293 |
| O | F | 916 | 1.03 | 18.5 | 78.2 | 1.90 | 0.72 | 19.7 | 1362 |
| P | E | 880 | 1.02 | 18.5 | 57.3 | 1.97 | 0.65 | 19.3 | 1148 |
| Q | F | 931 | 1.07 | 17.7 | 54.9 | 2.01 | 0.71 | 19.1 | 1191 |

TABLE 3B

| Option | Belt Option | Flexural rigidity (mg-cm)/ Total Dry Tensile (gm/in) | Resilient Bulk ($cm^3/g$) | Plate Stiffness (N*mm) | Dry Compression (mils) | Wet Compression (mils) | Dry Bulk Ratio | Wet Bulk Ratio |
|---|---|---|---|---|---|---|---|---|
| AB | AB | 0.45 | 94.2 | 13.1 | 58.8 | 48.4 | 26.7 | 29.9 |
| A | A | 0.46 | 90.8 | 12.9 | 58.6 | 37.4 | 26.7 | 25.1 |
| B | B | 0.45 | 96.3 | 13.2 | 58.9 | 64.8 | 26.7 | 37.1 |
| C | C | 0.49 | 106.6 | 14.4 | 61.1 | 57.0 | 29.8 | 32.9 |
| E | E | 0.51 | 93.4 | 14.5 | 62.1 | 54.4 | 32.0 | 35.2 |
| F | F | 0.54 | 95.7 | 15.6 | 58.0 | 51.7 | 31.2 | 29.4 |
| G | G | 0.48 | 94.3 | 13.5 | 57.9 | 54.9 | 27.3 | 34.1 |
| I | I | 0.45 | 97.4 | 14.5 | 59.2 | 51.5 | 26.8 | 30.5 |
| J | J | 0.38 | 94.3 | 13.6 | 60.2 | 54.6 | 23.2 | 33.0 |
| K | K | 0.55 | 91.8 | 15.5 | 56.0 | 48.4 | 30.6 | 34.9 |
| L | L | 0.45 | 90.0 | 13.9 | 58.6 | 52.0 | 26.4 | 35.9 |
| M | M | 0.54 | 96.5 | 12.6 | 60.0 | 55.5 | 32.5 | 42.1 |
| N | E | 0.53 | 96.8 | 15.6 | 59.7 | 54.2 | 31.8 | 31.6 |
| O | F | 0.55 | 94.3 | 16.1 | 57.7 | 52.1 | 31.5 | 28.9 |
| P | E | 0.51 | 93.0 | 14.4 | 62.4 | 54.4 | 32.0 | 35.6 |
| Q | F | 0.51 | 99.9 | 14.0 | 58.9 | 50.5 | 30.2 | 31.2 |

TABLE 4

| Fibrous Structure Options | Belt Option | Basis Weight (lb/3000 ft^2) | Dry Caliper (mils) | Wet Caliper (mils) | Dry Total Tensile (g/in) | Geometric Mean (GM) Dry Modulus (g/cm) | Wet Burst (g) | Total Wet Tensile (g/in) | Wet Tensile Geometric Mean (GM) Modulus (g/cm) |
|---|---|---|---|---|---|---|---|---|---|
| AB | AB | 34.3-35.7 | 44.3-46.8 | 28.6-33.9 | 2084-2563 | 2155-2590 | 413-546 | 635-822 | 387-432 |
| A | A | 35.1-35.7 | 44.4-46.2 | 28.6-33.2 | 2084-2237 | 2439-2510 | 413-436 | 635-640 | 421-432 |
| B | B | 34.3-35.2 | 44.3-46.8 | 29.6-33.9 | 2143-2563 | 2155-2590 | 463-546 | 666-822 | 387-410 |
| C | C | 35.1-35.3 | 47.6-49.7 | 30.3-35.7 | 2142-2403 | 1892-2313 | 443-494 | 680-730 | 404-440 |
| G | G | 34.4-35.2 | 45.3-48.8 | 31.2-33.8 | 2315-2433 | 2104-2262 | 432-496 | 716-763 | 450-464 |
| I | I | 35.3-35.6 | 47.0 | 27.1-33.8 | 2292-2400 | 2261-2530 | 473-491 | 701-766 | 419-444 |
| J | J | 35.6-35.7 | 45.5-47.4 | 32.0-33.1 | 2131-2279 | 2189-2257 | 416-466 | 677-691 | 405-420 |
| K | K | 34.8-35.5 | 43.5-44.5 | 30.2-32.4 | 2178-2275 | 2589-2820 | 414-467 | 614-664 | 450-475 |
| L | L | 35.1-35.6 | 45.3-47.0 | 32.1-33.7 | 2298-2356 | 2240-2576 | 380-453 | 701-721 | 471-500 |
| M | M | 33.5-35.6 | 45.0-47.4 | 32.2-33.2 | 2084-2286 | 2216-2846 | 427-452 | 586-718 | 444-485 |
| M1 | M | 33.2-35.6 | 45.0-47.4 | 32.2-33.2 | 2084-2377 | 2216-2846 | 427-515 | 586-758 | 444-487 |

TABLE 4-continued

| Fibrous Structure Options | Belt Option | Basis Weight (lb/3000 ft^2) | Dry Caliper (mils) | Wet Caliper (mils) | Dry Total Tensile (g/in) | Geometric Mean (GM) Dry Modulus (g/cm) | Wet Burst (g) | Total Wet Tensile (g/in) | Wet Tensile Geometric Mean (GM) Modulus (g/cm) |
|---|---|---|---|---|---|---|---|---|---|
| N | E | 34.1-35.0 | 46.9-49.0 | 34.2-36.7 | 2313-2563 | 2694-3140 | 459-502 | 709-820 | 428-445 |
| O | F | 33.8-35.9 | 44.3-48.3 | 28.1-35.9 | 2204-2757 | 2054-3402 | 455-581 | 662-957 | 394-469 |
| P | E | 34.0-37.4 | 44.6-51.3 | 26.7-37.4 | 1951-2576 | 1979-2723 | 375-528 | 598-795 | 399-517 |
| Q | F | 34.2-36.1 | 43.8-48.4 | 27.5-34.8 | 2203-2431 | 2159-2763 | 425-499 | 608-747 | 401-460 |

TABLE 5A

| Fibrous Structure Options | Belt Option | Slipstick | Kinetic Coefficient of Friction | Emtec TS7 (db V^2 rms) | SST (gm/sec^0.5) | CRT Rate (gm/sec) | CRT Capacity (gm/gm) | Flexural rigidity (mg-cm) |
|---|---|---|---|---|---|---|---|---|
| AB | AB | 846-997 | 1.05-1.19 | 15.5-17.1 | 1.98-2.27 | 0.61-0.84 | 19.2-21.1 | 940-1104 |
| A | A | 846-961 | 1.16-1.19 | 15.5-16.2 | 2.22-2.27 | 0.61-0.74 | 19.2-20.9 | 940-1060 |
| B | B | 878-997 | 1.05-1.13 | 15.9-17.1 | 1.98-2.22 | 0.65-0.84 | 20.0-21.1 | 996-1104 |
| C | C | 879-1030 | 1.09-1.15 | 15.4-16.0 | 2.04-2.24 | 0.66-0.79 | 18.1-20.0 | 1096-1143 |
| G | G | 832-919 | 0.99-1.06 | 18.4-19.9 | 1.67-2.08 | 0.69-0.77 | 18.0-21.4 | 1057-1211 |
| I | I | 891-1000 | 1.03-1.05 | 18.1-19.9 | 1.95-1.98 | 0.61-0.70 | 16.7-18.7 | 1032-1068 |
| J | J | 856-978 | 0.99-1.03 | 16.2-17.9 | 1.96-2.04 | 0.67-0.71 | 17.8-18.5 | 777-910 |
| K | K | 985-1127 | 1.06-1.09 | 17.6-20.3 | 1.89-1.99 | 0.65-0.71 | 17.8-18.3 | 1132-1337 |
| L | L | 940-1115 | 1.03-1.13 | 16.0-18.0 | 1.77-1.89 | 0.60-0.73 | 16.6-18.3 | 1010-1089 |
| M | M | 828-984 | 1.03-1.08 | 16.4-16.9 | 53.7-59.2 | 0.79-0.83 | 20.1-20.9 | 994-1311 |
| M1 | M | 828-1051 | 1.03-1.17 | 15.5-17.3 | 2.07-2.15 | 0.79-0.87 | 20.1-20.9 | 994-1311 |
| N | E | 850-958 | 1.08-1.13 | 15.3-16.7 | 1.81-2.00 | 0.77-0.80 | 20.9-21.5 | 1166-1471 |
| O | F | 767-1030 | 0.97-1.11 | 16.2-24.7 | 1.66-2.26 | 0.59-0.85 | 17.1-21.0 | 1140-1536 |
| P | E | 735-1050 | 0.87-1.14 | 16.1-20.2 | 1.68-2.22 | 0.51-0.86 | 17.7-21.2 | 923-1421 |
| Q | F | 798-1014 | 1.00-1.11 | 16.1-19.6 | 1.82-2.12 | 0.62-0.80 | 17.0-20.7 | 1038-1334 |

TABLE 5B

| Fibrous Structure Options | Belt Option | Flexural rigidity (mg-cm)/ Dry Total Tensile (gmin) | Resilient Bulk ($cm^3/g$) | Plate Stiffness (N*mm) | Dry Compression (mils) | Wet Compression (mils) | Dry Bulk Ratio | Wet Bulk Ratio |
|---|---|---|---|---|---|---|---|---|
| AB | AB | 0.42-0.51 | 89.7-98.9 | 12.1-14.7 | 57.5-60.7 | 34.3-73.4 | 24.5-31.1 | 23.2-42.6 |
| A | A | 0.42-0.49 | 89.7-92.8 | 12.1-13.7 | 58.1-59.0 | 34.3-42.3 | 24.7-29.1 | 23.2-28.5 |
| B | B | 0.42-0.51 | 93.8-98.9 | 12.5-14.7 | 57.5-60.7 | 56.3-73.4 | 24.5-31.1 | 31.7-42.6 |
| C | C | 0.46-0.52 | 102.6-108.6 | 13.3-15.2 | 60.0-62.6 | 55.4-58.5 | 27.4-32.5 | 31.1-34.8 |
| G | G | 0.44-0.50 | 87.8-99.1 | 12.2-14.7 | 56.0-59.6 | 54.1-55.9 | 26.2-29.2 | 32.6-35.8 |
| I | I | 0.43-0.47 | 95.4-99.1 | 13.6-15.4 | 58.2-59.9 | 47.4-54.5 | 25.8-27.8 | 30.0-30.9 |
| J | J | 0.36-0.40 | 90.8-96.4 | 13.0-14.3 | 58.9-60.9 | 53.7-56.0 | 21.5-24.3 | 31.4-34.6 |
| K | K | 0.52-0.59 | 91.3-92.0 | 14.7-16.4 | 55.2-56.5 | 48.0-48.7 | 28.5-33.2 | 32.5-36.3 |
| L | L | 0.43-0.47 | 88.8-90.7 | 13.7-14.0 | 58.4-58.8 | 49.3-53.5 | 25.1-27.9 | 33.7-37.9 |
| M | M | 0.48-0.59 | 94.9-100.6 | 12.3-12.8 | 58.7-63.3 | 55.5 | 28.2-37.4 | 42.1 |
| N | E | 0.47-0.57 | 94.2-99.1 | 14.0-18.4 | 58.6-60.8 | 53.0-55.4 | 27.3-34.9 | 28.9-32.7 |
| O | F | 0.49-0.61 | 87.3-100.2 | 13.7-18.6 | 54.5-59.8 | 47.6-54.9 | 27.7-35.3 | 22.1-32.6 |
| P | E | 0.42-0.62 | 69.8-105.5 | 11.0-18.2 | 56.5-78.5 | 35.7-64.8 | 24.2-41.2 | 22.7-48.5 |
| Q | F | 0.47-0.57 | 92.0-124.9 | 11.6-16.3 | 56.2-60.7 | 38.7-55.4 | 26.5-34.4 | 23.5-35.3 |

Current Market or Previously Marketed products were also tested as detailed herein and have the following testing parameters as disclosed in Tables 6, 7A, and 7B:

TABLE 6

| Option | Basis Wt (lb/3000 ft^2) | Dry Caliper (mils) | Wet Caliper (mils) | Total Dry Tensile (g/in) | Geometric Mean (GM) Dry Modulus (g/cm) | Wet Burst (g) | Total Wet Tensile (g/in) | Wet Tensile Geometric Mean (GM) Modulus (g/cm) |
|---|---|---|---|---|---|---|---|---|
| Current Bounty | 34.4 | 46.0 | 35.2 | 2627 | 2756 | 545 | 860 | 434 |
| Current Bounty | 34.6 | 45.0 | 31.7 | 2491 | 2617 | 482 | 782 | 428 |
| Past Bounty | 33.7 | 43.1 | 33.3 | 2377 | 2471 | 474 | 695 | 434 |
| Scott Towel | 22.2 | 33.0 | 18.1 | 1479 | 1090 | 249 | 427 | 384 |
| Viva Multi Surface Towel | 34.0 | 39.5 | 22.9 | 1955 | 2237 | 321 | 648 | 453 |
| Viva Signature | 41.0 | 32.5 | 24.8 | 866 | 482 | 228 | 322 | 205 |
| Brawny | 31.7 | 30.9 | 24.2 | 1875 | 2573 | 260 | 499 | 365 |
| Sam's Member's Mark | 27.5 | 28.4 | 23.7 | 2082 | 3687 | 301 | 57 | 525 |
| Sam's Member's Mark | 26.5 | 30.6 | 23.5 | 2031 | 2386 | 284 | 660 | 542 |
| CA MAX | 32.1 | 39.7 | 26.2 | 2282 | 1976 | 337 | 676 | 449 |
| Royale Tiger | 31.3 | 36.2 | 25.9 | 2240 | 1988 | 324 | 629 | 450 |
| Sparkle | 29.4 | 29.4 | 12.5 | 1903 | 2712 | 184 | 457 | 421 |
| Walmart Great Value Ultra Strong | 31.0 | 26.6 | 19.0 | 1999 | 3481 | 207 | 487 | 406 |
| Walmart Great Value Ultra Strong | 26.9 | 28.9 | 21.7 | 1984 | 2524 | 288 | 506 | 399 |
| Walmart Great Value Ultra Strong | 26.6 | 29.1 | 21.3 | 1836 | 2424 | 294 | 596 | 561 |
| Home Depot HDX | 29.8 | 29.0 | 20.8 | 2335 | 2932 | 345 | 628 | 481 |

TABLE 7A

| Option | Slipstick | Kinetic Coefficient of Friction | Emtec TS7 (dB V^2 rms) | Emtec TS750 (dB V^2 rms) | SST (gm/ sec^0.5)) | CRT Rate (gm/sec) | CRT Capacity (gm/gm) | Flexural rigidity (mg-cm) |
|---|---|---|---|---|---|---|---|---|
| Current Bounty with M9 | 925 | 1.10 | 16.7 | 67.0 | 1.83 | 0.68 | 19.9 | 1129 |
| Current Bounty M10 | 939 | 1.09 | 17.3 | 54.8 | 1.87 | 0.64 | 18.7 | 1008 |
| Past Bounty | 864 | 1.12 | 15.5 | 46.3 | 1.96 | 0.57 | 20.2 | 823 |
| Scott Towel | | | 30.4 | | 0.58 | 0.23 | 15.8 | 421 |
| Viva Multi Surface Towel | | | 24.3 | | 1.35 | 0.46 | 16.3 | 650 |
| Viva Signature | | | 22.0 | | 0.75 | 0.25 | 13.1 | 187 |
| Brawny | | | 25.5 | | 1.31 | 0.41 | 14.1 | 972 |
| Sam's Member's Mark | | | 21.8 | | 1.43 | 0.31 | 16.4 | 1236 |
| Sam's Member's Mark | | | 24.1 | | 1.42 | 0.49 | 17.8 | 830 |
| CA MAX | | | 26.6 | | 1.71 | 0.50 | 16.7 | 1095 |
| Royale Tiger | | | 23.5 | | 1.70 | 0.48 | 15.9 | 1098 |
| Sparkle | | | 36.4 | | 0.58 | 0.25 | 8.9 | 1037 |
| Walmart Great Value Ultra Strong | | | 24.0 | | 1.27 | 0.30 | 12.7 | 737 |
| Walmart Great Value Ultra Strong | | | 25.8 | | 1.08 | 0.33 | 15.7 | 838 |
| Walmart Great Value Ultra Strong | | | 25.8 | | 1.23 | 0.30 | 14.8 | 926 |
| Home Depot HDX | | | 22.3 | | 1.20 | 0.41 | 13.9 | 1069 |

TABLE 7B

| Option | Flexural rigidity (mg-cm)/ Total Dry Tensile (gm/in) | Resilient Bulk ($cm^3/g$) | Plate Stiffness (N*mm) | Dry Compression (mils) | Wet Compression (mils) | Dry Bulk Ratio | Wet Bulk Ratio |
|---|---|---|---|---|---|---|---|
| Current Bounty M9 | 0.43 | 105.4 | 13.9 | 57.3 | 51.2 | 24.9 | 25.9 |
| Current Bounty M10 | 0.40 | 97.8 | 13.0 | 57.9 | 50.4 | 23.4 | 27.6 |
| Past Bounty | 0.35 | 98.7 | 13.4 | 55.6 | 50.5 | 19.2 | 31.6 |
| Scott Towel | 0.28 | 86.1 | 13.5 | 38.1 | 32.3 | 11.9 | 27.3 |
| Viva Multi Surface Towel | 0.33 | 85.0 | 10.4 | 35.2 | 33.0 | 17.1 | 30.8 |
| Viva Signature | 0.22 | 86.0 | 9.8 | 38.8 | 38.5 | 8.6 | 24.3 |
| Brawny | 0.52 | 96.2 | 16.4 | 48.9 | | 19.7 | 23.6 |
| Sam's Member's Mark | 0.59 | 92.9 | 12.4 | 44.8 | 39.5 | 20.9 | 30.2 |
| Sam's Member's Mark | 0.41 | 68.8 | 9.9 | 35.9 | 32.2 | 15.9 | 31.6 |
| CA MAX | 0.48 | 80.0 | 9.6 | 33.6 | 32.8 | 23.5 | |
| Royale Tiger | 0.49 | 81.0 | 10.2 | 35.1 | 30.7 | 22.0 | 28.3 |
| Sparkle | 0.54 | 87.0 | 10.7 | 35.3 | 30.1 | 19.6 | 29.7 |
| Walmart Great Value Ultra Strong | 0.37 | 83.1 | 10.3 | 35.9 | 32.2 | 12.4 | 27.3 |
| Walmart Great Value Ultra Strong | 0.42 | 79.6 | 8.0 | 41.9 | 30.4 | 14.8 | 24.2 |
| Walmart Great Value Ultra Strong | 0.50 | 71.8 | 11.7 | 52.1 | 44.1 | 17.8 | 28.3 |
| Home Depot HDX | 0.46 | 71.3 | 6.0 | 39.7 | 38.2 | 16.4 | 24.7 |

Tables 8A and 8B disclose multiple Fibrous Structure Options comprising various cells as disclosed herein:

TABLE 8A

| Fibrous Structure Option | R | S | T | U | V | W | X |
|---|---|---|---|---|---|---|---|
| Cell shape | FIG. 9a | FIG. 9A | FIG. 9B | FIG. 9C | FIG. 9D | FIG. 9H | FIG. 9J |
| Average Distance between Saddle | .101 | .111 | .101 | .100 | .100 | 0.111 | 0.101 |
| Average Distance between Cells | .062 | .063 | 0.46-0.101 | 0.066-0.098 | 0.061-0.088 | 0.063 | 0.060 |
| Fiber blend | 40% Eucalyptus, 60% softwood | 40% Eucalyptus, 60% softwood | 40% Eucalyptus, 60% softwood | 40% Eucalyptus, 60% softwood | 40% Eucalyptus, 60% softwood | 40% Eucalyptus, 60% softwood | |
| Density (g/cc) | | | | | | | |
| Pillow region-Figure 21A, 22-1 21a | 0.160 | 0.161 | | | | 0.166 | |
| Pillow region Figure 21A 22-2 | 0.227 | 0.282 | | | | 0.279 | |
| Pillow region-Figure 21A, 22-4 | 0.227 | 0.260 | | | | | |
| Pillow region-Figure 21A, 22-8 | 0.221 | 0.207 | | | | 0.215 | |
| % Diffence between Maximum and Minimum density values | 35% | 55% | | | | 51% | |
| # of distinct pillow regions along an X axis | 3 | 3 | 1 | | | 7 | |
| # of distinct pillow regions along a Y axis | 2 | 2 | 2 | | | 4 | |
| Fibrous structure type | Paper towel | Paper towel | Paper towel | Paper towel | Paper towel | Paper towel | |

TABLE 8A-continued

| Fibrous Structure Option | R | S | T | U | V | W | X |
|---|---|---|---|---|---|---|---|
| TS7 (dB $V^2$ rms) | 15.6 | 14.68 | 19.24 | 18.7 | 18.8 | 16.41 | |
| SST (1.60 g/$sec^{0.5}$) | 2.37 | 2.38 | 2.27 | 2.05 | 2.03 | 2.33 | |
| CRT Rate (g/s) | | | 0.74 | 0.79 | 0.76 | 0.68 | |
| Plate Stiffness (N*mm) | 14.38 | 13.85 | 14.26 | 16.17 | 16.43 | 13.98 | |
| Resilient Bulk ($cm^3$/g) | 96.27 | 96.38 | 109.7 | 111.65 | 109.7 | 97.2 | |
| Total Wet Tensile (g/in) | 701 | 719.8 | 793.6 | 770.9 | 720.9 | 713.9 | |
| Gmean Wet Modulus @ 38G | 455.8 | 500.4 | 448.2 | 382.7 | 374.2 | 436.6 | |
| Wet Burst (g) | 469 | 434.7 | 456 | 528.3 | 527.6 | 463.3 | |
| Flexural Rigidity (mg-cm) | 1357 | 1257.4 | 1283.6 | 1241.3 | 1403.6 | 1531.62 | |
| Dry Compression Thickness @ 10 g (mils) | 62.1 | 62.0 | 62.9 | 69.9 | 61.8 | 62.9 | |
| Wet Compression Thickness @ 10 g (mils) | 37.3 | 35.8 | 57.48 | 59.2 | 54.7 | 51.71 | |
| Belt Option from Table 1 | Option F | Option E | | | | | |
| Cell Width (in) | 0.07 | 0.080 | 0.110 | 0.090 | 0.080 | 0.080 | 0.070 |
| Saddle Height (in) | 0.015 | 0.015 | 0.015 | 0.015 | 0.015 | 0.019-0.039 | 0.042 |
| Saddle Width (in) | 0.040 | 0.050 | 0.050 | 0.050 | 0.050 | 0.050 | |
| Leg Length (in) | .0.07 | 0.080 | 0.070 | 0.070 | 0.070 | 0.044-0.079 | 0.042 |
| Leg Width (in) | .015 | 0.015 | 0.035 | 0.025 | 0.20 | 0.015 | 0.070 |
| Distance Between Saddles (in) | 0.101 | 0.111 | 0.101 | 0.100 | 0.100 | 0.111 | 0.101 |
| First leg Separation (in) | 0.043 | 0.044 | 0.043 | 0.043 | 0.045 | 0.041-0.049 | 0.046 |
| Second leg Separation (in) | 0.049 | 0.049 | 0.050 | 0.045 | 0.045 | 0.041-0.049 | 0.046 |
| Distance Between Cells, along an X axis (in) | 0.062 | 0.063 | 0.046-0.101 | 0.066-0.098 | 0.061-0.088 | 0.063 | 0.060 |
| Distance Between Cells, along a Y axis (in) | | | 0.043-0.101 | 0.043-0.100 | 0.045-0.100 | 0.041-0.111 | 0.046 |
| First leg Sep./ Distance Between Saddles | 0.454 | 0.418 | | | | | |
| Leg Length/ Saddle Height | 4.667 | 5.333 | | | | | |
| Distance Between Cells/Leg Sep. | 1.279-1.451 | 1.274-1.440 | | | | | |

TABLE 8B

| Fibrous Structure | Y | Z | AA | BB | CC | DD |
|---|---|---|---|---|---|---|
| Cell Group | | Figure 10F | Figure 10E | Figure 10G | Figure 10I | Figure 10J |
| Cell shape | Figure 9O | Figure 9F | Figure 9E | Figure 9G | Figure 9I | Figure 9J |
| Average Distance between Saddle (in) | 0.111 | 0.140 | 0.099 | 0.101 | 0.101 | 0.101 |
| Average Distance between Cells (in) | 0.052-0.065 | 0.062-0.082 | 0.05-0.079 | 0.060 | 0.060 | 0.060 |
| Fiber blend | 40% Eucalyptus, 60% softwood | 35% EUC, 65% softwood | | | | |
| Cell density | | | | | | |
| Pillow region- Figure 21A, 22-1 | 0.155 | | | | | |
| Pillow region Figure 21A, 22-2 | 0.269 | | | | | |
| Pillow region- Figure 21A, 22-4) | 0.241 | | | | | |
| Pillow region- Figure 21A 22-8 | 0.219 | | | | | |

TABLE 8B-continued

| Fibrous Structure | Y | Z | AA | BB | CC | DD |
|---|---|---|---|---|---|---|
| % Diffence between Maximum and Minimum values | 54% | | | | | |
| # of distinct pillow regions along an X axis | 4 | | | | | |
| # of distinct pillow regions along a Y axis | 3 | | | | | |
| Fibrous structure type | | | | | | |
| TS7 (dB $V^2$ rms) | 16.20 | 15.10 | | | | |
| SST (1.60 g/$sec^{0.5}$) | 2.42 | 1.98 | | | | |
| CRT Rate (g/s) | 0.84 | 0.81 | | | | |
| Plate Stiffness (N*mm) | 13.64 | 14.26 | | | | |
| Resilient Bulk ($cm^3$/g) | 99.5 | 92.77 | | | | |
| Total Wet Tensile (g/in) | 729 | 763 | | | | |
| Gmean Wet Modulus @ 38G | 489.8 | 456 | | | | |
| Wet Burst (g) | 472.3 | 483.7 | | | | |
| Flexural Rigidity (mg-cm) | 1363.5 | 1413 | | | | |
| Dry Compression Thickness @ 10 g (mils) | 65.8 | 57.1 | | | | |
| Wet Compression Thickness @ 10 g (mils) | 57.87 | 55.64 | | | | |
| Belt Option from Table 1 | | | | | | |
| Cell Width (in) | 0.095 | 0.070 | 0.055-0.084 | 0.125 | 0.070 | 0.070 |
| Saddle Height (in) | 0.015 | 0.015 | 0.015 | 0.015 | | 0.042 |
| Saddle Width (in) | 0.050 | 0.040 | 0.0 0.054 and 0.026 | 0.040 | 0.170 | 0.170 |
| Leg Length (in) | 0.080 | 0.109 | 0.070 | 0.07 | 0.070 | 0.042 |
| Leg Width (in) | | 0.015 | 0.015 | 0.015 | 0.070 | 0.070 |
| Distance Between Saddles (in) | 0.111 | 0.140 | 0.099 | 0.101 | 0.101 | 0.101 |
| First leg Separation (in) | 0.044 | 0.045 | 0.046 | 0.046 | 0.046 | 0.046 |
| Second leg Separation (in) | 0.049 | 0.049 | 0.047 | 0.046 | 0.046 | 0.046 |
| Distance Between Cells, along an X axis | 0.052-0.065 | 0.062-0.082 | 0.050-0.079 | 0.060 | 0.060 | 0.060 |
| Distance Between Cells, along a Y axis | 0.044-0.111 | 0.045-0.140 | 0.046-0.099 | 0.046-0.101 | 0.046-0.101 | 0.046 |
| First leg Sep./Distance Between Saddles | | | | | | |
| Leg Length/Saddle Height | | | | | | |
| Distance Between Cells/Leg Sep. | | | | | | |

Table 9 discloses multiple Fibrous Structure Options as disclosed herein:

TABLE 9

Figure 17A:
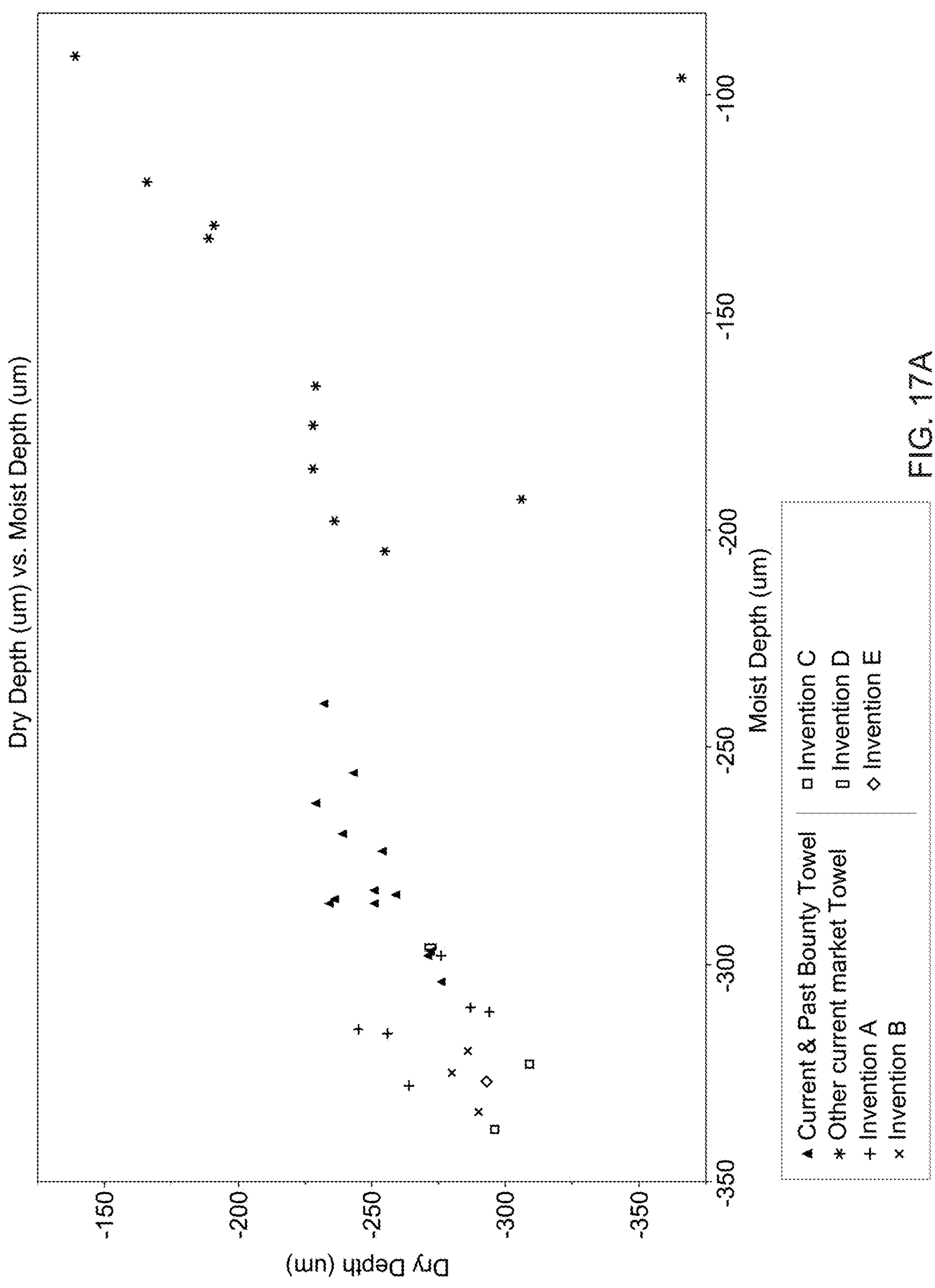
FIG. 17A is a graph illustrating Dry Depth vs. Moist Depth data.
Figure 17B:
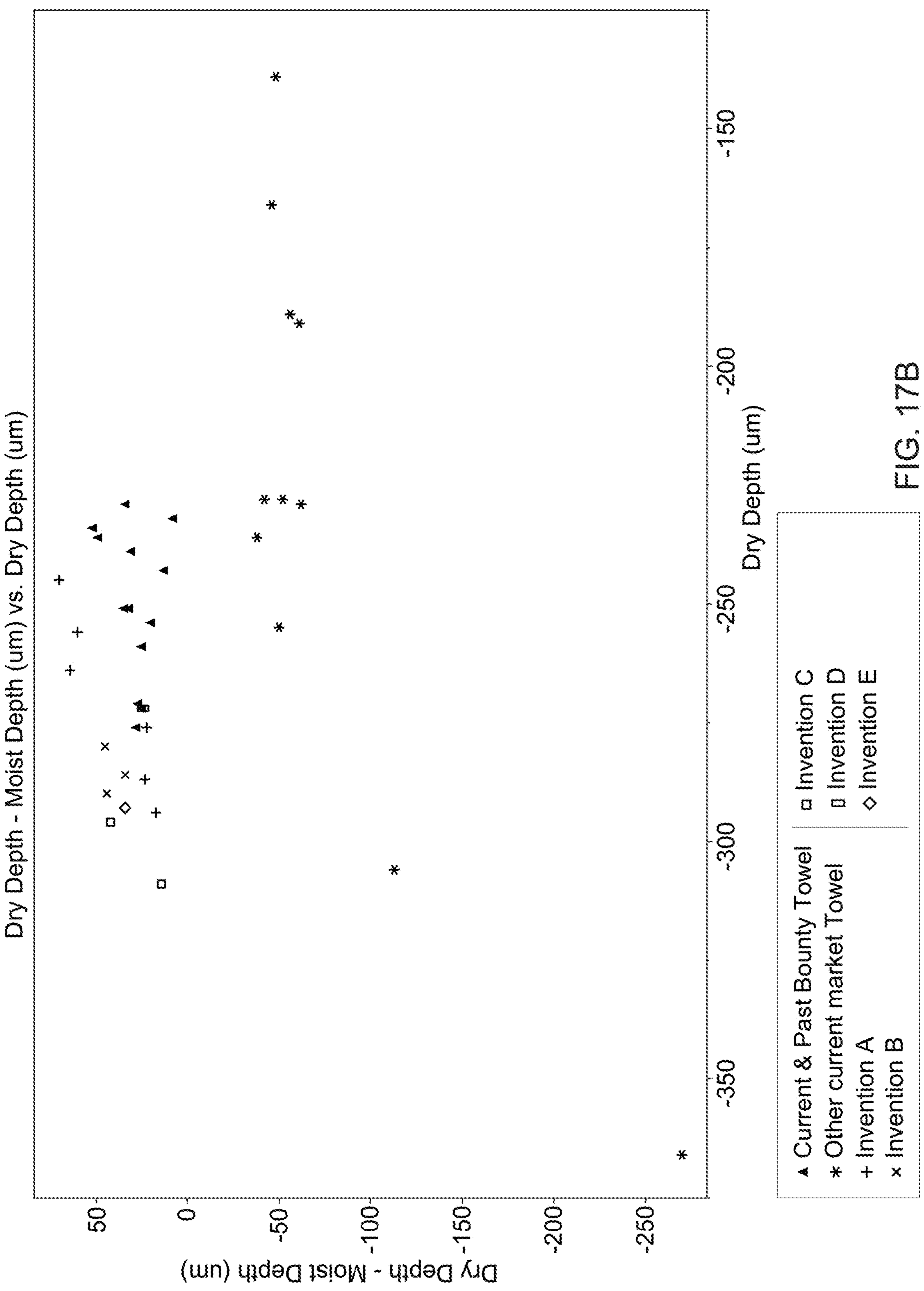
FIG. 17B is a graph illustrating Dry Depth—Moist Depth vs. Dry Depth data.
Figure 17C:
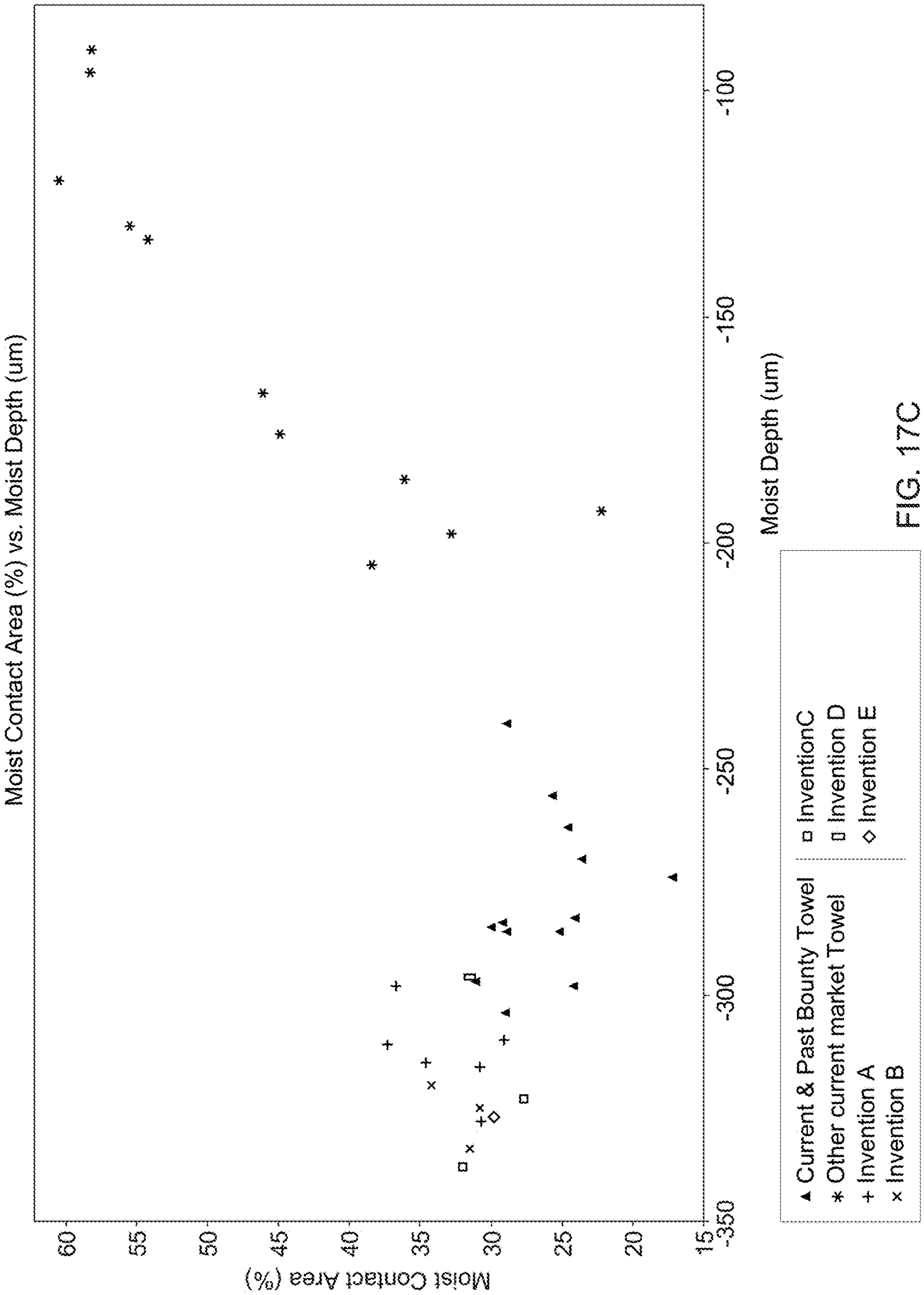
FIG. 17C is a graph illustrating Moist Contact Area vs. Moist Depth data.

| Graphs of Figures 17A, 17B, 17C Label | Particular inventive embodiment references | Dry Contact Area (%) | Dry Depth (um) | Moist Contact Area (%) | Moist Depth (um) | Dry minus Moist Depth (um) | Wet Tensile (g/sqin) |
|---|---|---|---|---|---|---|---|
| A | Table 1 Option E, Figure 9A | 29.4 | −256 | 30.8 | −316 | 60 | 731.93 |
| A | Table 1 Option E, Figure 9A | 29.1 | −264 | 30.7 | −328 | 64 | 731.93 |
| A | Table 1 Option E, Figure 9A | 32 | −245 | 34.6 | −315 | 70 | 715.1 |
| A | Table 1 Option E, Figure 9A | 21.4 | −287 | 29.1 | −310 | 23 | 762.23 |
| B | Table 1 Option F, Figure 9A | 25.8 | −286 | 34.2 | −320 | 34 | 818.44 |
| B | Table 1 Option F, Figure 9A | 26.1 | −280 | 30.8 | −325 | 45 | 818.44 |
| C | Figure 9H | 17.6 | −309 | 27.7 | −323 | 14 | 767.6 |
| D | Table 1 Option C | 23.5 | −272 | 31.5 | −296 | 24 | 687.5 |
| E | Table 1 Option B | 23 | −293 | 29.8 | −327 | 34 | 762.55 |
| A | Table 1 Option E, Figure 9A | 28.4 | −276 | 36.7 | −298 | 22 | 631.57 |
| A | Table 1 Option E, Figure 9A | 27.2 | −294 | 37.3 | −311 | 17 | 739.78 |
| C | Figure 9H | 24.6 | −296 | 32 | −338 | 42 | 767.6 |
| B | Table 1 Option F, Figure 9A | 26.9 | −290 | 31.5 | −334 | 44 | 818.44 |
| Current Bounty | Current Bounty | 20.3 | −271 | 24.2 | −298 | 27 | 694.74 |
| Current Bounty | Current Bounty | 19 | −251 | 25.2 | −286 | 35 | 910.39 |
| Past Bounty | Past Bounty | 17.8 | −232 | 28.9 | −240 | 8 | 672.25 |
| Past Bounty | Past Bounty | 18 | −229 | 24.6 | −263 | 34 | 672.25 |
| Past Bounty | Past Bounty | 17.7 | −259 | 29.2 | −284 | 25 | 739.78 |
| Current Bounty | Current Bounty | 23.9 | −276 | 29 | −304 | 28 | 754.21 |
| Current Bounty | Current Bounty | 25.6 | −234 | 28.9 | −286 | 52 | 631.57 |
| Current Bounty | Current Bounty | 26.2 | −236 | 30 | −285 | 49 | 631.57 |
| Current Bounty | Current Bounty | 13.5 | −254 | 17.2 | −274 | 20 | 801.63 |
| Current Bounty | Current Bounty | 16 | −243 | 25.7 | −256 | 13 | 801.63 |
| Current Bounty | Current Bounty | 16.3 | −239 | 23.6 | −270 | 31 | 801.63 |
| Current Bounty | Current Bounty | 17.4 | −251 | 24.1 | −283 | 32 | 910.39 |
| Current Bounty | Current Bounty | 21.9 | −272 | 31.1 | −297 | 25 | 754.21 |
| Other Current Market Towel | Scott Towel | 15.5 | −306 | 22.2 | −193 | −113 | 427.27 |
| Other Current Market Towel | Viva Signature Towel | 26.3 | −139 | 58.2 | −90.8 | −48.2 | 321.5 |
| Other Current Market Towel | Viva Multi Surface Towel | 24 | −255 | 38.4 | −205 | −50 | 648.25 |
| Other Current Market Towel | Sparkle Towel | 26 | −366 | 58.3 | −96.2 | −269.8 | 457.41 |
| Other Current Market Towel | Brawny Towel | 36.8 | −166 | 60.5 | −120 | −46 | 499.19 |
| Other Current Market Towel | CAMAX Towel | 20.1 | −228 | 36.1 | −186 | −42 | 675.68 |

TABLE 9-continued

| Graphs of Figures 17A, 17B, 17C Label | Particular inventive embodiment references | Dry Contact Area (%) | Dry Depth (um) | Moist Contact Area (%) | Moist Depth (um) | Dry minus Moist Depth (um) | Wet Tensile (g/sqin) |
|---|---|---|---|---|---|---|---|
| Other Current Market Towel | Royale Tiger Towel | 20.8 | −236 | 32.8 | −198 | −38 | 628.88 |
| Other Current Market Towel | Walmart Great Value Ultra Strong | 28.1 | −229 | 46.1 | −167 | −62 | 540.2 |
| Other Current Market Towel | Walmart Great Value Ultra Strong | 27.4 | −228 | 44.9 | −176 | −52 | 540.2 |
| Other Current Market Towel | Home Depot HDX | 26.8 | −191 | 55.5 | −130 | −61 | 627.52 |
| Other Current Market Towel | Home Depot HDX | 26.7 | −189 | 54.2 | −133 | −56 | 627.52 |

Examples of the fibrous structures detailed herein may have only one of the above properties within one of the defined ranges, or all the properties within one of the defined ranges, or any combination of properties within one of the defined ranges.

In addition to superior absorbency rates and the other beneficial properties as detailed above, the new fibrous structures detailed herein permit the fibrous structure manufacturer to wind rolls with high roll bulk (for example greater than 4 $cm^3/g$), and/or greater roll firmness (for example between about 2.5 mm to about 15 mm), and/or lower roll percent compressibility (low percent compressibility, for example less than 10% compressibility).

"Roll Bulk" as used herein is the volume of paper divided by its mass on the wound roll. Roll Bulk is calculated by multiplying pi (3.142) by the quantity obtained by calculating the difference of the roll diameter squared in cm squared ($cm^2$) and the outer core diameter squared in cm squared ($cm^2$) divided by 4, divided by the quantity sheet length in cm multiplied by the sheet count multiplied by the Bone Dry Basis Weight of the sheet in grams (g) per cm squared ($cm^2$).

Examples of the new fibrous structures described herein may be in the form of rolled tissue products (single-ply or multi-ply), for example a dry fibrous structure roll, and may exhibit a roll bulk of from about 4 $cm^3/g$ to about 30 $cm^3/g$ and/or from about 6 $cm^3/g$ to about 15 $cm^3/g$, specifically including all 0.1 increments between the recited ranges. The new rolled sanitary tissue products of the present disclosure may exhibit a roll bulk of greater than about 4 $cm^3/g$, greater than about 5 $cm^3/g$, greater than about 6 $cm^3/g$, greater than about 7 $cm^3/g$, greater than about 8 $cm^3/g$, greater than about 9 $cm^3/g$, greater than about 10 $cm^3/g$ and greater than about 12 $cm^3/g$, and less than about 20 $cm^3/g$, less than about 18 $cm^3/g$, less than about 16 $cm^3/g$, and/or less than about 14 $cm^3/g$, specifically including all 0.1 increments between the recited ranges.

Additionally, examples of the new fibrous structures detailed herein may exhibit a roll firmness of from about 2.5 mm to about 15 mm and/or from about 3 mm to about 13 mm and/or from about 4 mm to about 10 mm, specifically including all 0.1 increments between the recited ranges.

Additionally, examples of the new fibrous structures detailed herein may be in the form of a rolled tissue products (single-ply or multi-ply), for example a dry fibrous structure roll, and may have a percent compressibility of less than 10% and/or less than 8% and/or less than 7% and/or less than 6% and/or less than 5% and/or less than 4% and/or less than 3% to about 0% and/or to about 0.5% and/or to about 1%, and/or from about 4% to about 10% and/or from about 4% to about 8% and/or from about 4% to about 7% and/or from about 4% to about 6% as measured according to the Percent Compressibility Test Method described herein.

Examples of the new rolled sanitary tissue products of the present disclosure may exhibit a roll bulk of greater than 4 $cm^3/g$ and a percent compressibility of less than 10% and/or a roll bulk of greater than 6 $cm^3/g$ and a percent compressibility of less than 8% and/or a roll bulk of greater than 8 $cm^3/g$ and a percent compressibility of less than 7%.

Additionally, examples of the new rolled tissue products as detailed herein can be individually packaged to protect the fibrous structure from environmental factors during shipment, storage and shelving for retail sale. Any of known methods and materials for wrapping bath tissue or paper towels can be utilized. Further, the plurality of individual packages, whether individually wrapped or not, can be wrapped together to form a package having inside a plurality of the new rolled tissue products as detailed herein. The package can have 2, 3, 4, 5, 6, 7, 8, 9, 10, 12, 14, 16 or more rolls. In such packages, the roll bulk and percent compressibility can be important factors in package integrity during shipping, storage, and shelving for retail sale. Further, the plurality of individual packages, or the packages having a plurality of the new rolled tissue products as detailed herein, can be palletized (i.e., organized and/or transported on a pallet). In such pallets of the new rolled tissue products as detailed herein, the roll bulk and percent compressibility can be important factors in package integrity during shipping, storage, and shelving for retail sale.

Further, a package of a plurality of individual rolled tissue products, in which at least one of the rolled tissue products exhibits a roll bulk of greater than 4 $cm^3/g$ or a percent compressibility of less than 10% is contemplated. In one example, a package of a plurality of individual rolled tissue products, in which at least one of the rolled tissue products exhibits a roll bulk of greater than 4 $cm^3/g$ and a percent compressibility of less than 10% is contemplated. In another example, a package of a plurality of individual rolled tissue products, in which at least one of the rolled tissue products exhibits a roll bulk of greater than 6 $cm^3/g$ and a percent compressibility of less than 8% is contemplated.

Papermaking Belts

The fibrous structures of the present disclosure can be made using a papermaking belt of the type described in FIG. 1, but with knuckles and pillows in the new patterns 14A, 14B, 14C, 14D described herein. The papermaking belt can be thought of as a molding member. A "molding member"

is a structural element having cell sizes and placement as described herein that can be used as a support for an embryonic web comprising a plurality of cellulosic fibers and/or a plurality of synthetic fibers as well as to "mold" a desired geometry of the fibrous structures during papermaking (excluding "dry" processes such as embossing). The molding member can comprise fluid-permeable areas and can impart a three-dimensional pattern of knuckles to the fibrous structure being produced thereon, and includes, without limitation, single-layer and multi-layer structures in the class of papermaking belts having UV-cured resin knuckles on a woven reinforcing member as disclosed in the above-mentioned U.S. Pat. No. 6,610,173, issued to Lindsay et al. or U.S. Pat. No. 4,514,345 issued to Trokhan.

In one example, the papermaking belt is a fabric crepe belt for use in a process as disclosed in the above-mentioned U.S. Pat. No. 7,494,563, issued to Edwards, but having a pattern of cells, i.e., knuckles, as disclosed herein. Fabric crepe belts can be made by extruding, coating, or otherwise applying a polymer, resin, or other curable material onto a support member, such that the resulting pattern of three-dimensional features are belt knuckles with the pillow regions serving as large recessed pockets. In another example, the papermaking belt can be a continuous knuckle belt of the type exemplified in FIG. 1 of U.S. Pat. No. 4,514,345 issued to Trokhan, having deflection conduits that serve as the recessed pockets of the belt shown and described in U.S. Pat. No. 7,494,563, for example in place of the fabric crepe belt shown and described therein.

In an example of a method for making fibrous structures of the present disclosure, the method can comprise the steps of:

(a) providing a fibrous furnish comprising fibers; and (b) depositing the fibrous furnish onto a molding member such that at least one fiber is deflected out-of-plane of the other fibers present on the molding member.

In another example of a method for making a fibrous structure of the present disclosure, the method comprises the steps of:

(a) providing a fibrous furnish comprising fibers;

(b) depositing the fibrous furnish onto a foraminous member to form an embryonic fibrous web;

(c) associating the embryonic fibrous web with a papermaking belt having a pattern of knuckles as disclosed herein such that at a portion of the fibers are deflected out-of-plane of the other fibers present in the embryonic fibrous web; and (d) drying said embryonic fibrous web such that that the dried fibrous structure is formed.

In another example of a method for making the fibrous structures of the present disclosure, the method can comprise the steps of:

(a) providing a fibrous furnish comprising fibers;

(b) depositing the fibrous furnish onto a foraminous member such that an embryonic fibrous web is formed;

(c) associating the embryonic web with a papermaking belt having a pattern of knuckles as disclosed herein such that at a portion of the fibers can be formed in the substantially continuous deflection conduits;

(d) deflecting a portion of the fibers in the embryonic fibrous web into the substantially continuous deflection conduits and removing water from the embryonic web so as to form an intermediate fibrous web under such conditions that the deflection of fibers is initiated no later than the time at which the water removal through the discrete deflection cells or the substantially continuous deflection conduits is initiated; and (e) optionally, drying the intermediate fibrous web; and (f) optionally, foreshortening the intermediate fibrous web, such as by creping.

Figure 11:
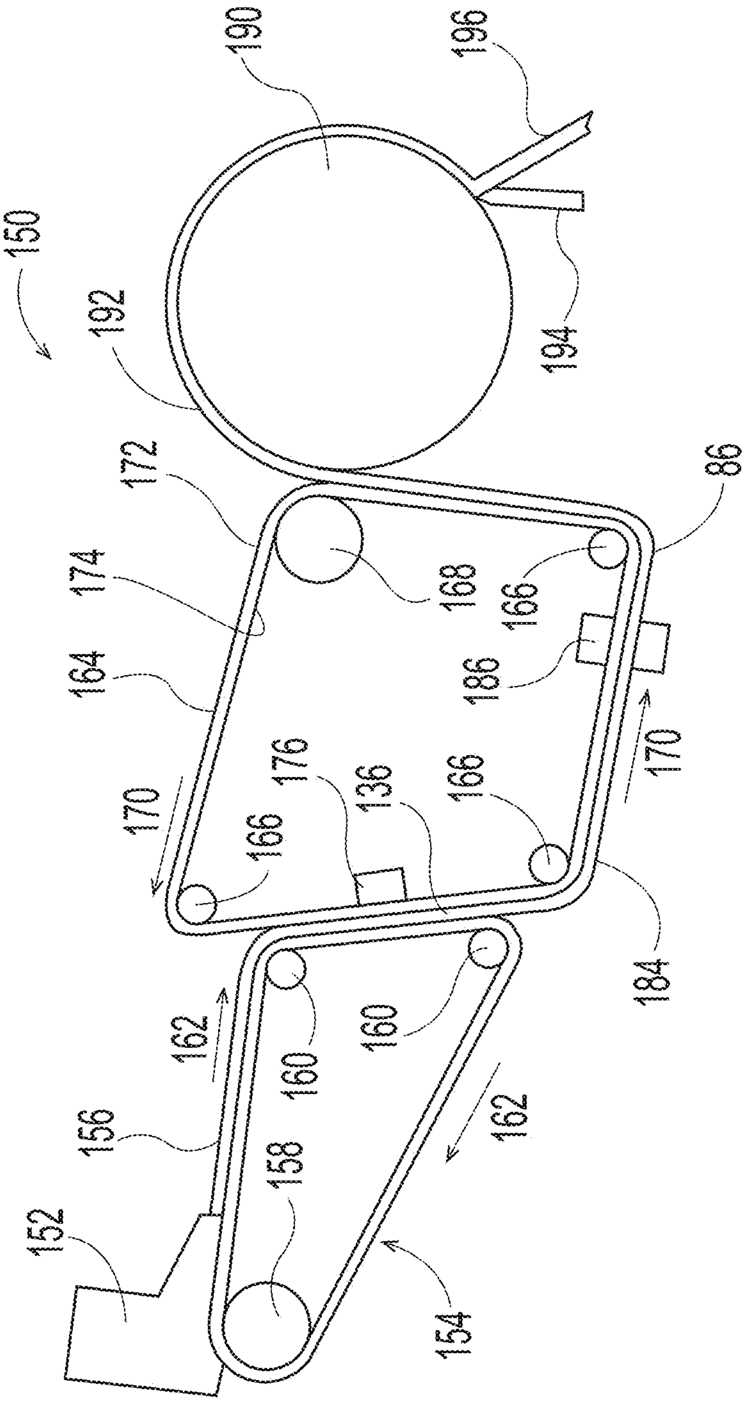
FIG. 11 is a schematic representation of one method for making the new fibrous structures detailed herein.

FIG. 11 is a simplified, schematic representation of one example of a continuous fibrous structure making process and machine useful in the practice of the present disclosure. The following description of the process and machine include non-limiting examples of process parameters useful for making a fibrous structure of the present invention.

As shown in FIG. 11, process and equipment 150 for making fibrous structures according to the present disclosure comprises supplying an aqueous dispersion of fibers (a fibrous furnish) to a headbox 152 which can be of any design known to those of skill in the art. The aqueous dispersion of fibers can include wood and non-wood fibers, northern softwood kraft fibers ("NSK"), eucalyptus fibers, SSK, NHK, acacia, bamboo, straw and bast fibers (wheat, flax, rice, barley, etc.), corn stalks, bagasse, reed, synthetic fibers (PP, PET, PE, bico version of such fibers), regenerated cellulose fibers (viscose, lyocell, etc.), and other fibers known in the papermaking art, including short fibers having an average length less than 1.2 mm (Average Short Fiber Length-ASFL) and including long fibers having an average length greater than 1.2 mm, from about 1.2 mm to about 3.5 mm, or from about 3 mm to about 10 mm (Average Long Fiber Length-ALFL). From the headbox 152, the aqueous dispersion of fibers can be delivered to a foraminous member 154, which can be a Fourdrinier wire, to produce an embryonic fibrous web 156. Furnish mixes may be useful in the present disclosure may be from about 20% to about 50% short fibers and from about 40% to about 100% long fibers, specifically including all 1% increments between the recited ranges.

The foraminous member 154 can be supported by a breast roll 158 and a plurality of return rolls 160 of which only two are illustrated. The foraminous member 154 can be propelled in the direction indicated by directional arrow 162 by a drive means, not illustrated, at a predetermined velocity, $V_1$. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164 in a transfer zone 136, after which the embryonic fibrous web travels on the papermaking belt 164. While in contact with the papermaking belt 164, the embryonic fibrous web 156 can be deflected, rearranged, and/or further dewatered. Depending on the process, mechanical and fluid pressure differential, alone or in combination, can be utilized to deflect a portion of fibers into the deflection conduits of the papermaking belt. For example, in a through-air drying process a vacuum apparatus 176 can apply a fluid pressure differential to the embryonic web 156 disposed on the papermaking belt 164, thereby deflecting fibers into the deflection conduits of the deflection member. The process of deflection may be continued with additional vacuum pressure 186, if necessary, to even further deflect and dewater the fibers of the web 184 into the deflection conduits of the papermaking belt 164.

The papermaking belt 164 can be in the form of an endless belt. In this simplified representation, the papermaking belt 164 passes around and about papermaking belt return rolls 166 and impression nip roll 168 and can travel in the direction indicated by directional arrow 170, at a papermaking belt velocity $V_2$, which can be less than, equal to, or greater than, the foraminous member velocity $V_1$. In the present disclosure, the papermaking belt velocity $V_2$ is less than foraminous member velocity $V_1$ such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The papermaking belts 164 of the present disclosure can be made, or partially made, according to the process described in U.S. Pat. No. 4,637,859, issued Jan. 20, 1987, to Trokhan, and having the patterns of cells as disclosed herein.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art, as the doctor blades can be set at various angles. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity, $V_4$.

The papermaking belts of the present disclosure can be utilized to form discrete elements and a continuous/substantially continuous network (i.e., knuckles and pillows) into a fibrous structure during a through-air-drying operation. The discrete elements can be knuckles and can be relatively high density relative to the continuous/substantially continuous network, which can be a continuous/substantially pillow having a relatively lower density. In other examples, the discrete elements can be pillows and can be relatively low density relative to the continuous/substantially continuous network, which can be a continuous/substantially continuous knuckle having a relatively higher density. In the example detailed above, the fibrous structure is a homogenous fibrous structure, but such papermaking process may also be adapted to manufacture layered fibrous structures, as is known in the art.

As discussed above, the fibrous structure can be embossed during a converting operating to produce the embossed fibrous structures of the present disclosure.

An example of fibrous structures in accordance with the present disclosure can be prepared using a papermaking machine as described above with respect to FIG. 11, and according to the method described below:

A 3% by weight aqueous slurry of northern softwood kraft (NSK) pulp is made up in a conventional re-pulper. The NSK slurry is refined gently and a 2% solution of a permanent wet strength resin (i.e. Kymene 5221 marketed by Solenis incorporated of Wilmington, Del.) is added to the NSK stock pipe at a rate of 1% by weight of the dry fibers. Kymene 5221 is added as a wet strength additive. The adsorption of Kymene 5221 to NSK is enhanced by an in-line mixer. A 1% solution of Carboxy Methyl Cellulose (CMC) (i.e. FinnFix 700 marketed by C.P. Kelco U.S. Inc. of Atlanta, GA) is added after the in-line mixer at a rate of 0.2% by weight of the dry fibers to enhance the dry strength of the fibrous substrate. A 3% by weight aqueous slurry of hardwood *Eucalyptus* fibers is made up in a conventional re-pulper. A 1% solution of defoamer (i.e. BuBreak 4330 marketed by Buckman Labs, Memphis TS) is added to the *Eucalyptus* stock pipe at a rate of by weight of the dry fibers and its adsorption is enhanced by an in-line mixer.

The NSK furnish and the *Eucalyptus* fibers are combined in the head box and deposited onto a Fourdrinier wire, running at a first velocity $V_1$, homogenously to form an embryonic web. The web is then transferred at the transfer zone from the Fourdrinier forming wire at a fiber consistency of about 15% to the papermaking belt, the papermaking belt moving at a second velocity, $V_2$. The papermaking belt has a pattern of raised portions (i.e., knuckles) extending from a reinforcing member, the raised portions defining either a plurality of discrete or a continuous/substantially continuous deflection conduit portion, as described herein, particularly with reference to the masks of FIGS. 5-8. The transfer occurs in the transfer zone without precipitating substantial densification of the web. The web is then forwarded, at the second velocity, $V_2$, on the papermaking belt along a looped path in contacting relation with a transfer head disposed at the transfer zone, the second velocity being from about 1% to about 40% slower than the first velocity, $V_1$. Since the Fourdrinier wire speed is faster than the papermaking belt, wet shortening, i.e., foreshortening, of the web occurs at the transfer point. In an example, the second velocity $V_2$ can be from about 0% to about 5% faster than the first velocity $V_1$.

Further de-watering is accomplished by vacuum assisted drainage until the web has a fiber consistency of about 15% to about 30%. The patterned web is pre-dried by air blow-through, i.e., through-air-drying (TAD), to a fiber consistency of about 65% by weight. The web is then adhered to the surface of a Yankee dryer with a sprayed creping adhesive comprising 0.25% aqueous solution of polyvinyl alcohol (PVA). The fiber consistency is increased to an estimated 95%-97% before dry creping the web with a doctor blade. The doctor blade has a bevel angle of about degrees and is positioned with respect to the Yankee dryer to provide an impact angle of about 101 degrees. This doctor blade position permits the adequate amount of force to be applied to the substrate to remove it off the Yankee while minimally disturbing the previously generated web structure. The dried web is reeled onto a take up roll (known as a parent roll), the surface of the take up roll moving at a fourth velocity, $V_4$, that is faster than the third velocity, $V_3$, of the Yankee dryer. By reeling at a fourth velocity, $V_4$, that is about 1% to 20% faster than the third velocity, $V_3$, some of the foreshortening provided by the creping step is "pulled out," sometimes referred to as a "positive draw," so that the paper can be more stable for any further converting operations. In other examples, a "negative draw" as is known in the art is also contemplated.

Two plies of the web can be formed into paper towel products by embossing and laminating them together using PVA adhesive. The paper towel has about 53 $g/m^2$ basis weight and contains 65% by weight Northern Softwood Kraft and 35% by weight *Eucalyptus* furnish. The sanitary tissue product is soft, flexible and absorbent.

It should be appreciated that there is a relationship between fiber length, cell shape, and Cell Group patterns of the present disclosure. For instance, a ratio of ALFL (inches) to Distance Between Cells between the first and second cells may be from about 0.25 to about 10, from about to about 4.6, or from about 0.9 to about 9.2.

A ratio of ALFL (mm) to the Packing Fraction Measurement (which uses the Micro-CT IntensiveProperty Method) is from about 6 to about 50, from about 6 to about 16, or from about 10 to about 16.

A ratio of ALFL (inches) to Distance Between Saddles may be from about 0.25-10, from about 0.3 to about 3.0, from about 0.7 to about 9.0.

Interestingly, a higher percentage of fibers oriented in the MD may be in a continuous pillow running along the MD axis.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Dry Thick Compression and Recovery Test Method (Dry Compression):

Dry Thick Compression and Dry Thick Compressive Recovery are measured using a constant rate of extension tensile tester (a suitable instrument is the EJA Vantage, Thwing-Albert, West Berlin NJ, or equivalent) fitted with compression fixtures, a circular compression foot having an area of 1.0 $in^2$ and a circular anvil having an area of at least 4.9 $in^2$. The thickness (caliper in mils) is measured at varying pressure values ranging from 10-1500 $g/in^2$ in both the compression and relaxation directions.

Four (4) samples are prepared by the cutting of a usable unit obtained from the outermost sheets of a finished product roll after removing at least the leading five sheets by unwinding and tearing off via the closest line of weakness, such that each cut sample is 2.5×2.5 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure ($g/in^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Start the tensile tester and data collection. Testing is repeated in like fashion for all four samples.

The thickness (mils) vs. pressure ($g/in^2$, or gsi) data is used to calculate the sample's compressibility, near-zero load caliper, and compressive modulus. A least-squares linear regressions is performed on the thickness vs. the logarithm (base10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Dry Thick Compression is defined as:

$$\text{Dry Thick Compression (mils·mils/log (gsi))} = -1 \times \text{Near Zero Load Caliper (b)} \times \text{Compressibility (m)}$$

Multiplication by −1 turns formula into a positive. Larger results represent thick products that compress when a pressure is applied. Calculate the arithmetic mean of the four replicate values and report Dry Thick Compression to the nearest integer value mils*mils/log (gsi).

Dry Thick Compressive Recovery is defined as:

$$\text{Dry Thick Compressive Recovery } (mils \cdot mils/\log\ (gsi)) = -1 \times \text{Near Zero Load Caliper } (b) \times \text{Compressibility } (m) \times \frac{\text{Recovered Thickness at 10 } gsi}{\text{Compressed Thickness at 10 } gsi}$$

Multiplication by −1 turns formula into a positive. Larger results represent thick products that compress when a pressure is applied and maintain fraction recovery at 10 $g/in^2$. Compressed thickness at 10 $g/in^2$ is the thickness of the material at 10 $g/in^2$ pressure during the compressive portion of the test. Recovered thickness at 10 $g/in^2$ is the thickness of the material at 10 $g/in^2$ pressure during the recovery portion of the test. Calculate the arithmetic mean of the four replicate values and report Dry Thick Compressive Recovery to the nearest integer value mils*mils/log (gsi).

Wet Thick Compression and Recovery Test Method (Wet Compression):

Wet Thick Compression and Wet Thick Compressive Recovery are measured using a constant rate of extension tensile tester (a suitable instrument is the EJA Vantage, Thwing-Albert, West Berlin NJ, or equivalent) fitted with compression fixtures, a circular compression foot having an area of 1.0 $in^2$ and a circular anvil having an area of at least 4.9 $in^2$. The thickness (caliper in mils) is measured at varying pressure values ranging from 10-1500 $g/in^2$ in both the compression and relaxation directions.

Four (4) samples are prepared by the cutting of a usable unit obtained from the outermost sheets of a finished product roll after removing at least the leading five sheets by unwinding and tearing off via the closest line of weakness, such that each cut sample is 2.5×2.5 inches, avoiding creases, folds, and obvious defects.

The compression foot and anvil surfaces are aligned parallel to each other, and the crosshead zeroed at the point where they are in contact with each other. The tensile tester is programmed to perform a compression cycle, immediately followed by an extension (recovery) cycle. Force and extension data are collected at a rate of 50 Hz, with a crosshead speed of 0.10 in/min. Force data is converted to pressure (g/in$^2$, or gsi). The compression cycle continues until a pressure of 1500 gsi is reached, at which point the crosshead stops and immediately begins the extension (recovery) cycle with the data collection and crosshead speed remaining the same.

The sample is placed flat on the anvil fixture, ensuring the sample is centered beneath the foot so that when contact is made the edges of the sample will be avoided. Using a pipette, fully saturate the entire sample with distilled or deionized water until there is no observable dry area remaining and water begins to run out of the edges. Start the tensile tester and data collection. Testing is repeated in like fashion for all four samples.

The thickness (mils) vs. pressure (g/in$^2$, or gsi) data is used to calculate the sample's compressibility, "near-zero load caliper", and compressive modulus. A least-squares linear regressions is performed on the thickness vs. the logarithm (base10) of the applied pressure data using nine discrete data points at pressures of 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Wet Thick Compression is defined as:

$$\text{Dry Thick Compression (mils mils/log (gsi)} = -1\times \text{Near Zero Load Caliper (b)}\times\text{Compressibility (m)}$$

Multiplication by −1 turns formula into a positive. Larger results represent thick products that compress when a pressure is applied. Calculate the arithmetic mean of the four replicate values and report Wet Thick Compression to the nearest integer value mils*mils/log (gsi).

Wet Thick Compressive Recovery is defined as:

$$\text{Dry Thick Compressive Recovery } (mils\cdot mils/\log\,(gsi) = -1\times\text{Near Zero Load Caliper }(b)\times\text{Compressibility }(m)\times\frac{\text{Recovered Thickness at 10 }gsi}{\text{Compressed Thickness at 10 }gsi}$$

Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test. Calculate the arithmetic mean of the four replicate values and report Wet Thick Compressive Recovery to the nearest integer value mils*mils/log (gsi).

Moist Towel Surface Structure Test Method:

This test method measures the surface topography of a towel surface, both in a dry and moist state, and calculates the % contact area and the median depth of the lowest 10% of the projected measured area, with the test sample under a specified pressure using a smooth and rigid transparent plate with an anti-reflective coating (to minimize and/or eliminate invalid image pixels).

Condition the samples or useable units of product, with wrapper or packaging materials removed, in a room conditioned at 50±2% relative humidity and 23° C.±1° C. (73°±2° F.) for a minimum of two hours prior to testing. Do not test useable units with defects such as wrinkles, tears, holes, effects of tail seal or core adhesive, etc., and when necessary replace with other useable units free of such defects. Test sample dimensions shall be of the size of the usable unit, removed carefully at the perforations if they are present. If perforations are not present, or for samples larger than 8 inches MD by 11 inches CD, cut the sample to a length of approximately 6 inches in the MD and 11 inches in the CD. In this test only the inside surface of the usable unit(s) is analyzed. The inside surface is identified as the surface oriented toward the interior core when wound on a product roll (i.e., the opposite side of the surface visible on the outside roll as presented to a consumer).

Figure 15:
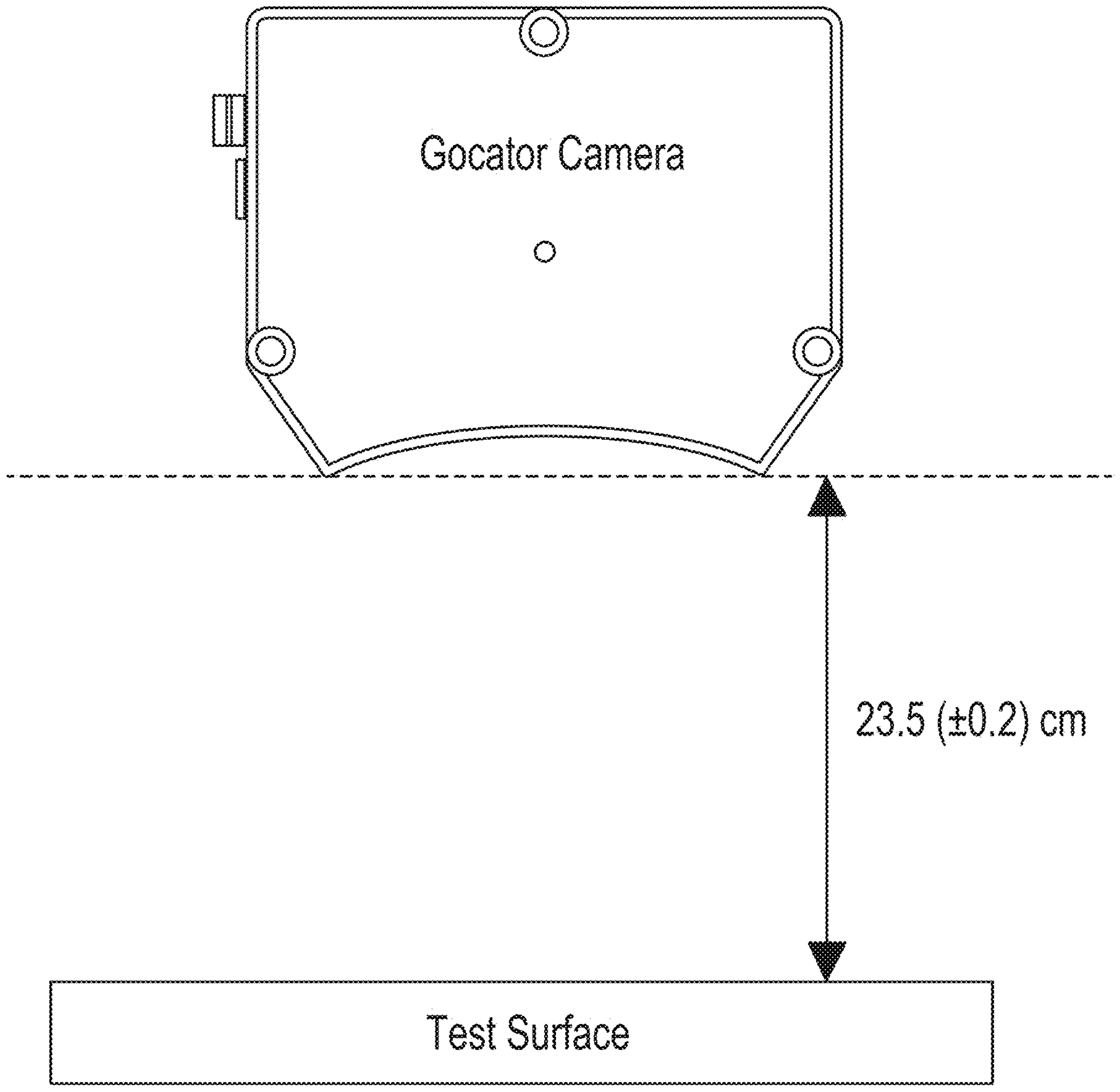
FIG. 15 is a schematic illustrating the Position of Gocator camera to a testing surface relating to the Moist Towel Surface Structure Method.

The instrument used in this method is a Gocator 3210 Snapshot System (LMI Technologies, Inc., 9200 Glenlyon Parkway, Burnaby, BC V5J 5J8 Canada), or equivalent. This instrument is an optical 3D surface topography measurement system that measures the surface height of a sample using a projected structured light pattern technique. The result of the measurement is a topography map of surface height (z-directional or z-axis) versus displacement in the x-y plane. This particular system has a field of view of approximately 100×154 mm, however the captured images are cropped to 80×130 mm (from the center) prior to analysis. The system has an x-y pixel resolution of 86 microns. The clearance distance from the camera to the testing surface (which is smooth and flat, and perpendicular to the camera view) is 23.5 (+/−0.2) cm—see FIG. 15. Calibration plates can be used to verify that the system is accurate to manufacturer's specifications. The system is set to a Brightness value of 7, and a Dynamic value of 3, in order to most accurately capture the surface topography and minimize non-measured pixels and noise. Other camera settings may be used, with the objective of most accurately measuring the surface topography, while minimizing the number of invalid and non-measurable points.

Test samples are handled only at their corners. The test sample is first weighted on a scale with at least 0.001 gram accuracy, and its dry weight recorded to the nearest 0.01 gram. It is then placed on the testing surface, with its inside face oriented towards the Gocator camera, and centered with respect to the imaging view. A smooth and rigid transparent plate (8×10 inches) is gently placed on top of the test sample, centered with respect to its x-y dimensions. Equal size weights are placed on the four corners of the transparent plate such that they are close to the four corners of the projected imaged area, but do not interfere in any way with the measurement image. The size of each equal sized weight is such that the total weight of transparent plate and the four weights delivers a total pressure of 25 (+/−1) grams per square inch (gsi) to the test sample under the plate. Within 15 seconds of placing the four weights in their proper position, the Gocator system is then initiated to acquire the topography image of the test sample in its 'dry' state.

Immediately after saving the Gocator image of the 'dry' state image, the weights and plate are removed from the test sample. The test sample is then moved to a smooth, clean countertop surface, with its inside face still up. Using a pipette, 15-30 ml of deionized water is distributed evenly across the entire surface of the test sample until it is visibly apparent that the water has fully wetted the entire test sample, and no unwetted area is observed. The wetting process is to be completed in less than a minute. The wet test sample is then gently picked up by two adjacent corners, so that it hangs freely (dripping may occur), and carefully placed on a sheet of blotter paper (Whatman cellulose blotting paper, grade GB003, cut to dimensions larger than the test sample). The wet test sample must be placed flat on the blotting paper without wrinkles or folds present. A smooth, 304 stainless steel cylindrical rod (density of –8 $g/cm^3$), with dimensions of 1.75 inch diameter and 12 inches long, is then rolled over the entire test sample at a speed of 1.5-2.0 inches per second, in the direction of the shorter of the two dimensions of the test sample. If creases or folds are created during the rolling process, and are inside the central area of the sample to be measured (i.e., if they cannot slightly adjusted or avoided in the topography measurement), then the test sample is to be discarded for a new test sample, and the measurement process started over. Otherwise, the moist sample is picked up by two adjacent corners and weighed on the scale to the nearest 0.01 gram (i.e., its moist weight). At this point, the moist test paper towel test sample will have a moisture level between 1.25 and 2.00 grams $H_2O$ per gram of initial dry material.

The moist test sample is then placed flat on the Gocator testing surface (handling it carefully, only touching its corners), with its inside surface pointing towards the Gocator camera, and centered with respect to the imaging view (as close to the same position it was for the 'dry' state image). After ensuring that the sample is flat, and no folds or creases are present in the imaging area, the smooth and rigid transparent plate (8×10 inches) is gently placed on top of the test sample, centered with respect to its x-y dimensions. The equal size weights are placed on the four corners of the transparent plate (i.e., the same weights that were used in the dry sample testing) such that they are close to the four corners of the projected imaged area, but do not interfere in any way with the measurement image. Within 15 seconds of placing the four weights in their proper position, the Gocator system is then initiated to acquire the topography image of the test sample in its 'moist' state.

At this point, the test sample has both 'dry' and 'moist' surface topography (3D) images. These are processed using surface texture analysis software such as MountainsMap® (available from Digital Surf, France) or equivalent, as follows: 1) The first step is to crop the image. As stated previously, this particular system has a field of view of approximately 100×154 mm, however the image is cropped to 80×130 mm (from the center). 2) Remove 'invalid' and non-measured points. 3) Apply a 3×3 median filter (to reduce effects of noise). 4) Apply an 'Align' filter, which subtracts a least squares plane to level the surface (to create an overall average of heights centered at zero). 5) Apply a Gaussian filter (according to ISO 16610-61) with a nesting index (cut-off wavelength) of 25 mm (to flatten out large scale waviness, while preserving finer structure).

From these processed 3D images of the surface, the following parameters are calculated, using software such as MountainsMap® or equivalent: Dry Depth (um), Dry Contact Area (%), Moist Depth (um), and Moist Contact Area (%).

Height measurements are derived from the Areal Material Ratio (Abbott-Firestone) curve described in the ISO 13565-2:1996 standard extrapolated to surfaces. This curve is the cumulative curve of the surface height distribution histogram versus the range of surface heights measured. A material ratio is the ratio, expressed as a percent, of the area corresponding to points with heights equal to or above an intersecting plane passing through the surface at a given height, or cut depth, to the cross-sectional area of the evaluation region (field of view area). For calculating contact area, the height at a material ratio of 2% is first identified. A cut depth of 100 μm below this height is then identified, and the material ratio at this depth is recorded as the "Dry Contact Area" and "Moist Contact Area", respectively, to the nearest 0.1%.

In order to calculate "Depth" (Dry and Moist, respectively), the depth at the 95% material ratio relative to the mean plane (centered height data) of the specimen surface is identified. This corresponds to a depth equal to the median of the lowest 10% of the projected area (valleys) of the specimen surface and is recorded as the "Dry Depth" and "Moist Depth", respectively, to the nearest 1 micron (um). These values will be negative as they represent depths below the mean plane of the surface heights having a value of zero.

Three replicate samples are prepared and measured in this way, to produce an average for each of the four parameters: Dry Depth (um), Dry Contact Area (%), Moist Depth (um), and Moist Contact Area (%). Additionally, from these parameters, the difference between the dry and moist depths can be calculated to demonstrate the change in depth from the dry to the moist state.

Micro-CT Intensive Property Measurement Method:

The micro-CT intensive property measurement method measures the basis weight, thickness and density values within visually discernable regions of a substrate sample. It is based on analysis of a 3D x-ray sample image obtained on a micro-CT instrument (a suitable instrument is the Scanco μCT 50 available from Scanco Medical AG, Switzerland, or equivalent). The micro-CT instrument is a cone beam microtomograph with a shielded cabinet. A maintenance free x-ray tube is used as the source with an adjustable diameter focal spot. The x-ray beam passes through the sample, where some of the x-rays are attenuated by the sample. The extent of attenuation correlates to the mass of material the x-rays have to pass through. The transmitted x-rays continue on to the digital detector array and generate a 2D projection image of the sample. A 3D image of the sample is generated by collecting several individual projection images of the sample as it is rotated, which are then reconstructed into a single 3D image. The instrument is interfaced with a computer running software to control the image acquisition and save the raw data. The 3D image is then analyzed using image analysis software (a suitable image analysis software is MATLAB available from The Mathworks, Inc., Natick, MA, or equivalent) to measure the basis weight, thickness and density intensive properties of regions within the sample.

Sample Preparation:

To obtain a sample for measurement, lay a single layer of the dry substrate material out flat and die cut a circular piece with a diameter of 16 mm. If the sample being measured is a 2 (or more) ply finished product, carefully separate an individual ply of the finished product prior to die cutting. The sample weight is recorded. A sample may be cut from any location containing the region or cells to be analyzed. A region or cell to be analyzed is one where there are visually discernible discrete knuckle or pillow cells and continuous knuckle or pillow regions. Regions or cells within different samples taken from the same substrate material can be analyzed and compared to each other. Care should be taken to avoid embossed regions, folds, wrinkles or tears when selecting a location for sampling.

Image Acquisition:

Set up and calibrate the micro-CT instrument according to the manufacturer's specifications. Place the sample into the appropriate holder, between two rings of low-density material, which have an inner diameter of 12 mm. This will allow the central portion of the sample to lay horizontal and be scanned without having any other materials directly adjacent to its upper and lower surfaces. Measurements should be taken in this region. The 3D image field of view is approximately 20 mm on each side in the xy-plane with a resolution of approximately 3400 by 3400 pixels, and with a sufficient number of 6 micron thick slices collected to fully include the z-direction of the sample. The reconstructed 3D image contains isotropic voxels of 6 microns. Images were acquired with the source at 45 kVp and 133 μA with no additional low energy filter. These current and voltage settings should be optimized to produce the maximum contrast in the projection data with sufficient x-ray penetration through the sample, but once optimized held constant for all substantially similar samples. A total of 1700 projections images are obtained with an integration time of 500 ms and 4 averages. The projection images are reconstructed into the 3D image and saved in 16-bit format to preserve the full detector output signal for analysis.

Image Processing:

Load the 3D image into the image analysis software. The largest cross-sectional area of the sample should be nearly parallel with the x-y plane, with the z-axis being perpendicular. Threshold the 3D image at a value which separates, and removes, the background signal due to air, but maintains the signal from the sample fibers within the substrate.

Five 2D intensive property images are generated from the thresholded 3D image. The first is the Basis Weight Image, which is a projection image. Each x-y pixel in this image represents the summation of the intensity values along voxels in the z-direction. This results in a 2D image where each pixel now has a value equal to the cumulative signal through the entire sample.

The weight of the sample divided by the z-direction projected area of the punched sample provides the actual basis weight of the sample. This correlates with the Basis Weight image described above, allowing it to be represented in units of g/cc.

The second intensive property 2D image is the Thickness Image. To generate this image the upper and lower surfaces of the sample are identified, and the distance between these surfaces is calculated giving the sample thickness. The upper surface of the sample is identified by starting at the uppermost z-direction slice and evaluating each slice going through the sample to locate the z-direction voxel for all pixel positions in the xy-plane where sample signal was first detected. The same procedure is followed for identifying the lower surface of the sample, except the z-direction voxels located are all the positions in the xy-plane where sample signal was last detected. Once the upper and lower surfaces have been identified they are smoothed with a 15×15 median filter to remove signal from stray fibers. The 2D Thickness Image is then generated by counting the number of voxels that exist between the upper and lower surfaces for each of the pixel positions in the xy-plane. This raw thickness value is then converted to actual distance, in microns, by multiplying the voxel count by the 6 μm slice thickness resolution.

Figure 24:
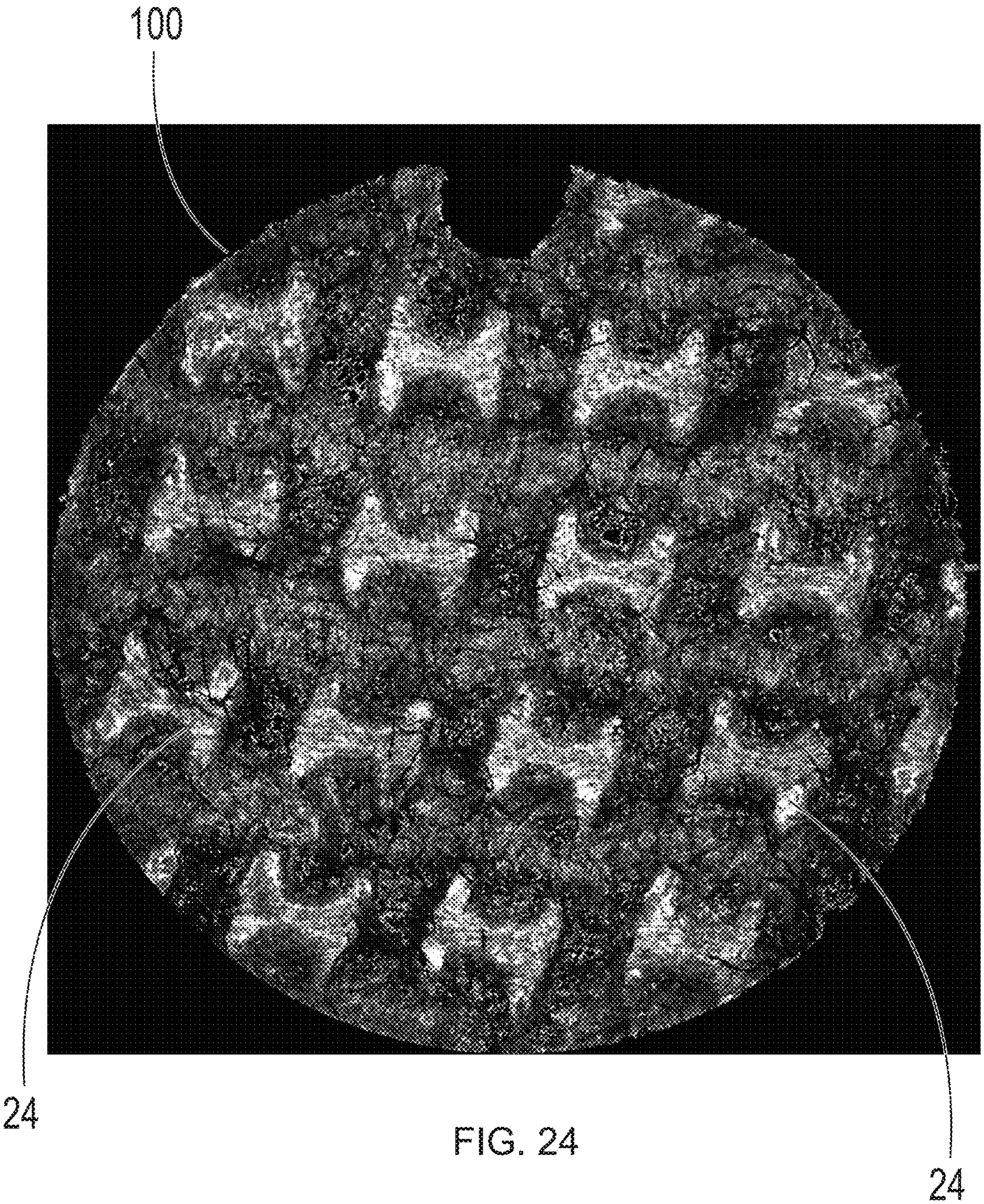
FIG. 24 is a density image for use in the Micro-CT Intensive Property Measurement Method.

The third intensive property 2D image is the Density Image (see for example FIG. 24). To generate this image divide each xy-plane pixel value in the Basis Weight Image, in units of gsm, by the corresponding pixel in the Thickness Image, in units of microns. The units of the Density Image are grams per cubic centimeter (g/cc).

For each x-y location, the first and last occurrence of a thresholded voxel position in the z-direction is recorded. This provides two sets of points representing the Top Layer and Bottom Layer of the sample. Each set of points are fit to a second-order polynomial to provide smooth top and bottom surfaces. These surfaces define fourth and fifth 2D intensive property images, the top-layer and bottom-layer of the sample. These surfaces are saved as images with the gray values of each pixel representing the z-value of the surface point.

Concavity Ratio and Packing Fraction Measurements:

As outlined above, five different types of 2D intensive property images are created. These images include: (1) a basis weight image, (2) a thickness image, (3) a density image, (4) a top-layer image, and (5) a bottom-layer image.

To measure discrete pillow and knuckle Concavity Ratio and Packing Fraction, begin by identifying the boundary of the selected discrete pillow or knuckle cells. The boundary of a cell is identified by visual discernment of differences in intensive properties when compared to other cells within the sample. For example, a cell boundary can be identified based by visually discerning a density difference when compared to another cell in the sample. Any of the intensive properties (basis weight, thickness, density, top-layer, and bottom-layer) can be used to discern cell boundaries on either the physical sample itself or any of the micro-CT 2D intensive property images.

Figure 25:
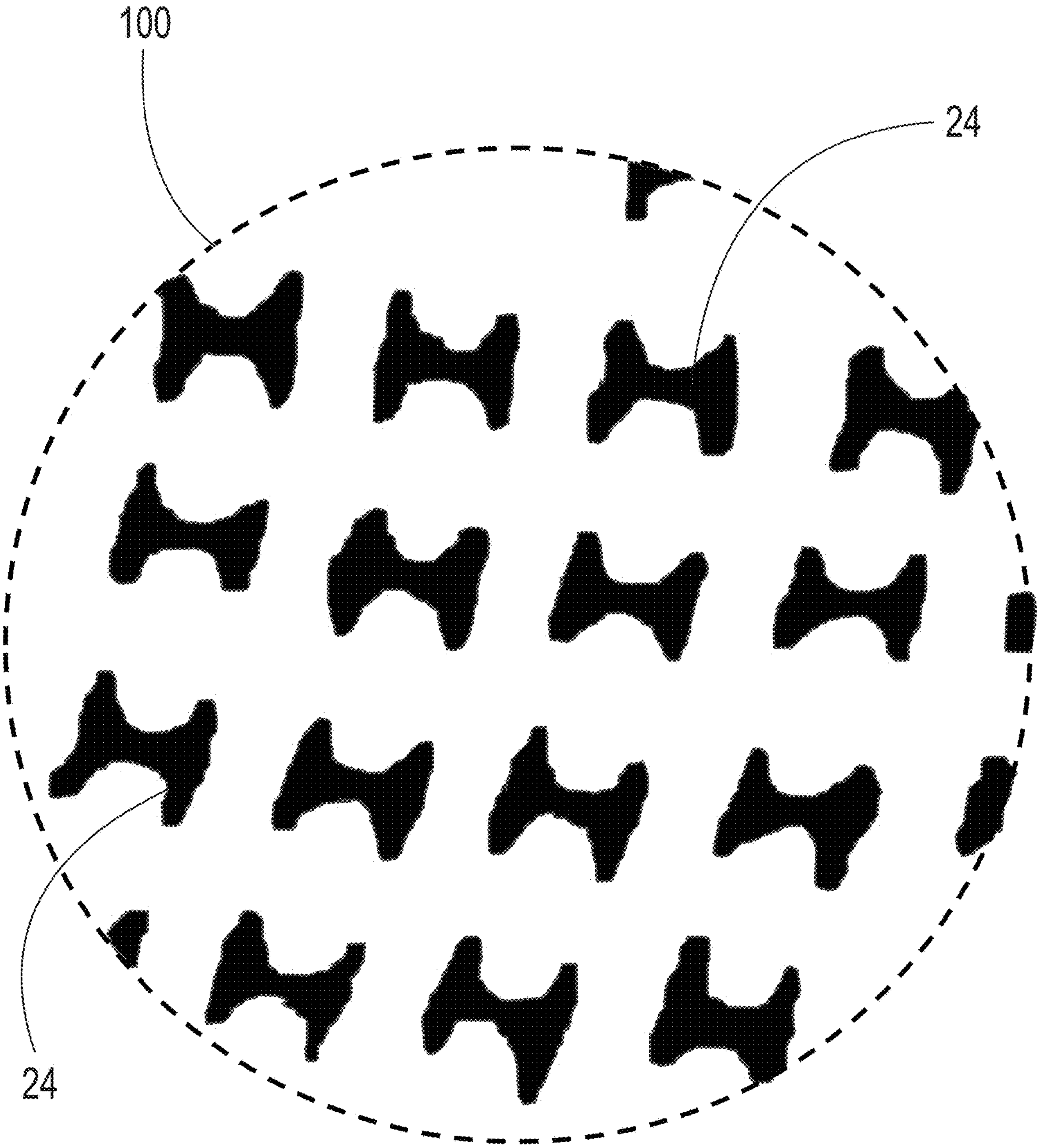
FIG. 25 is a binary image for use in the Micro-CT Intensive Property Measurement Method.

Using the image analysis software, manually draw a line tracing the identified boundary of each individual whole and partial discrete knuckle or discrete pillow cell 24 visible within the sample boundary 100, and generate a new binary image containing only the closed filled in shapes of all the identified discrete cells (see for example FIG. 25). Analyze all the individual discrete cell shapes in the binary image and record the following measurements for each: 1) Area and 2) Convex Hull Area.

The Concavity Ratio is a measure of the presence and extent of concavity within the shapes of the discrete knuckle or pillow cells. Using the recorded measurements calculate the Concavity Ratio for each of the analyzed discrete cells as the ratio of the shape area to its convex hull area. Identify ten substantially similar replicate discrete knuckle or pillow cells and average together their individual Concavity Ratio values and report the average Concavity Ratio as a unitless value to the nearest 0.01. If ten replicate cells cannot be identified in a single sample, then a sufficient number of replicate samples are to be analyzed according to the described procedure. If the sample contains discrete knuckle or pillow cells of differing size or shape, identify ten substantially similar replicates of each of the different shapes and sizes, calculate an average Concavity Ratio for each and report the minimum average Concavity Ratio value.

The Packing Fraction is the fraction of the sample area filled by the discrete knuckle and pillow shapes. The Packing Fraction value for the sample is calculated by summing all the recorded whole and partial identified shape areas, regardless of shape or size, and dividing that total by the sample area within the sample boundary 100. The Packing Fraction is reported as a unitless value to the nearest 0.01.

Figure 21C:
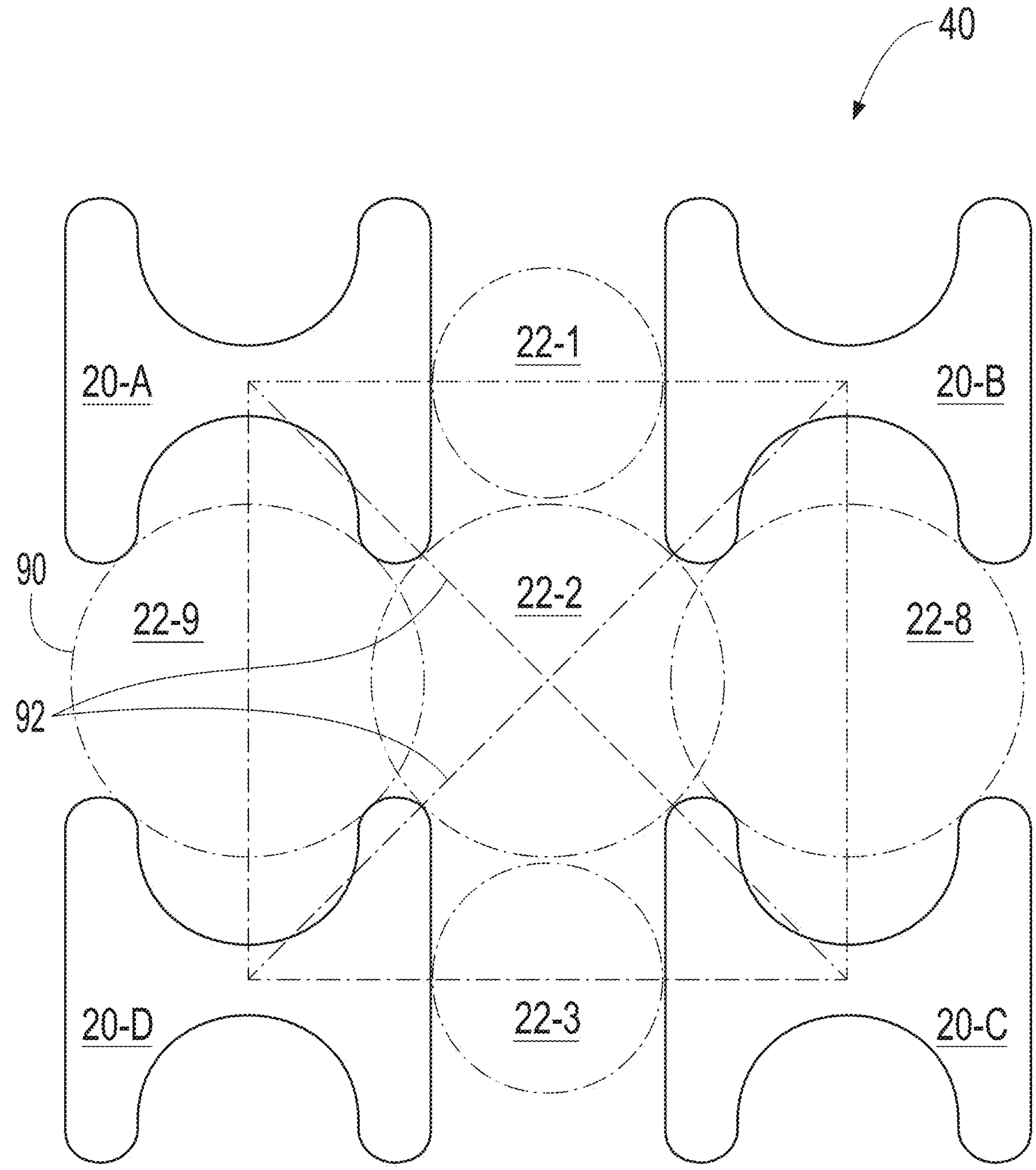
FIG. 21C is an enlarged view of a Cell Group overlapped by a quadrilateral related to the Continuous Region Density Difference Measurement.

Continuous Region Density Difference Measurement:

To measure the Continuous Region Density Difference, first identify a Cell Group 40 of four adjacent and nearest-neighboring discrete knuckle or pillow cells and their boundaries as described above, such that when the centroids of each of the four cells are connected a quadrilateral will be formed having four edges 90 and two diagonals 92 (see for example FIG. 21C). Avoid analyzing any Cells Groups containing embossing. Within this Cell Group identify the continuous pillow or knuckle region. Select five locations to analyze within the identified continuous region: One will be located on each of the cell centroid connecting lines forming the four edges of the quadrilateral, and one located in the middle where the quadrilateral diagonals intersect. At each of the selected locations draw the largest circular region of interest that can be inscribed within the continuous region, with the center of each of the four edge regions of interest lying on the centroid connecting line (e.g. pillow regions 22-1, 22-3, 22-8, 22-9) and the middle region of interest centered at the location where the diagonals intersect (e.g. 22-2). From the density intensive property image calculate and record the average density within each of the five regions of interest. Calculate and record the percent difference between the highest and lowest recorded density values. Percent difference is calculated by: substracting the lowest density value from the highest density value and then dividing that value by the average of the lowest and highest density values, and then multiplying the result by 100. Perform this analysis for three substantially similar replicate Cell Groups of four discrete knuckle or pillow locations within the sample and report the average percent difference value to the nearest whole percent.

Micro-CT Basis Weight, Thickness and Density Intensive Properties:

Once the boundary of a region has been identified draw the largest circular region of interest that can be inscribed within the region. From each of the first three intensive property images calculate the average basis weight, thickness and density within the region of interest. Record these values as the region's micro-CT basis weight to the nearest 0.01 gsm, micro-CT thickness to the nearest 0.1 micron and micro-CT density to the nearest 0.0001 g/cc.

Basis Weight:

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in ±0.0035 in by 3.500 in ±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 $ft^2$ or $g/m^2$ as follows:

Basis Weight=(Mass of stack)/[(Area of 1 square in stack)×(No. of squares in stack)]

For example:

Basis Weight (lbs/3000 $ft^2$)=[[Mass of stack (g)/453.6 (g/lbs)]/[12.25 ($in^2$)/144 ($in^2/ft^2$)×12]]×3000 or,

Basis Weight ($g/m^2$)=Mass of stack (g)/[79.032 ($cm^2$)/10,000 ($cm^2/m^2$)×12].

Report the numerical result to the nearest 0.1 lbs/3000 $ft^2$ or 0.1 $g/m^2$ or "gsm." Sample dimensions can be changed or varied using a similar precision cutter as mentioned above, so as at least 100 square inches of sample area in stack.

Emtec Test Method:

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2 C.° and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref. 2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref. 2 samples").

Mount the test sample into the instrument and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

SST Absorbency Rate:

This test incorporates the Slope of the Square Root of Time (SST) Test Method. The SST method measures rate over a wide spectrum of time to capture a view of the product pick-up rate over the useful lifetime. In particular, the method measures the absorbency rate via the slope of the mass versus the square root of time from 2-15 seconds.

Overview

The absorption (wicking) of water by a fibrous sample is measured over time. A sample is placed horizontally in the instrument and is supported with minimal contact during testing (without allowing the sample to droop) by an open weave net structure that rests on a balance. The test is initiated when a tube connected to a water reservoir is raised and the meniscus makes contact with the center of the sample from beneath, at a small negative pressure. Absorption is controlled by the ability of the sample to pull the water from the instrument for approximately 20 seconds. Rate is determined as the slope of the regression line of the outputted weight vs sqrt(time) from 2 to 15 seconds.

Apparatus

Conditioned Room—Temperature is controlled from 73° F.±2° F. (23° C.±1° C.). Relative Humidity is controlled from 50%±2%

Sample Preparation—Product samples are cut using hydraulic/pneumatic precision cutter into 3.375 inch diameter circles.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

Figure 14:
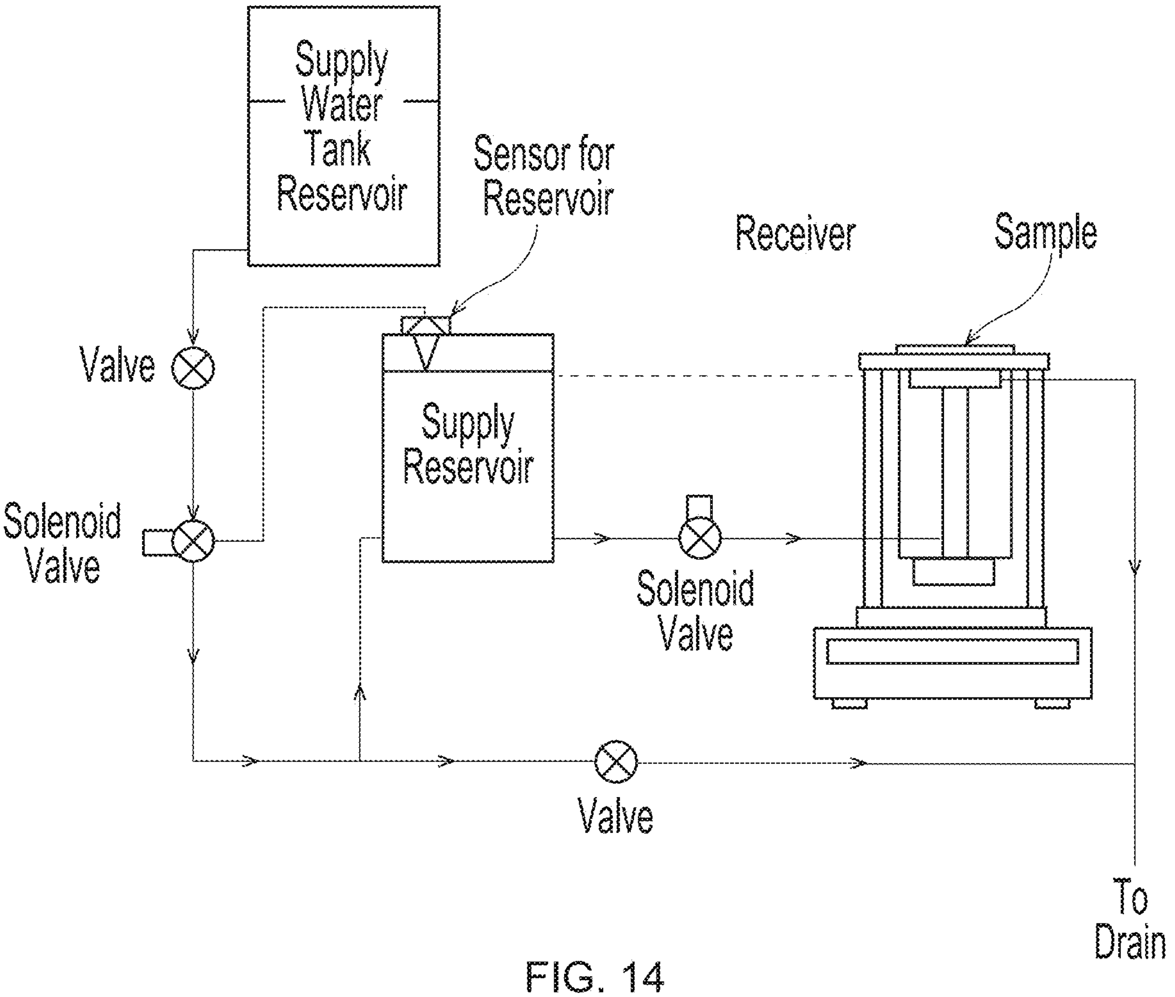
FIG. 14 is a diagram of a SST Test Method set up as detailed herein.

A diagram of the testing apparatus set up is shown in FIG. 14.

Software—LabView based custom software specific to CRT Version 4.2 or later.

Water—Distilled water with conductivity <10 μS/cm (target <5 μS/cm) @ 25° C.

Sample Preparation

For this method, a usable unit is described as one finished product unit regardless of the number of plies. Condition all samples with packaging materials removed for a minimum of 2 hours prior to testing. Discard at least the first ten usable units from the roll. Remove two usable units and cut one 3.375-inch circular sample from the center of each usable unit for a total of 2 replicates for each test result. Do not test samples with defects such as wrinkles, tears, holes, etc. Replace with another usable unit which is free of such defects Sample Testing Pre-Test Set-Up 1. The water height in the reservoir tank is set −2.0 mm below the top of the support rack (where the towel sample will be placed).
2. The supply tube (8 mm I.D.) is centered with respect to the support net.
3. Test samples are cut into circles of 3⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".
5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz and is started about 0.4 seconds before water contacts the sample.
6. The test runs for at least 20 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.

Calculation of Rate of Uptake

Take the raw data file that includes time and weight data.

First, create a new time column that subtracts 0.4 seconds from the raw time data to adjust the raw time data to correspond to when initiation actually occurs (about 0.4 seconds after data collection begins).

Second, create a column of data that converts the adjusted time data to square root of time data (e.g., using a formula such as SQRT( ) within Excel).

Third, calculate the slope of the weight data vs the square root of time data (e.g., using the SLOPE( ) function within Excel, using the weight data as the y-data and the sqrt(time) data as the x-data, etc.). The slope should be calculated for the data points from 2 to 15 seconds, inclusive (or 1.41 to 3.87 in the sqrt(time) data column).

Calculation of Slope of the Square Root of Time (SST)

The start time of water contact with the sample is estimated to be 0.4 seconds after the start of hydraulic connection is established between the supply tube and the sample (CRT Time). This is because data acquisition begins while the tube is still moving towards the sample and incorporates the small delay in scale response. Thus, "time zero" is actually at 0.4 seconds in CRT Time as recorded in the *.txt file.

The slope of the square root of time (SST) from 2-15 seconds is calculated from the slope of a linear regression line from the square root of time between (and including) 2 to 15 seconds (x-axis) versus the cumulative grams of water absorbed. The units are g/sec$^{0.5}$.

Reporting Results

Report the average slope to the nearest 0.01 g/s$^{0.5}$.

Plate Stiffness Test Method:

As used herein, the "Plate Stiffness" test is a measure of stiffness of a flat sample as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material, the deflection can be predicted by:

$$w = \frac{3F}{4\pi Et^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3}\frac{F}{w}$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of five tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. For typical perforated rolled bath tissue, sample preparation consists of removing five (5) connected usable units, and carefully forming a 5 sheet stack, accordion style, by bending only at the perforation lines. When the probe tip descends to 1 mm below the plane of the support plate, the test is terminated. The maximum slope (using least squares regression) in grams of force/mm over any mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with different sample stacks). Thus, eight S values are calculated from four 5-sheet stacks of the same sample. The numerical average of these eight S values is reported as Plate Stiffness for the sample.

Stack Compressibility and Resilient Bulk Test Method:

Stack thickness (measured in mils, 0.001 inch) is measured as a function of confining pressure (g/int) using a Thwing-Albert (14 W. Collings Ave., West Berlin, NJ) Vantage Compression/Softness Tester (model 1750-2005 or similar) or equivalent instrument, equipped with a 2500 g load cell (force accuracy is +/−0.25% when measuring value is between 10%-100% of load cell capacity, and 0.025% when measuring value is less than 10% of load cell capacity), a 1.128 inch diameter steel pressure foot (one square inch cross sectional area) which is aligned parallel to the steel anvil (2.5 inch diameter). The pressure foot and anvil surfaces must be clean and dust free, particularly when performing the steel-to-steel test. Thwing-Albert software (MAP) controls the motion and data acquisition of the instrument.

The instrument and software are set-up to acquire crosshead position and force data at a rate of 50 points/sec. The crosshead speed (which moves the pressure foot) for testing samples is set to 0.20 inches/min (the steel-to-steel test speed is set to 0.05 inches/min). Crosshead position and force data are recorded between the load cell range of approximately 5 and 1500 grams during compression. The crosshead is programmed to stop immediately after surpassing 1500 grams, record the thickness at this pressure (termed $T_{max}$), and immediately reverse direction at the same speed as performed in compression. Data is collected during this decompression portion of the test (also termed recovery) between approximately 1500 and 5 grams. Since the foot area is one square inch, the force data recorded corresponds to pressure in units of g/in$^2$. The MAP software is programmed to the select 15 crosshead position values (for both compression and recovery) at specific pressure trap points of 10, 25, 50, 75, 100, 125, 150, 200, 300, 400, 500, 600, 750, 1000, and 1250 g/in$^2$ (i.e., recording the crosshead position of very next acquired data point after the each pressure point trap is surpassed). In addition to these 30 collected trap points, $T_{max}$ is also recorded, which is the thickness at the maximum pressure applied during the test (approximately 1500 g/in$^2$).

Since the overall test system, including the load cell, is not perfectly rigid, a steel-to-steel test is performed (i.e., nothing in between the pressure foot and anvil) at least twice for each batch of testing, to obtain an average set of steel-to-steel crosshead positions at each of the 31 trap points described above. This steel-to-steel crosshead position data is subtracted from the corresponding crosshead position data at each trap point for each tested stacked sample, thereby resulting in the stack thickness (mils) at each pressure trap point during the compression, maximum pressure, and recovery portions of the test.

$$\text{Stack}T\text{ (trap)}=\text{Stack}CP\text{ (trap)}-\text{Steel}CP\text{ (trap)}$$

Where:

trap=trap point pressure at either compression, recovery, or max

StackT=Thickness of Stack (at trap pressure)

StackCP=Crosshead position of Stack in test (at trap pressure)

SteelCP=Crosshead position of steel-to-steel test (at trap pressure)

A stack of five (5) usable units thick is prepared for testing as follows. The minimum usable unit size is 2.5 inch by 2.5 inch; however a larger sheet size is preferable for testing, since it allows for easier handling without touching the central region where compression testing takes place. For typical perforated rolled bath tissue, this consists of removing five (5) sets of 3 connected usable units. In this case, testing is performed on the middle usable unit, and the outer 2 usable units are used for handling while removing from the roll and stacking. For other product formats, it is advisable, when possible, to create a test sheet size (each one usable unit thick) that is large enough such that the inner testing region of the created 5 usable unit thick stack is never physically touched, stretched, or strained, but with dimensions that do not exceed 14 inches by 6 inches.

The 5 sheets (one usable unit thick each) of the same approximate dimensions, are placed one on top the other, with their MD aligned in the same direction, their outer face all pointing in the same direction, and their edges aligned +/−3 mm of each other. The central portion of the stack, where compression testing will take place, is never to be physically touched, stretched, and/or strained (this includes never to 'smooth out' the surface with a hand or other apparatus prior to testing).

The 5 sheet stack is placed on the anvil, positioning it such that the pressure foot will contact the central region of the stack (for the first compression test) in a physically untouched spot, leaving space for a subsequent (second) compression test, also in the central region of the stack, but separated by ¼ inch or more from the first compression test, such that both tests are in untouched, and separated spots in the central region of the stack. From these two tests, an average crosshead position of the stack at each trap pressure (i.e., StackCP(trap)) is calculated for compression, maximum pressure, and recovery portions of the tests. Then, using the average steel-to-steel crosshead trap points (i.e., SteelCP(trap)), the average stack thickness at each trap (i.e., StackT(trap) is calculated (mils).

Stack Compressibility is defined here as the absolute value of the linear slope of the stack thickness (mils) as a function of the log(10) of the confining pressure (grams/in$^2$), by using the 15 compression trap points discussed previously (i.e., compression from 10 to 1250 g/in$^2$), in a least squares regression. The units for Stack Compressibility are [mils/(log(g/in$^2$))], and is reported to the nearest 0.1 [mils/(log(g/in$^2$))].

Resilient Bulk is calculated from the stack weight per unit area and the sum of 8 StackT(trap) thickness values from the maximum pressure and recovery portion of the tests: i.e., at maximum pressure ($T_{max}$) and recovery trap points at R1250, R1000, R750, R500, R300, R100, and R10 g/in$^2$ (a prefix of "R" denotes these traps come from recovery portion of the test). Stack weight per unit area is measured from the same region of the stack contacted by the compression foot, after the compression testing is complete, by cutting a 3.50 inch square (typically) with a precision die cutter, and weighing on a calibrated 3-place balance, to the nearest 0.001 gram. The weight of the precisely cut stack, along with the StackT(trap) data at each required trap pressure (each point being an average from the two compression/recovery tests discussed previously), are used in the following equation to calculate Resilient Bulk, reported in units of cm$^3$/g, to the nearest 0.1 cm$^3$/g.

$$\text{Resilient Bulk} = \frac{SUM(StackT(T_{max}, R1250, R1000, R750, R500, R300, R100, R10)) * 0.00254}{M/A}$$

Where:

StackT=Thickness of Stack (at trap pressures of $T_{max}$ and recovery pressures listed above), (mils)

M=weight of precisely cut stack, (grams)

A=area of the precisely cut stack, (cm$^2$)

Wet Burst:

"Wet Burst Strength" as used herein is a measure of the ability of a fibrous structure and/or a fibrous structure product incorporating a fibrous structure to absorb energy, when wet and subjected to deformation normal to the plane of the fibrous structure and/or fibrous structure product. The Wet Burst Test is run according to ISO 12625-9:2005, except for any deviations or modifications described below.

Wet burst strength may be measured using a Thwing-Albert Burst Tester Cat. No. 177 equipped with a 2000 g load cell commercially available from Thwing-Albert Instrument Company, Philadelphia, Pa., or an equivalent instrument.

Wet burst strength is measured by preparing four (4) multi-ply fibrous structure product samples for testing. First, condition the samples for two (2) hours at a temperature of 73° F.±2° F. (23° C.±1° C.) and a relative humidity of 50% (±2%). Take one sample and horizontally dip the center of the sample into a pan filled with about 25 mm of room temperature distilled water. Leave the sample in the water four (4) (±0.5) seconds. Remove and drain for three (3) (±0.5) seconds holding the sample vertically so the water runs off in the cross-machine direction. Proceed with the test immediately after the drain step.

Place the wet sample on the lower ring of the sample holding device of the Burst Tester with the outer surface of the sample facing up so that the wet part of the sample completely covers the open surface of the sample holding ring. If wrinkles are present, discard the samples and repeat with a new sample. After the sample is properly in place on the lower sample holding ring, turn the switch that lowers the upper ring on the Burst Tester. The sample to be tested is now securely gripped in the sample holding unit. Start the burst test immediately at this point by pressing the start button on the Burst Tester. A plunger will begin to rise (or lower) toward the wet surface of the sample. At the point when the sample tears or ruptures, report the maximum reading. The plunger will automatically reverse and return to its original starting position. Repeat this procedure on three (3) more samples for a total of four (4) tests, i.e., four (4) replicates. Report the results as an average of the four (4) replicates, to the nearest gram.

Wet Tensile:

Wet Elongation, Tensile Strength, and TEA are measured on a constant rate of extension tensile tester with computer interface (a suitable instrument is the EJA Vantage from the Thwing-Albert Instrument Co. West Berlin, NJ) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing Albert) take a CD stack and cut one, 1.00 in±0.01 in wide by at least 3.0 in long stack of strips (long dimension in CD). In like fashion cut the remaining stack in the MD (strip long dimension in MD), to give a total of 8 specimens, four CD and four MD strips. Each strip to be tested is one usable unit thick, and will be treated as a unitary specimen for testing.

Program the tensile tester to perform an extension test (described below), collecting force and extension data at an acquisition rate of 100 Hz as the crosshead raises at a rate of 2.00 in/min (10.16 cm/min) until the specimen breaks. The break sensitivity is set to 50%, i.e., the test is terminated when the measured force drops below 50% of the maximum peak force, after which the crosshead is returned to its original position.

Set the gage length to 2.00 inches. Zero the crosshead and load cell. Insert the specimen into the upper and lower open grips such that at least 0.5 inches of specimen length is contained each grip. Align the specimen vertically within the upper and lower jaws, then close the upper grip. Verify the specimen is hanging freely and aligned with the lower grip, then close the lower grip. Initiate the first portion of the test, which pulls the specimen at a rate of 0.5 in/min, then stops immediately after a load of 10 grams is achieved. Using a pipet, thoroughly wet the specimen with DI water to the point where excess water can be seen pooling on the top of the lower closed grip. Immediately after achieving this wetting status, initiate the second portion of the test, which pulls the wetted strip at 2.0 in/min until break status is achieved. Repeat testing in like fashion for all four CD and four MD specimens.

Program the software to calculate the following from the constructed force (g) verses extension (in) curve:

Wet Tensile Strength (g/in) is the maximum peak force (g) divided by the specimen width (1 in), and reported as g/in to the nearest 0.1 g/in.

Adjusted Gage Length (in) is calculated as the extension measured (from original 2.00 inch gage length) at 3 g of force during the test following the wetting of the specimen (or the next data point after 3 g force) added to the original gage length (in). If the load does not fall below 3 g force during the wetting procedure, then the adjusted gage length will be the extension measured at the point the test is resumed following wetting added to the original gage length (in).

Wet Peak Elongation (%) is calculated as the additional extension (in) from the Adjusted Gage Length (in) at the maximum peak force point (more specifically, at the last maximum peak force point, if there is more than one) divided by the Adjusted Gage Length (in) multiplied by 100 and reported as % to the nearest 0.1%.

Wet Peak Tensile Energy Absorption (TEA, g*in/in$^2$) is calculated as the area under the force curve (g*in$^2$) integrated from zero extension (i.e., the Adjusted Gage Length) to the extension at the maximum peak force elongation point (more specifically, at the last maximum peak force point, if there is more than one) (in), divided by the product of the adjusted Gage Length (in) and specimen width (in). This is reported as g*in/in$^2$ to the nearest 0.01 g*in/in$^2$.

The Wet Tensile Strength (g/in), Wet Peak Elongation (%), Wet Peak TEA (g*in/in$^2$ are calculated for the four CD specimens and the four MD specimens. Calculate an average for each parameter separately for the CD and MD specimens.

Calculations

Geometric Mean Initial Wet Tensile Strength=Square Root of [MD Wet Tensile Strength (g/in)×CD Wet Tensile Strength (g/in)]

Geometric Mean Wet Peak Elongation=Square Root of [MD Wet Peak Elongation (%)×CD Wet Peak Elongation (%)]

Geometric Mean Wet Peak TEA=Square Root of [MD Wet Peak TEA (g*in/in$^2$)×CD Wet Peak TEA (g*in/in$^2$)]

Total Wet Tensile (TWT)=MD Wet Tensile Strength (g/in)+CD Wet Tensile Strength (g/in)

Total Wet Peak TEA=MD Wet Peak TEA (g*in/in$^2$)+CD Wet Peak TEA (g*in/in$^2$)

Wet Tensile Ratio=MD Wet Peak Tensile Strength (g/in)/CD Wet Peak Tensile Strength (g/in)

Wet Tensile Geometric Mean (GM) Modulus=Square Root of [MD Modulus (at 38 g/cm)×CD Modulus (at 38 g/cm)]

Dry Elongation, Tensile Strength, TEA and Modulus Test Methods:

Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (sheets) thick.

For the actual measurement of the elongation, tensile strength, TEA and modulus, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)

Peak Elongation (Elongation) (%)

Peak TEA (TEA) (in-g/in$^2$)

Tangent Modulus (Modulus) at 15 g/cm)

Test each of the samples in the same manner, recording the above measured values from each test.

Calculations:

Geometric Mean (GM) Dry Elongation=Square Root of [MD Elongation (%)×CD Elongation (%)]

Total Dry Tensile (TDT)=Peak Load MD Tensile (g/in)+Peak Load CD Tensile (g/in)

Dry Tensile Ratio=Peak Load MD Tensile (g/in)/Peak Load CD Tensile (g/in)

Geometric Mean (GM) Dry Tensile=[Square Root of (Peak Load MD Tensile (g/in)×Peak Load CD Tensile (g/in))]

Dry TEA=MD TEA (in-g/in$^2$)+CD TEA (in-g/in$^2$)

Geometric Mean (GM) Dry TEA=Square Root of [MD TEA (in-g/in$^2$)×CD TEA (in-g/in$^2$)]

Dry Modulus=MD Modulus (at 15 g/cm)+CD Modulus (at 15 g/cm)

Geometric Mean (GM) Dry Modulus=Square Root of [MD Modulus (at 15 g/cm)×CD Modulus (at 15 g/cm)]

Flexural Rigidity:

This test is performed on 1 inch×6 inch (2.54 cm×15.24 cm) strips of a fibrous structure sample. A Cantilever Bending Tester such as described in ASTM Standard D 1388 (Model 5010, Instrument Marketing Services, Fairfield, NJ) is used and operated at a ramp angle of 41.5±0.5° and a sample slide speed of 0.5±0.2 in/second (1.3±0.5 cm/second). A minimum of n=16 tests are performed on each sample from n=8 sample strips.

No fibrous structure sample which is creased, bent, folded, perforated, or in any other way weakened should ever be tested using this test. A non-creased, non-bent, non-folded, non-perforated, and non-weakened in any other way fibrous structure sample should be used for testing under this test.

From one fibrous structure sample of about 4 inch×6 inch (10.16 cm×15.24 cm), carefully cut using a 1 inch (2.54 cm) JDC Cutter (available from Thwing-Albert Instrument Company, Philadelphia, PA) four (4) 1 inch (2.54 cm) wide by 6 inch (15.24 cm) long strips of the fibrous structure in the MD direction. From a second fibrous structure sample from the same sample set, carefully cut four (4) 1 inch (2.54 cm) wide by 6 inch (15.24 cm) long strips of the fibrous structure in the CD direction. It is important that the cut be exactly perpendicular to the long dimension of the strip. In cutting non-laminated two-ply fibrous structure strips, the strips should be cut individually. The strip should also be free of wrinkles or excessive mechanical manipulation which can impact flexibility. Mark the direction very lightly on one end of the strip, keeping the same surface of the sample up for all strips. Later, the strips will be turned over for testing, thus it is important that one surface of the strip be clearly identified, however, it makes no difference which surface of the sample is designated as the upper surface.

Using other portions of the fibrous structure (not the cut strips), determine the basis weight of the fibrous structure sample in lbs/3000 ft$^2$ and the caliper of the fibrous structure in mils (thousandths of an inch) using the standard procedures disclosed herein. Place the Cantilever Bending Tester level on a bench or table that is relatively free of vibration, excessive heat and most importantly air drafts. Adjust the platform of the Tester to horizontal as indicated by the leveling bubble and verify that the ramp angle is at 41.5±0.5°. Remove the sample slide bar from the top of the platform of the Tester. Place one of the strips on the horizontal platform using care to align the strip parallel with the movable sample slide. Align the strip exactly even with the vertical edge of the Tester wherein the angular ramp is attached or where the zero mark line is scribed on the Tester. Carefully place the sample slide bar back on top of the sample strip in the Tester. The sample slide bar must be carefully placed so that the strip is not wrinkled or moved from its initial position.

Move the strip and movable sample slide at a rate of approximately 0.5±0.2 in/second (1.3±0.5 cm/second) toward the end of the Tester to which the angular ramp is attached. This can be accomplished with either a manual or automatic Tester. Ensure that no slippage between the strip and movable sample slide occurs. As the sample slide bar and strip project over the edge of the Tester, the strip will begin to bend, or drape downward. Stop moving the sample slide bar the instant the leading edge of the strip falls level with the ramp edge. Read and record the overhang length from the linear scale to the nearest 0.5 mm. Record the distance the sample slide bar has moved in cm as overhang length. This test sequence is performed a total of eight (8) times for each fibrous structure in each direction (MD and CD). The first four strips are tested with the upper surface as the fibrous structure was cut facing up. The last four strips are inverted so that the upper surface as the fibrous structure was cut is facing down as the strip is placed on the horizontal platform of the Tester.

The average overhang length is determined by averaging the sixteen (16) readings obtained on a fibrous structure.

$$\text{Overhang Length } MD = \frac{\text{Sum of 8 } MD \text{ readings}}{8}$$

$$\text{Overhang Length } CD = \frac{\text{Sum of 8 } CD \text{ readings}}{8}$$

$$\text{Overhang Length Total} = \frac{\text{Sum of all 16 readings}}{16}$$

$$\text{Bend Length } MD = \frac{\text{Overhang Length } MD}{2}$$

$$\text{Bend Length } CD = \frac{\text{Overhang Length } CD}{2}$$

$$\text{Bend Length Total} = \frac{\text{Overhang Length Total}}{2}$$

$$\text{Flexural Rigidity} = 0.1629 \times W \times C^3$$

wherein W is the basis weight of the fibrous structure in lbs/3000 ft$^2$; C is the bending length (MD or CD or Total)

in cm; and the constant 0.1629 is used to convert the basis weight from English to metric units. The results are expressed in mg-cm.

GM Flexural Rigidity=Square root of (MD Flexural Rigidity×CD Flexural Rigidity)

Figure 12:
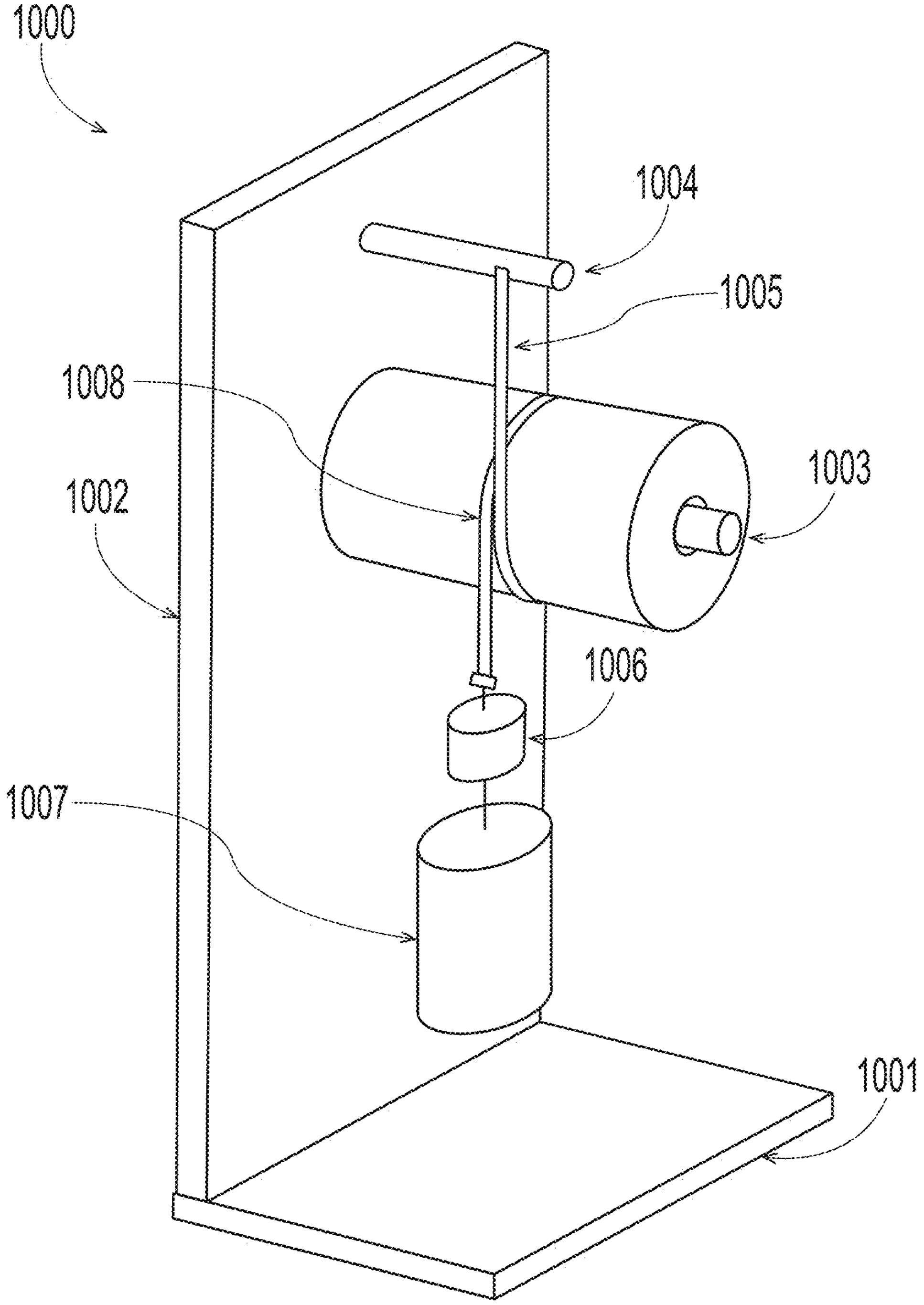
FIG. 12 is a perspective view of a test stand for measuring roll compressibility properties as detailed herein.
Figure 13:
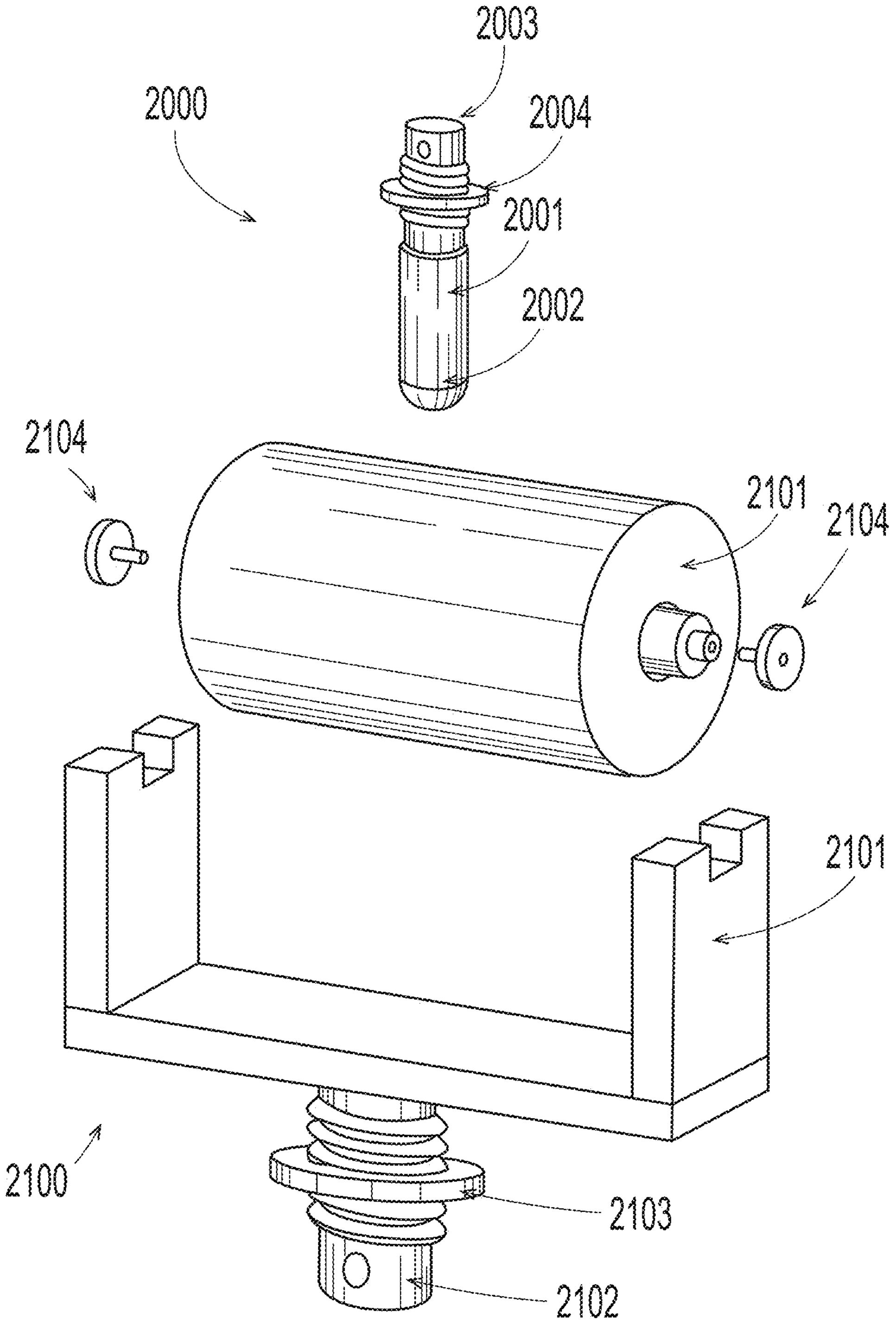
FIG. 13 is perspective view of the testing device used in the roll firmness measurement detailed herein.

Percent Roll Compressibility:

Percent Roll Compressibility (Percent Compressibility) is determined using the Roll Diameter Tester 1000 as shown in FIG. 12. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C.° and about 50%±2% relative humidity.

The diameter of the test roll is measured directly using a Pi ° tape or equivalent precision diameter tape (e.g. an Executive Diameter tape available from Apex Tool Group, LLC, Apex, NC, Model No. W606PD) which converts the circumferential distance into a diameter measurement, so the roll diameter is directly read from the scale. The diameter tape is graduated to 0.01 inch increments with accuracy certified to 0.001 inch and traceable to NIST. The tape is in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

% Compressibility=(Original Roll Diameter)−(Compressed Roll Diameter)/Original Roll Diameter×100

Repeat the testing on 10 replicate rolls and record the separate results to the nearest 0.1%. Average the 10 results and report as the Percent Compressibility to the nearest 0.1%.

Roll Firmness:

Roll Firmness is measured on a constant rate of extension tensile tester with computer interface (a suitable instrument is the MTS Alliance using Testworks 4.0 Software, as available from MTS Systems Corp., Eden Prairie, MN) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2 C° and 50%±2% relative humidity.

Referring to FIG. 14, the upper movable fixture 2000 consist of a cylindrical probe 2001 made of machined aluminum with a 19.00±0.05 mm diameter and a length of 38 mm. The end of the cylindrical probe 2002 is hemispheric (radius of 9.50±0.05 mm) with the opposing end 2003 machined to fit the crosshead of the tensile tester. The fixture includes a locking collar 2004 to stabilize the probe and maintain alignment orthogonal to the lower fixture. The lower stationary fixture 2100 is an aluminum fork with vertical prongs 2101 that supports a smooth aluminum sample shaft 2101 in a horizontal position perpendicular to the probe. The lower fixture has a vertical post 2102 machined to fit its base of the tensile tester and also uses a locking collar 2103 to stabilize the fixture orthogonal to the upper fixture.

The sample shaft 2101 has a diameter that is 85% to 95% of the inner diameter of the roll and longer than the width of the roll. The ends of sample shaft are secured on the vertical prongs with a screw cap 2104 to prevent rotation of the shaft during testing. The height of the vertical prongs 2101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.±2 C.° and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read the penetration at 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

Slip Stick Coefficient of Friction and Kinetic Coefficient of Friction:

The Kinetic Coefficient of Friction values (actual measurements) and Slip Stick Coefficient of Friction (based on standard deviation from the mean Kinetic Coefficient of Friction) are generated by running the test procedure as defined in U.S. Pat. No. 9,896,806.

CRT Rate and Capacity

CRT Rate and Capacity values are generated by running the test procedure as defined in U.S. Patent Application No. US 2017-0183824.

Dry and Wet Caliper Test Methods

Dry and Wet Caliper values are generated by running the test procedure as defined in U.S. Pat. No. 7,744,723 and states, in relevant part:

Dry Caliper

Samples are conditioned at 23+/−1° C. and 50%+/−2% relative humidity for two hours prior to testing.

Dry Caliper of a sample of fibrous structure product is determined by cuffing a sample of the fibrous structure product such that it is larger in size than a load foot loading surface where the load foot loading surface has a circular surface area of about 3.14 $in^2$. The sample is confined between a horizontal flat surface and the load foot loading surface. The load foot loading surface applies a confining pressure to the sample of 14.7 $g/cm^2$ (about 0.2.1 psi). The caliper is the resulting gap between the flat surface and the load foot loading surface. Such measurements can be obtained on a VIR Electronic Thickness Tester Model II available from Thwing-Albert Instrument Company, Philadelphia, Pa. The caliper measurement is repeated and recorded at least five (5) times so that an average caliper can be calculated. The result is reported in mils.

Wet Caliper

Samples are conditioned at 23+/−1° C. and 50% relative humidity for two hours prior to testing.

Wet Caliper of a sample of fibrous structure product is determined by cutting a sample of the fibrous structure product such that it is larger in size than a load foot loading surface where the load foot loading surface has a circular surface area of about 3.14 $in^2$. Each sample is wetted by submerging the sample in a distilled water bath for 30 seconds. The caliper of the wet sample is measured within 30 seconds of removing the sample from the bath. The sample is then confined between a horizontal flat surface and the load foot loading surface. The load foot loading surface applies a confining pressure to the sample of 14.7 $g/cm^2$ (about 0.21 psi). The caliper is the resulting gap between the flat surface and the load foot loading surface. Such measurements can be Obtained on a VIR Electronic Thickness Tester Model II available from Thwing-Albert. Instrument Company, Philadelphia, Pa. The caliper measurement is repeated and recorded at least five (5) times so that an average caliper can be calculated. The result is reported in mils.

Fiber Length Test Method

Fiber Length values are generated by running the test procedure as defined in U.S. Patent Application No. 2004-0163782 and informs the following procedure:

The length and coarseness of the-fibers may be determined using a Valmet FS5 Fiber Image Analyzer commercially available from Valmet, Kajaani Finland following the procedures outlined in the manual. As used herein, fiber length is defined as the "length weighted average fiber length". The instructions supplied with the unit detail the formula used to arrive at this average. The length can be reported in units of millimeters (mm) or in inches (in).

In the interests of brevity and conciseness, any ranges of values set forth in this specification are to be construed as written description support for Claims reciting any sub-ranges having endpoints which are whole number values within the specified range in question. By way of a hypothetical illustrative example, a disclosure in this specification of a range of 1-5 shall be considered to support Claims to any of the following sub-ranges: 1-4; 1-3; 1-2; 2-5; 2-4; 2-3; 3-5; 3-4; and 4-5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm."

Every document cited herein, including any cross referenced or related patent or application is hereby incorporated herein by reference in its entirety unless expressly excluded or otherwise limited. The citation of any document is not an admission that it is prior art with respect to any example disclosed or Claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended Claims all such changes and modifications that are within the scope of this disclosure.

What is claimed is:

1. A creped through air dried fibrous structure, comprising:

a plurality of discrete cells;

a Moist Depth;

a Dry Depth;

a Moist Contact Area;

wherein the Dry Depth comprises a Dry Depth Value more negative than −281 um, as measured with respect to a mean surface of the fibrous structure;

wherein the Moist Depth comprises a Moist Depth value more negative than −275 um, as measured with respect to the mean surface; and wherein the Moist Contact Area is greater than 30.8%.

2. The fibrous structure of claim 1, wherein the Dry Depth value is more negative than −285 um.

3. The fibrous structure of claim 1, wherein the Moist Depth is greater than the Dry Depth.

4. The fibrous structure of claim 1, further comprising a Wet Tensile greater than 715 g/inch.

5. The fibrous structure of claim 1, wherein the plurality of discrete cells each comprise a concavity.

6. The fibrous structure of claim 1, wherein the plurality of discrete cells each comprise a leg.

7. The fibrous structure of claim 1, wherein the continuous pillow is along a MD of the fibrous structure.

8. The fibrous structure of claim 7, wherein a second continuous pillow is along a CD of the fibrous structure.

* * * * *